(12) United States Patent
Lee et al.

(10) Patent No.: US 10,671,265 B2
(45) Date of Patent: Jun. 2, 2020

(54) DISPLAY APPARATUS AND DISPLAY METHOD

(71) Applicant: SAMSUNG ELECTRONICS CO., LTD., Suwon-si (KR)

(72) Inventors: Jin-ha Lee, Seoul (KR); Seung-cheon Baek, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 266 days.

(21) Appl. No.: 14/953,063

(22) Filed: Nov. 27, 2015

(65) Prior Publication Data

US 2016/0188148 A1 Jun. 30, 2016

(30) Foreign Application Priority Data

Dec. 24, 2014 (KR) .................. 10-2014-0188636

(51) Int. Cl.
| | |
|---|---|
| *G06F 3/0485* | (2013.01) |
| *H04N 21/431* | (2011.01) |
| *H04N 21/482* | (2011.01) |
| *H04N 5/44* | (2011.01) |
| *H04N 21/422* | (2011.01) |
| *G06F 3/0481* | (2013.01) |

(52) U.S. Cl.
CPC ........ *G06F 3/0485* (2013.01); *G06F 3/04812* (2013.01); *H04N 5/4403* (2013.01); *H04N 21/42204* (2013.01); *H04N 21/431* (2013.01); *H04N 21/482* (2013.01); *H04N 2005/4428* (2013.01)

(58) Field of Classification Search
CPC ............. G06F 3/0488; G06F 3/0481; G06F 3/0485–04855; G06F 3/04812
See application file for complete search history.

(56) References Cited

U.S. PATENT DOCUMENTS

| | | |
|---|---|---|
| 5,874,936 A | 2/1999 | Berstis et al. |
| 8,633,949 B2 | 1/2014 | Wilson et al. |
| 9,176,659 B2* | 11/2015 | Park .................. G06F 3/0486 |
| 9,417,779 B2 | 8/2016 | Flake et al. |
| 9,477,368 B1* | 10/2016 | Filip ................ G06F 17/30241 |

(Continued)

FOREIGN PATENT DOCUMENTS

| | | |
|---|---|---|
| CN | 101907936 A | 12/2010 |
| CN | 102144213 A | 8/2011 |

(Continued)

OTHER PUBLICATIONS

Search Report dated Feb. 25, 2016, issued by the International Searching Authority in counterpart International Application No. PCT/KR2015/012577 (PCT/ISA/210).

(Continued)

*Primary Examiner* — Patrick F Marinelli
(74) *Attorney, Agent, or Firm* — Sughrue Mion, PLLC

(57) ABSTRACT

Provided are a display apparatus and a display method. The display apparatus includes: a display configured to display a cursor based on an input of a control device; and a controller configured to control the display to add visual effects to the cursor at an edge of a scrolling area or to the scrolling area based on a scrolling distance of the control device in response to detecting a position of the cursor exiting the scrolling area at the edge of the scrolling area.

14 Claims, 53 Drawing Sheets

(56) References Cited

U.S. PATENT DOCUMENTS

| | | | |
|---|---|---|---|
| 2004/0233238 A1 | 11/2004 | Lahdesmaki | |
| 2006/0114225 A1 | 6/2006 | Tsukada et al. | |
| 2007/0050810 A1 | 3/2007 | Imaizumi | |
| 2009/0024956 A1* | 1/2009 | Kobayashi | G06F 3/0481 715/784 |
| 2009/0115723 A1 | 5/2009 | Henty | |
| 2010/0253620 A1 | 10/2010 | Sunghal | |
| 2010/0309123 A1* | 12/2010 | Sawai | G06F 3/0346 345/157 |
| 2011/0126148 A1 | 5/2011 | Krishnaraj et al. | |
| 2011/0175803 A1 | 7/2011 | Serafin et al. | |
| 2012/0072865 A1 | 3/2012 | Flake et al. | |
| 2012/0154444 A1 | 6/2012 | Fernandez | |
| 2012/0159553 A1 | 6/2012 | Hwang et al. | |
| 2012/0162261 A1* | 6/2012 | Kim | G06F 3/017 345/647 |
| 2013/0125066 A1 | 5/2013 | Klein et al. | |
| 2013/0212522 A1* | 8/2013 | Fleizach | G06F 3/0488 715/784 |
| 2013/0222312 A1* | 8/2013 | Wilson | G06F 3/04817 345/173 |
| 2013/0314396 A1* | 11/2013 | Kang | H04N 21/42204 345/214 |
| 2014/0047392 A1 | 2/2014 | Kim et al. | |
| 2014/0143714 A1* | 5/2014 | Tamiya | G06F 3/0482 715/784 |
| 2016/0170597 A1* | 6/2016 | Lee | G06F 3/0485 345/157 |
| 2016/0188148 A1* | 6/2016 | Lee | H04N 5/4403 715/719 |
| 2016/0239104 A1 | 8/2016 | Sawai et al. | |

FOREIGN PATENT DOCUMENTS

| | | |
|---|---|---|
| CN | 102597944 A | 7/2012 |
| CN | 102981707 A | 3/2013 |
| CN | 103428548 A | 12/2013 |
| KR | 10-2014-0020568 A | 2/2014 |
| WO | 2010/114878 A1 | 10/2010 |
| WO | 2011046766 A3 | 4/2011 |

OTHER PUBLICATIONS

Written Opinion dated Feb. 25, 2016, issued by the International Searching Authority in counterpart International Application No. PCT/KR2015/012577 (PCT/ISA/237).
Communication dated Apr. 19, 2016, issued by the European Patent Office in counterpart European Application No. 15199263.3.
Communication dated Apr. 19, 2016, issued by the European Patent Office in counterpart European Application No. 15199272.4.
Search Report dated Apr. 22, 2016, issued by the International Searching Authority in counterpart International Application No. PCT/KR2015/012366 (PCT/ISA/210).
Written Opinion dated Apr. 22, 2016, issued by the International Searching Authority in counterpart International Application No. PCT/KR2015/012366 (PCT/ISA/237).
Communication dated Aug. 25, 2016 issued by the European Patent Office in counterpart European Patent Application No. 15199263.3.
Communication dated Jul. 18, 2017 by the State Intellectual Property Office of P.R. China in counterpart Chinese Patent Application No. 201510922782.9.
Communication dated Apr. 27, 2018, issued by the State Intellectual Property Office of P.R. China in counterpart Chinese Patent Application No. 201510983086.9.
Communication dated Apr. 2, 2019 issued by the European Intellectual Property Office in counterpart European Application No. 15 199 272.4.

* cited by examiner

DISPLAY APPARATUS AND DISPLAY METHOD

CROSS-REFERENCE TO RELATED APPLICATION

This application claims priority from Korean Patent Application No. 10-2014-0188636, filed on Dec. 24, 2014, in the Korean Intellectual Property Office, the disclosure of which is incorporated herein by reference in its entirety.

BACKGROUND

1. Field

Apparatuses and methods consistent with exemplary embodiments relate to scrolling text, images or video on a monitor or a display.

2. Description of the Related Art

Display apparatuses have a function of displaying an image that can be watched by users. Users can watch a broadcast via a display apparatus. Display apparatuses display, on a display included therein, a broadcast that a user selects from among broadcasting signals transmitted by a broadcasting station. Currently, most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, and is favorable with respect to error correction, and provides high-resolution and high-definition screen images. In addition, digital broadcasting can provide a bidirectional service, in contrast with analog broadcasting.

Smart televisions (TVs) providing various types of content in addition to a digital broadcasting function have been recently provided. Smart TVs aim to analyze and respond to user needs without manipulations by a user, that is, instead of a user manually operating the smart TVs to make a selection.

Also, smart TVs realizing scrolling have recently become available to provide users with more information by reinforcing interaction with users.

SUMMARY

One or more exemplary embodiments include a display apparatus allowing a user to intuitively and naturally experience scrolling, and a display method performed by the display apparatus.

According to an aspect of an exemplary embodiment, there is provided a display apparatus including: a display configured to display a cursor based on an input of a control device; and a controller configured to control the display to add visual effects to the cursor at an edge of a scrolling area or to the scrolling area based on a scrolling distance of the control device in response to detecting a position of the cursor exiting the scrolling area at the edge of the scrolling area.

The controller may be further configured to determine the scrolling distance based on a distance difference between an actual position indicated by the control device and a position of the cursor on the edge of the scrolling area.

The controller may be further configured to add the visual effects to the cursor by deforming a shape of the cursor in response to the cursor exiting the scrolling area.

The cursor may have a circular shape, and the controller may control the display to deform the shape of the cursor to an oval shape based on the scrolling distance.

The controller may be further configured to output the cursor by deforming the cursor to a vertically long oval shape in response to a scrolling direction of the control device corresponding to a horizontal direction. The controller may be further configured to output the cursor by deforming the cursor to a horizontally long oval shape in response to a scrolling direction of the control device corresponding to a vertical direction.

The controller may be further configured to determine a scrolling speed based on the scrolling distance.

The controller may be further configured to control the display to restore the cursor to an original form of the cursor or restore the scrolling area to an original form of the scrolling area without adding the visual effects in response to the scrolling distance exceeding a threshold value of a scrolling range.

The controller may be further configured to add the visual effects to the scrolling area by deforming the edge of the scrolling area, the visual effects indicating a motion of pulling the edge of the scrolling area towards the position of the control device.

The controller may be further configured to control the display to display the cursor at a position which is defined on a vector oriented from a point in the scrolling area toward the position of the control device.

The controller is further configured to control the display to display a geometrical figure that includes a vertex corresponding to a position defined on a vector directed from a point in the scrolling area toward the position of the control device, and a side corresponding to the edge of the scrolling area.

According to an aspect of another exemplary embodiment, there is a display method of a display apparatus, the method including: displaying a cursor on a screen of the display apparatus based on an input of a control device; and outputting the cursor or a scrolling area by adding visual effects to the cursor at an edge of the scrolling area or to the scrolling area of the screen based on a scrolling distance of the control device in response to detecting a position of the cursor exiting the scrolling area at the edge of the scrolling area.

The display method may further include determining the scrolling distance based on a distance difference between the position of the control device and a position of the cursor on the edge of the scrolling area.

The display method may further include adding the visual effects to the cursor by deforming the shape of the cursor in response to the cursor exiting the scrolling area.

The cursor may have a circular shape, and the method may further include outputting the cursor by deforming the shape of the cursor to an oval shape based on the scrolling distance.

The display method may further include outputting the cursor by deforming the shape of the cursor to a vertically long oval shape in response to a scrolling direction of the control device corresponding to a horizontal direction, and outputting the cursor by deforming the shape of the cursor to a horizontally long oval shape in response to a scrolling direction of the control device corresponding to a vertical direction.

The display method may further include determining a scrolling speed based on the scrolling distance.

The display method may further include restoring the cursor to an original form of the cursor or restoring the scrolling area to an original form of the scrolling area, without adding the visual effects to the cursor or the scrolling area, in response to the scrolling distance exceeding a threshold value of a scrolling range.

The display method may further include adding the visual effects to the scrolling area by deforming the edge of the scrolling area, that the visual effects indicating a motion of pulling the edge of the scrolling area towards a pointing position of the control device.

The display method may further include displaying the cursor at a position defined on a vector oriented from a point in the scrolling area toward the position of the control device.

The display method may further include displaying a geometrical figure that includes a vertex corresponding to a position defined on a vector directed from a point in the scrolling area toward the position of the control device, and a side corresponding to the edge of the scrolling area.

According to an aspect of another exemplary embodiment, there is provided a display method of a display apparatus, the method including: enabling an edge scrolling mode in which a screen of the display apparatus is scrolled in whole or in part in response to a cursor being located at an edge of the screen or at an edge of a scrolling area of the screen; determining an input position of the cursor; determining a distance of a drag input from the input position to a final position of the drag input; determining a distance between the edge of the scrolling area and the final position of the drag input; and applying an visual effect to the cursor based on a distance between the final position and the edge of the scrolling area.

The input position of the cursor corresponds to a position of a touch on the screen of the display apparatus.

The edge scrolling mode may be automatically enabled by default or in response to the input position of the cursor being located within the scrolling area of the screen.

The visual effect may correspond to changing a shape of the cursor in proportion to the distance between the edge of the scrolling area and the final position of the drag input.

The visual effect may correspond to enabling the cursor to flicker with a frequency in proportion to the distance between the edge of the scrolling area and the final position of the drag input.

The method may further include disabling the edge scrolling mode while video is reproduced in a full screen mode.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Figure 1A:
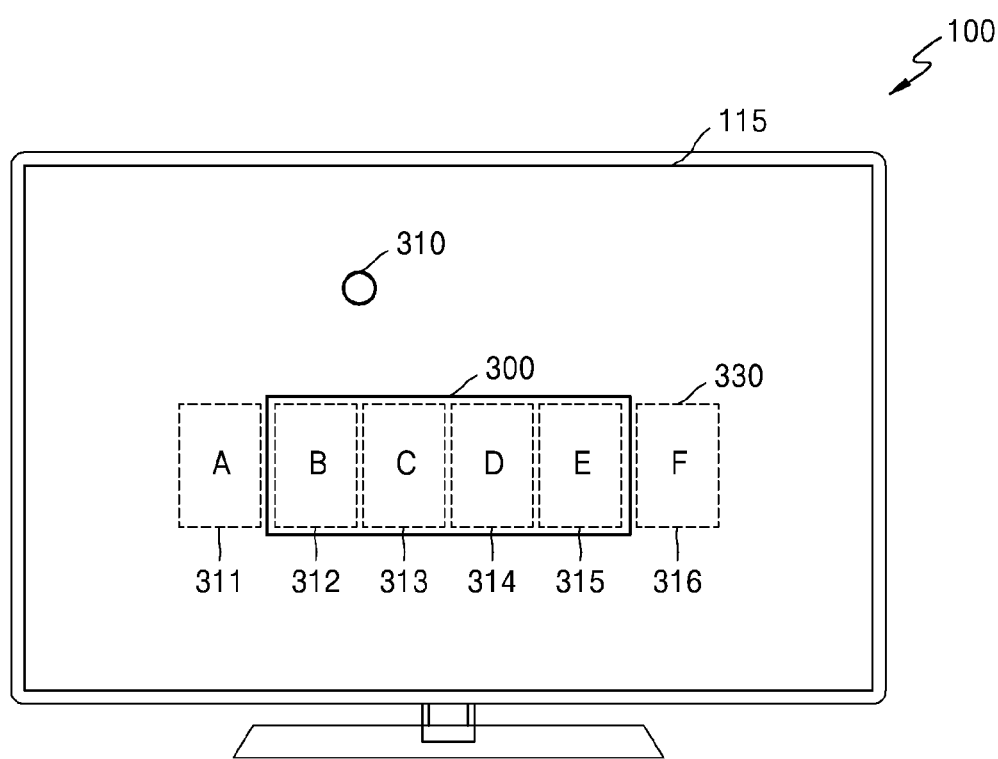
FIG. 1A is a schematic view showing an operation between a display apparatus and a control device according to an exemplary embodiment, in which a cursor is located in a center of a display screen.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

While such terms as "first", "second", etc., may be used to describe various components, such components must not be limited to the above terms. The above terms are used only to distinguish one component from another. For example, a first component discussed below could be termed a second component, and similarly, a second component may be termed a first component without departing from the teachings of this disclosure. The term "and/or" includes any and all combinations of one or more of the associated listed items.

Selection of a key arranged on a control device may be terminology that means pressing, touch, or drag of a key.

Content may include video, audio, text, or web documents.

A portion of a display of a display apparatus in which actual content is output may be referred to as a screen.

The terms used in the present specification are merely used to describe particular exemplary embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Hereinafter, a display operation according to exemplary embodiments will be described with reference to FIGS. 1A through 1E.

FIG. 1A is a schematic view showing an operation between a display apparatus 100 and a control device (e.g., remote controller) 200 according to an exemplary embodiment, in which a cursor 310 is located in a center of a display screen.

Referring to FIG. 1A, the display apparatus 100 and the control device 200 are capable of communicating with each other by wired communication or wireless communication.

The control device 200 may control the display apparatus 100 via short-range communication including infrared or Bluetooth communication. The control device 200 may be manipulated by a user to control a function of the display apparatus 100 by using at least one selected from keys (including buttons) included in the control device 200, a touch pad, a microphone capable of receiving voices of users, and a sensor capable of recognizing motions of the control device 200.

The control device 200 includes a power on/off button for turning on or off the display apparatus 100. The control device 200 may change a channel, adjust the volume, and select terrestrial broadcasting/cable broadcasting/satellite broadcasting, or perform setting of the display apparatus 100 according to a user input.

The display apparatus 100 may be implemented by using not only a flat display apparatus but also a curved display apparatus having a curvature or flexible display apparatus capable of adjusting a curvature. An output resolution of the display apparatus 100 may be, for example, a high definition (HD), a full HD, an ultra HD, or a resolution that is clearer than ultra HD.

The term "user" used herein denotes a person who controls a function or operation of the display apparatus 100 by using the control device 200. Examples of the user may include a viewer, a manager, or an installation engineer.

According to an exemplary embodiment, the display apparatus 100 may provide a video screen to a display 115 and a scrolling area 300 including a plurality of scrolling items in a portion of the video screen. Referring to FIG. 1A, the scrolling area 300 in which scrolling items are displayable may be provided on the display 115, and a cursor 310 corresponding to an input of the control device 200 may be displayed on the display 115.

Scrolling refers to vertically or horizontally sliding a text, an image or a video on a monitor or a display of a computer display or a television product. Scrolling allows viewing of more of the text or the image, without changing a layout of the text or the image. Scrolling is typically performed via a central processing unit (CPU) or a graphic card of a computer.

Referring to FIG. 1A, the scrolling area 300 is provided in a portion of a screen of the display 115, and scrolling items (e.g., icons) are horizontally arranged in the scrolling area 300. A scrolling list 330 includes scrolling items A 311, B 312, C 313, D 314, E 315, and F 316. The scrolling items B 312, C 313, D 314, and E 315, which are part of a scrolling list 330 including a plurality of scrolling items, are displayed in the scrolling area 300.

The scrolling items may indicate content. Examples of items indicating content may include an item indicating image content such as a movie or drama, an item indicating audio content such as music, an item indicating an application, an item indicating a broadcasting channel, and an item indicating history information of contents executed by a user.

A plurality of items may be displayed as images. For example, an item indicating movie content or drama content may be displayed as a poster image (i.e., thumbnail) of a movie or a drama. Also, an item indicating audio content such as music may be displayed as poster image of an album including the music. Also, an item indicating an application may be displayed as an image showing the application or a screen showing a last executed application. Also, an item indicating a broadcasting channel may be displayed as an image of a last screen of the broadcasting channel viewed by a user or an image indicating a program that is currently being broadcast in the broadcasting channel. Also, an item indicating history information of content executed by a user may be displayed as an image of a last executed screen of the content.

Also, scrolling items may indicate an interface for connecting the display apparatus 100 with an external device or an external device connected to the display apparatus 100. For example, an item indicating an interface for connecting to an external device may be an item indicating a port of an image display apparatus to which the external device is connected. For example, an item indicating an external device may include an item indicating High-Definition Multimedia Interface (HDMI) port, an item indicating a component jack, an item indicating a PC port, an item indicating a universal serial bus (USB) port, or the like. Also, an item indicating an external device may be an item indicating an external device connected to the interface.

A scrolling list including a plurality of scrolling items is usually longer than the scrolling area 300 that displays the scrolling items, and thus the scrolling area 300 may display only some of the scrolling items from the entire scrolling list. Thus, moving a cursor by bumping the cursor against an edge of the scrolling area 300 in order to continuously move to an area of scrolling items on the scrolling area 300 is called edge scrolling. Referring to FIG. 1A, when the user further scrolls from the left end of the scrolling area 300 by using the control device 200, for example, the scrolling item A 311 that is arranged on the left side of the scrolling item B 312 may be displayed in the scrolling area 300. Also, when the user further scrolls from the right end of the scrolling area 300 by using the control device 200, for example, the scrolling item F 316 that is arranged on the right side of the scrolling item E 315 may be displayed in the scrolling area 300.

The cursor 310 is an indicator which is used to indicate a position on a computer monitor or a display apparatus in response to a text input or a pointing device in a computing device. An indicator used to indicate a position on a display in response to an input of a pointing device such as a mouse is typically referred to as a pointer. Referring to FIG. 1A, when a user moves the control device 200 on a screen of the display 115, the cursor 310 is arranged on the screen of the display 115 to correspond to a position indicated by the control device 200.

Referring to FIG. 1A, the cursor 310 is displayed on the screen of the display 115 according to a pointing position of the control device 200. When the cursor 310 is displayed in a center portion of the screen of the display 115 which is not an edge thereof, the cursor 310 may be a circle shape which is the original form. However, the circular shape of the cursor 310 illustrated in FIG. 1A is exemplary, and it will be obvious to one of ordinary skill in the art that a cursor may have various shapes.

Figure 1B:
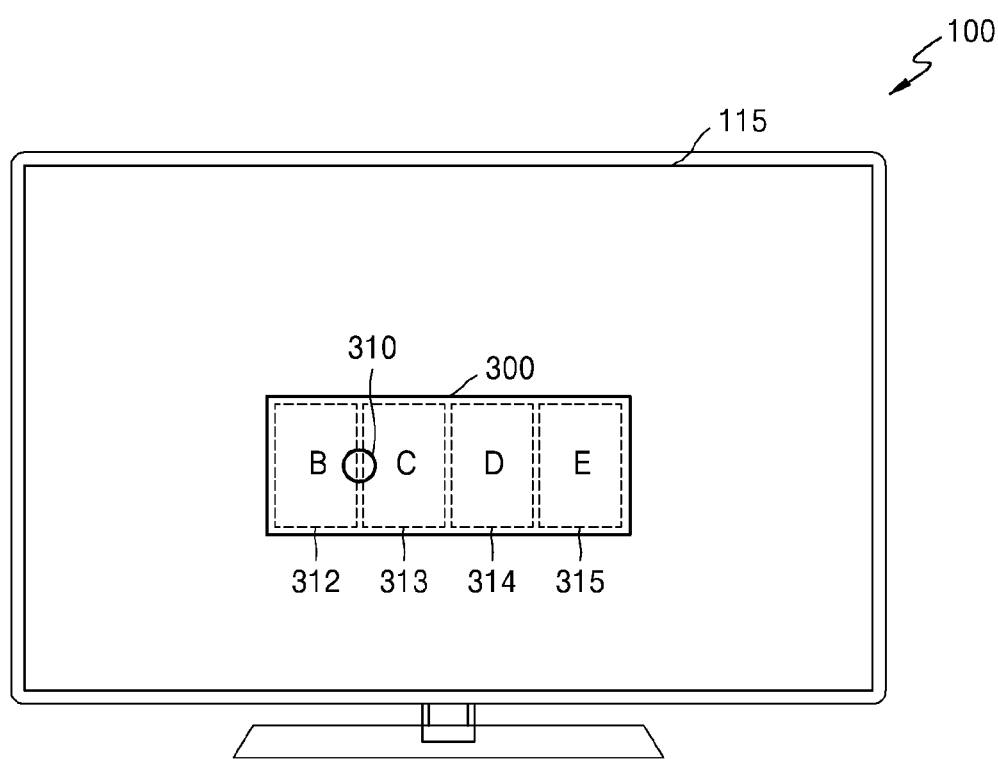
FIG. 1B is a schematic view showing an operation between a display apparatus and a control device according to an exemplary embodiment, in which a cursor is located in a scrolling area arranged in a portion of a display screen.

FIG. 1B is a schematic view showing an operation between a display apparatus 100 and a control device 200 according to an exemplary embodiment, in which a cursor 310 is located in scrolling area 300 arranged in a portion of a display screen.

When the user manipulates the control device 200 to point to the inside of the scrolling area 300 in order to scroll items in the scrolling area 300 by using the control device 200, the cursor 310 is displayed at a position corresponding to a pointing position of the control device 200.

The user may select an item by using the control device 200 or may perform scrolling in order to view scrolling items that are not seen in the scrolling area 300.

Figure 1C:
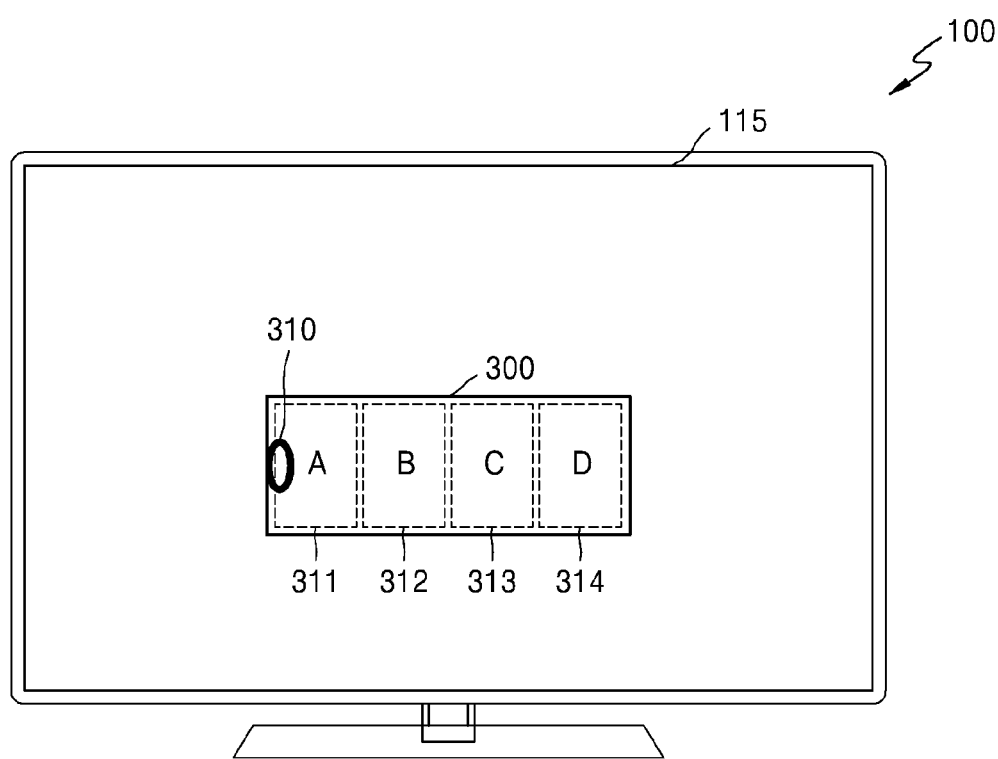
FIG. 1C is a schematic view showing an operation between a display apparatus and a control device according to an exemplary embodiment, in which a cursor has contacted an edge of a scrolling area arranged in a portion of a display screen.

FIG. 1C is a schematic view showing an operation between a display apparatus 100 and a control device 200 according to an exemplary embodiment, in which a cursor 310 has contacted an edge of a scrolling area 300 arranged in a portion of a display screen.

Referring to FIG. 1C, when the cursor 310 contacts the edge of the scrolling area 300 according to a pointing position of the control device 200, the circular shape of the cursor 310 may be deformed to an oval shape. That is, in response to the cursor 310, which corresponds to the pointing position of the control device 200 and has contacted the edge of the scrolling area 300, the display apparatus 100 may display the cursor 310 by deforming the shape of the cursor 310 based on a scrolling distance of the control device 200. If a scrolling distance is relatively short, the display apparatus 100 may display the cursor 310 by deforming the shape of the cursor 310 having a circular shape by a relatively small amount, and if a scrolling distance is relatively great, the display apparatus 100 may output the cursor 310 by deforming the cursor 310 having a circular shape by a relatively great amount. The scrolling distance may correspond to a distance of an actual pointer position measured from the contacted edge of the scrolling area 300.

Figure 1D:
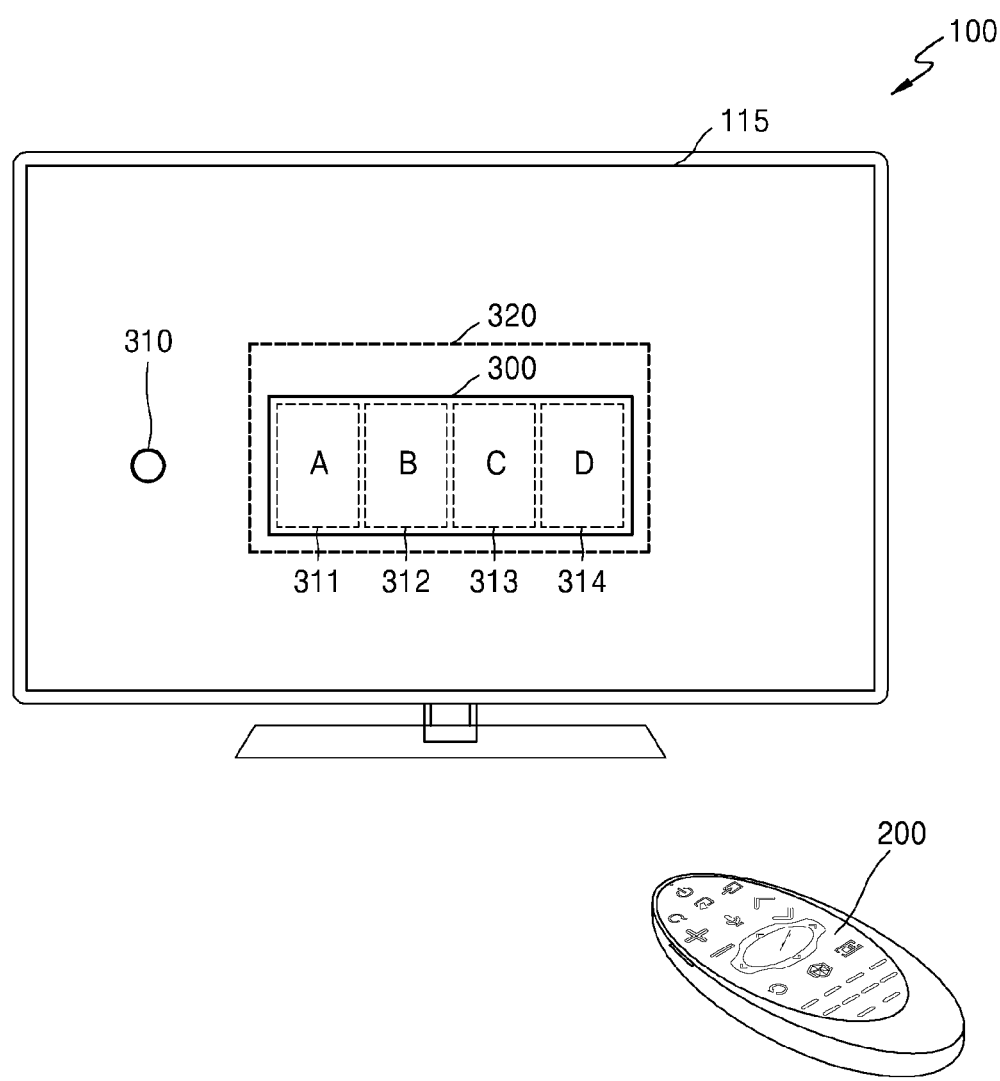
FIG. 1D is a schematic view showing an operation between a display apparatus and a control device according to an exemplary embodiment, in which a pointing position of a control device deviates from a threshold value of a scrolling range of a scrolling area arranged in a portion of a display screen.

FIG. 1D is a schematic view showing an operation between a display apparatus 100 and a control device 200 according to an exemplary embodiment, in which a pointing position of the control device 200 deviates from a threshold value of a scrolling range of the scrolling area 300 arranged in a portion of a display screen. The threshold value of the scrolling range may be referred to as a threshold range 320.

Referring to FIG. 1D, when the pointing position of the control device 200 deviates from the threshold range 320, the display apparatus 100 may control the cursor 310 such that the cursor 310 escapes the scrolling area 300 to be displayed outside the scrolling area 300 with an original form thereof.

Figure 1E:
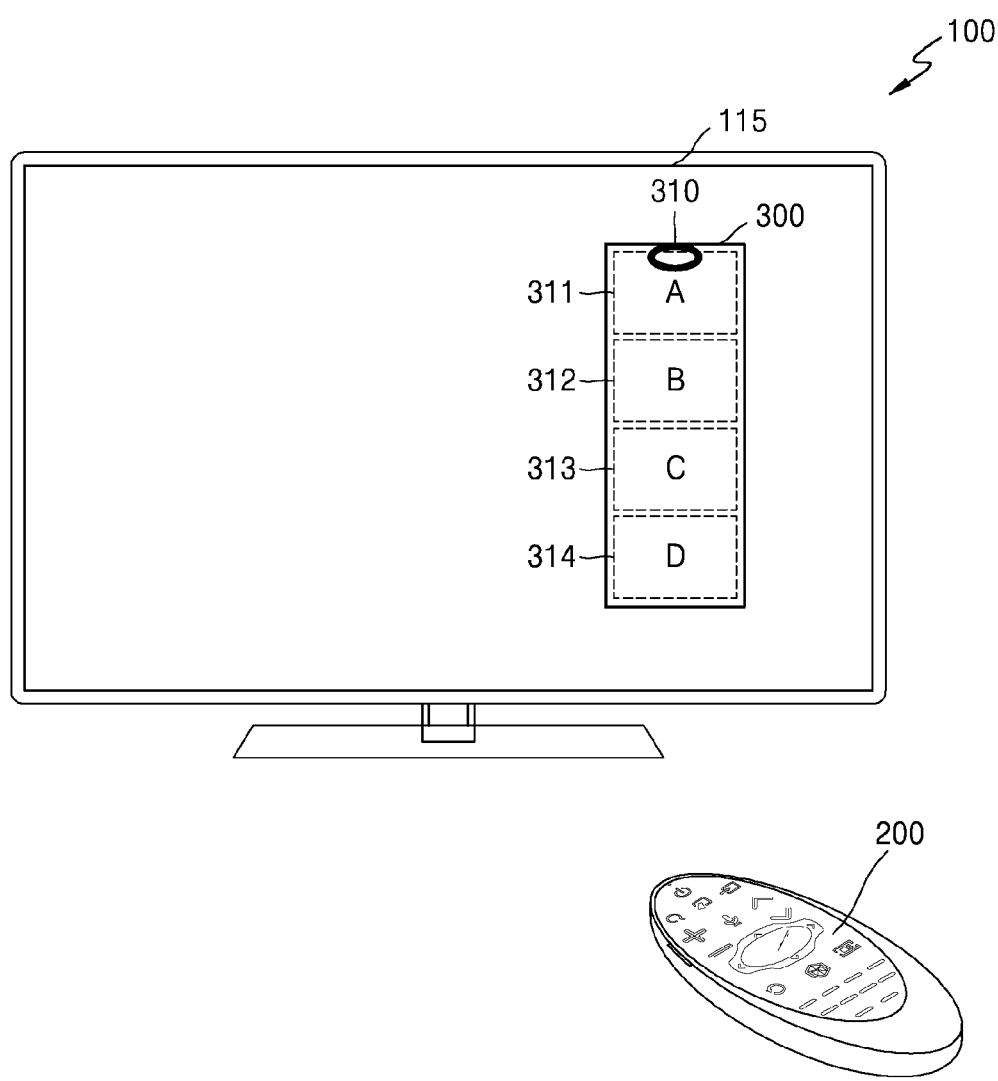
FIG. 1E is a schematic view showing an operation between a display apparatus and a control device according to another exemplary embodiment, in which a cursor has contacted an edge of a scrolling area arranged in a portion of a display screen.

FIG. 1E is a schematic view showing an operation between a display apparatus 100 and a control device 200 according to an exemplary embodiment, in which a cursor 310 has contacted an edge of a scrolling area 300 arranged in a portion of a display screen.

Referring to FIG. 1E, which is similar to FIG. 1C, the difference is that the scrolling area 300 is in a vertical direction. That is, a plurality of scrolling items are vertically arranged. When the cursor 310 has contacted the edge of the scrolling area 300 according to a pointing position of the control device 200, the circular shape of the cursor 310 may be deformed to an oval shape. That is, in response to the cursor 310, which corresponds to the pointing position of the control device 200 and has contacted the edge of the scrolling area 300, the display apparatus 100 may output the cursor 310 by deforming the shape of the cursor 310 based on a scrolling distance of the control device 200. If a scrolling distance is relatively short, the display apparatus 100 may output the cursor 310 by deforming the shape of the cursor 310 by a relatively small amount, and if a scrolling distance is relatively great, the display apparatus 100 may output the cursor 310 by deforming the shape of the cursor 310 by a relatively great amount.

As described above with reference to FIGS. 1A through 1E, when the user moves the pointing position towards the edge of the screen of the display 115 by using the control device 200, the display apparatus 100 may output the cursor 310 by deforming the shape of the cursor 310 based on a scrolling distance of the control device 200, in response to the cursor 310 corresponding to an input of the control device 200 and contacting the edge of the scrolling area 300. By deforming the shape of the cursor 310 according to an input of a user who is performing scrolling, the user may sense the cursor 310 which is a solid element as if it is an object having physical properties and thus experience convenience and intuitive response when performing edge scrolling.

Figure 1F:
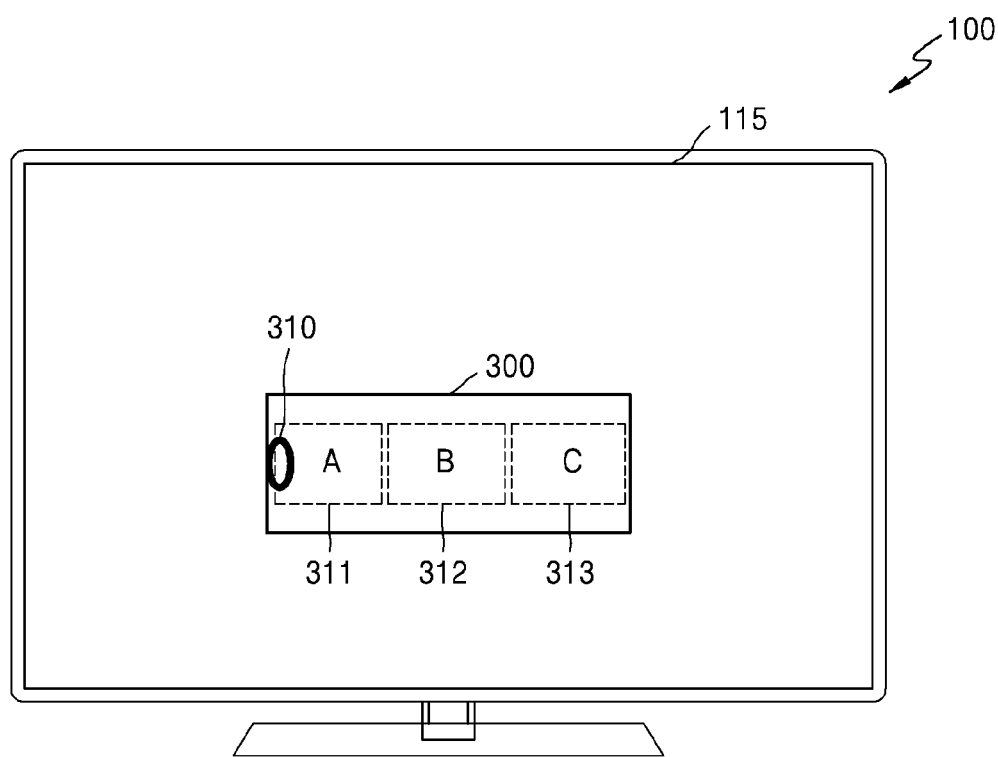
FIG. 1F is a schematic view showing an operation between a display apparatus and a control device according to another exemplary embodiment, in which a cursor is located at an edge of a scrolling area arranged in a portion of a display screen.

FIG. 1F is a schematic view showing an operation between a display apparatus 100 and a control device 200 according to an exemplary embodiment, in which a cursor 310 is located at an edge of a scrolling area 300 arranged in a portion of a display screen.

As described above, when the user moves a pointing position to the edge of the scrolling area 300 arranged in a portion of the display screen by using the control device 200 so as to reach an end of a scrolling list, the display apparatus 100 may output scrolling items by deforming the shape the of scrolling items. That is, the display apparatus 100 may deform the scrolling items displayed in the scrolling area 300 to be different from the original forms thereof and output the deformed scrolling items. Referring to FIG. 1F, items displayed in the scrolling area 300 arranged in the screen of the display 115 have a lower height and a broader width than the scrolling items illustrated in FIG. 1C. As a width of each item is increased, four scrolling items, the scrolling items 311 to 314 are displayed, whereas three scrolling items, the scrolling items 311 to 313, are displayed in the scrolling area 300 in FIG. 1F. Also, when deforming the shape of scrolling items, only a height thereof may be modified, or only a width thereof may be modified.

When the user intends to further scroll from the end of the scrolling list, the user may output the scrolling items by deforming the shape of the scrolling items so that the user may spontaneously recognize that the end of the scrolling list is reached.

Figure 2:
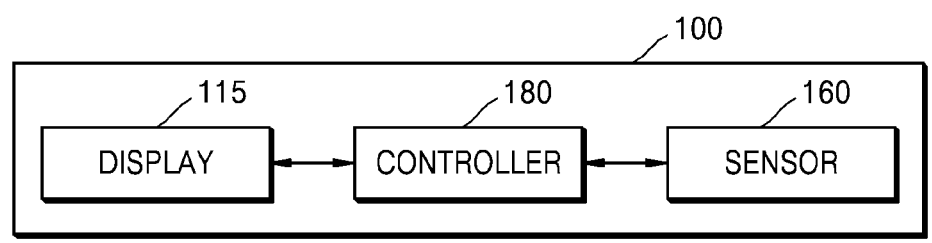
FIG. 2 is a block diagram of a display apparatus according to an exemplary embodiment.

FIG. 2 is a block diagram of the display apparatus 100 according to an exemplary embodiment.

Referring to FIG. 2, the display apparatus 100 includes the display 115, a controller 180, and a sensor 160.

According to an exemplary embodiment, the display 115 outputs a cursor according to an input of the control device 200 according to control of the controller 180.

According to an exemplary embodiment, the display 115 deforms a shape of a cursor based on a scrolling distance of the control device 200, in response to the cursor contacting an edge of a scrolling area of a screen of the display 115 according to control of the controller 180.

According to an exemplary embodiment, the display 115 displays a cursor or a scrolling area by adding visual effects to the cursor or the scrolling area based on a scrolling distance of the control device 200 in response to the cursor contacting an edge of a scrolling area according to control of the controller 180.

According to an exemplary embodiment, the display 115 outputs scrolling items by deforming the shape of the scrolling items displayed in a scrolling area, in response to a pointing position of the control device 200 reaching an end of a scrolling list.

According to an exemplary embodiment, the sensor 160 may sense a signal corresponding to a pointing position of the control device 200 according to control of the controller 180.

The controller 180 may receive a signal corresponding to the pointing position of the control device 200 received via the sensor 160 and control the display 115 to display a cursor or a scrolling area by determining a shape and a position of the cursor according to the signal corresponding to the pointing position or by adding visual effects to the scrolling area.

The controller 180 may receive a signal corresponding to a pointing position of the control device 200 via the sensor 160 and control the display 115 to output a scrolling item by deforming a shape of the scrolling item based on the signal corresponding to the pointing position.

Figure 3:
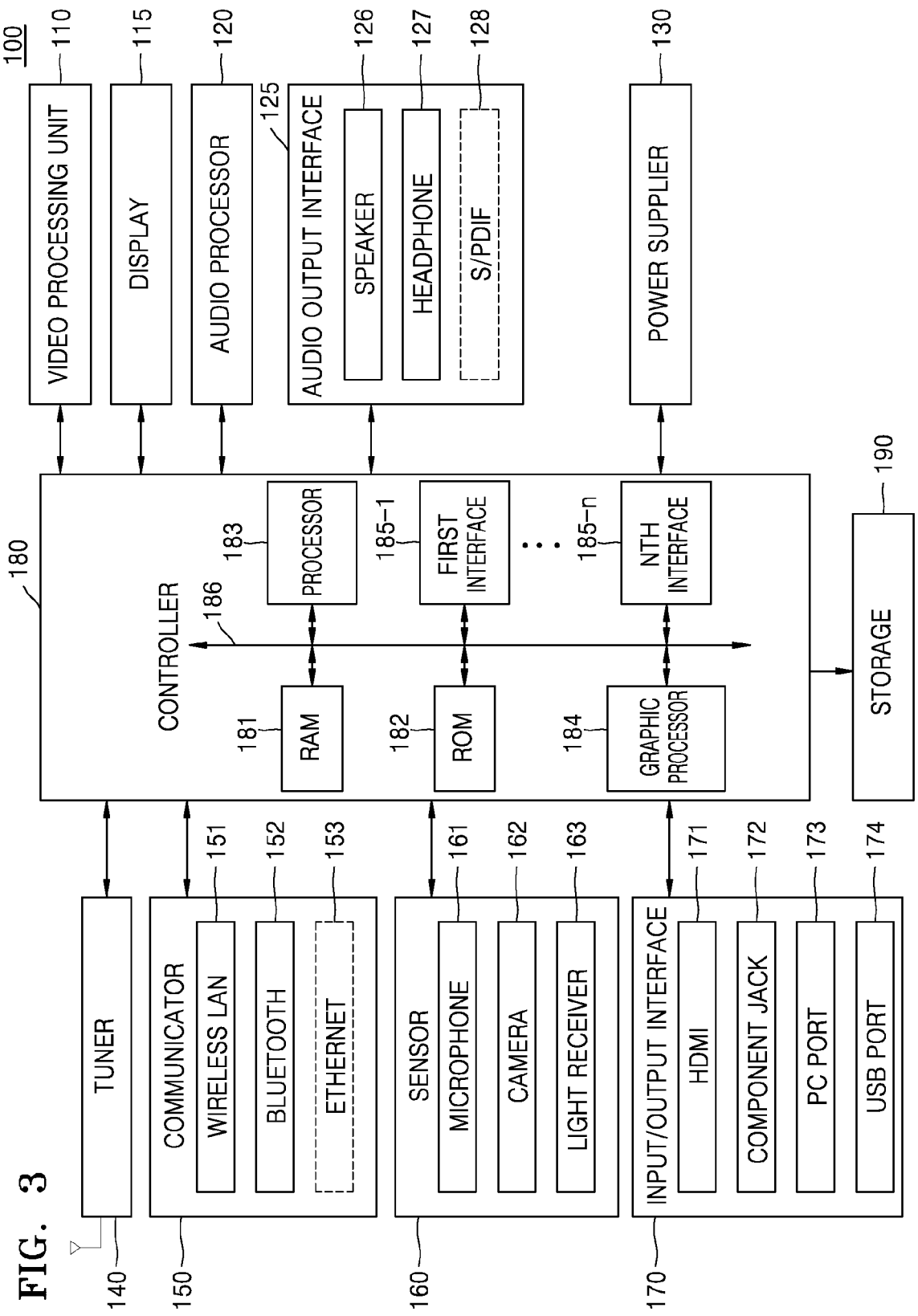
FIG. 3 is a block diagram of a detailed structure of the display apparatus of FIG. 2 according to an exemplary embodiment.

FIG. 3 is a block diagram of a detailed structure of the display apparatus 100 according to an exemplary embodiment.

Referring to FIG. 3, the display apparatus 100 includes a video processor 110, the display 115, an audio processor 120, the audio output interface 125, a power supplier 130, a tuner 140, a communicator 150, the sensor 160, an input/output interface 170, the controller 180, and a storage 190.

The video processor 110 processes video data that is received by the display apparatus 100. The video processor 110 may perform various image processing operations, such as decoding, scaling, noise filtering, frame rate transformation, and resolution transformation, on video data.

According to an exemplary embodiment, when the display 115 is provided with a multi-window screen image including a plurality of windows, and videos corresponding to pieces of content are respectively output to the plurality of windows, the video processor 110 may process the videos corresponding to the pieces of content by using a plurality of video processing modules.

The display 115 displays video included in a broadcasting signal received via the tuner 140 on the screen thereof, according to control of the controller 180. The display 115 may also display content (for example, a video) that is input via the communicator 150 or the input/output interface 170.

The display 115 may output an image stored in the storage 190 according to control of the controller 180. The display 115 may also display a voice user interface (UI) (e.g., including a voice command word guide) for performing a voice recognition task corresponding to voice recognition, or a motion UI (e.g., including a user motion guide for motion recognition) for performing a motion recognition task corresponding to motion recognition.

The display 115 may display a cursor on a screen thereof according to an input of the control device 200 according to control of the controller 180.

The display 115 may output a cursor or a scrolling area by adding visual effects to the cursor or the scrolling area in response to the cursor contacting an edge of the scrolling area according to control of the controller 180.

According to an exemplary embodiment, the display 115 may add visual effects to a cursor by deforming the shape of the cursor.

According to an exemplary embodiment, the shape of the cursor may be geometrical.

According to an exemplary embodiment, the shape of the cursor is circular, and the modified shape of the cursor may be an oval shape.

According to an exemplary embodiment, when a scrolling direction of the control device 200 is horizontal, the display 115 may deform the cursor to an oval shape having a long vertical length and output the deformed cursor according to control of the controller 180, and when a scrolling direction of the control device 200 is vertical, the display 115 may deform the cursor to an oval shape having a long horizontal length and output the deformed cursor according to control of the controller 180.

Also, according to an exemplary embodiment, the display 115 may output a scrolling area in which a plurality of scrolling items are arranged, on a screen thereof according to control of the controller 180.

According to an exemplary embodiment, the display 115 may restore a cursor or a scrolling area that has been displayed by adding visual effects to the cursor or the scrolling area, to its original form, when a scrolling distance exceeds a threshold value of a scrolling range according to control of the controller 180.

According to an exemplary embodiment, the display 115 may output a scrolling area by adding visual effects to the scrolling area by deforming an edge of the scrolling area such that a motion of pulling the edge of the scrolling area towards a pointing position of the control device 200 is expressed, according to control of the controller 180.

According to an exemplary embodiment, the display 115 may display a cursor at a position defined on a vector oriented from a point in a scrolling area toward a pointing position of the control device 200, according to control of the controller 180.

According to an exemplary embodiment, the display 115 may display a geometrical figure including, as a vertex, a position defined on a vector oriented from a point in a scrolling area toward a pointing position of the control device 200, and as a side, an edge of the scrolling area, according to control of the controller 180.

According to an exemplary embodiment, the display 115 may display the geometrical figure by coloring the geometrical figure according to control of the controller 180.

Also, according to an exemplary embodiment, the display 115 may deform the shape of a scrolling item based on a scrolling distance and output the scrolling item in response to a cursor reaching an end of a scrolling list according to control of the controller 180.

According to an exemplary embodiment, the display 115 may deform at least one of a height and a width of a scrolling item and output the scrolling item according to control of the controller 180.

According to an exemplary embodiment, the display 115 may change at least one of a transparency, a color value, a luminosity, and a chroma of a scrolling item and output the scrolling item according to control of the controller 180.

The audio processor 120 processes audio data. The audio processor 120 may perform various processing operations, such as decoding, amplification, or noise filtering, on the audio data. The audio processor 120 may include a plurality of audio processing modules to process pieces of audio corresponding to a plurality of pieces of content.

The audio output interface 125 outputs audio included in a broadcasting signal received via the tuner 140, according to control of the controller 180. The audio output interface 125 may also output audio (for example, a voice or a sound) that is input via the communicator 150 or the input/output interface 170. The audio output interface 125 may also output audio stored in the storage 190 according to control of the controller 180. The audio output interface 125 may include at least one selected from a speaker 126, a headphone output port 127, and a Sony/Philips Digital Interface (S/PDIF) output port 128. The audio output interface 125 may include a combination of the speaker 126, the headphone output port 127, and the S/PDIF output port 128.

According to an exemplary embodiment, the audio output interface 125 may output a predetermined sound effect in response to a cursor corresponding to an input of the control device 200 and contacting an edge of a screen, according to control of the controller 180.

The power supplier 130 supplies power that is input from an external power source, to the internal components 110-190 of the display apparatus 100, according to control of the controller 180. The power supplier 130 may also supply power that is output by one or more batteries located in the display apparatus 100, to the internal components 110-190 of the display apparatus 100, according to control of the controller 180.

The tuner 140 may tune and select only a frequency of a channel via which the display apparatus 100 is to receive a wired or wireless broadcasting signal from among various radio wave components via amplification, mixing, resonance, or the like. The broadcasting signal includes audio, video, and additional information (for example, an electronic program guide (EPG)).

The tuner 140 may receive a broadcasting signal in a frequency band corresponding to a channel number (for example, cable broadcasting No. 506) according to a user input (for example, a control signal received from the control device 200, for example, a channel number input, a channel up-down, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the storage 190 according to control of the controller 180.

The display apparatus 100 may include a single tuner 140 or a plurality of tuners 140. According to an exemplary embodiment, when a plurality of tuners 140 are included, the plurality of tuners 140 may output a plurality of broadcasting signals to the plurality of windows included in the multi-window screen image provided to the display 115.

The tuner 140 may be integrated with the display apparatus 100, or implemented as a separate apparatus (for example, a tuner that is connected to a set-top box and the input/output interface 170) having a tuner that is electrically connected to the display apparatus 100.

The communicator 150 may connect the display apparatus 100 to an external apparatus (for example, an audio apparatus) according to control of the controller 180. The controller 180 may transmit/receive content to/from the external apparatus connected via the communicator 150, download an application from the external apparatus, or perform web-browsing. The communicator 150 may include a wireless local area network (LAN) 151, a Bluetooth 152, or a wired Ethernet 153 in correspondence to a performance and a structure of the display apparatus 100. The communicator 150 may include a combination of the wireless LAN 151, the Bluetooth 152, and the wired Ethernet 153. The communicator 150 may receive a control signal of the control device 200 according to control of the controller 180. The control signal may be implemented as a Bluetooth type, a radio frequency (RF) signal type, or a Wi-Fi type signal.

The communicator 150 may further include short-range communication (for example, near field communication (NFC), or Bluetooth low energy (BLE)), instead of the Bluetooth 152.

The sensor 160 senses a voice of a user, an image of the user, or an interaction with the user.

A microphone 161 receives a voice of the user. The microphone 161 may transform the received voice into an electrical signal and output the electrical signal to the controller 180. The user voice may include, for example, a voice corresponding to a menu or function of the display apparatus 100. A recognition range of the microphone 161 may be recommended to be within four meters from the microphone 161 to a location of the user, and may vary in correspondence to the magnitude of the voice of the user and a surrounding environment (for example, a speaker sound or ambient noise).

The microphone 161 may be integrated with or separate from the display apparatus 100. The separated microphone 161 may be electrically connected to the display apparatus 100 via the communicator 150 or the input/output interface 170.

It will be easily understood by one of ordinary skill in the art that the microphone 161 may be excluded according to the performance and structure of the display apparatus 100.

A camera 162 receives an image (for example, consecutive frames) corresponding to a motion of the user including a gesture within a recognition range of the camera 162. For example, the recognition range of the camera 162 may be a distance within 0.1 to 5 m from the camera 162 to the user. The motion of the user may include a part of the body of the user or a motion or the like of the part of the user, such as the face, a facial expression, the hand, the fist, and a finder of the user. The camera 162 may convert a received image into an electrical signal according to control of the controller 180 and output the electrical signal to the controller 180.

The controller 180 may select a menu that is displayed on the display apparatus 100 by using a result of the recognition of the received motion, or perform control corresponding to the result of the motion recognition. For example, the control may be channel change, volume adjustment, or indicator movement.

The camera 162 may include a lens and an image sensor. The camera 162 may support optical zoom or digital zoom by using a plurality of lenses and image processing. The recognition range of the camera 162 may be variously set according to the angle of the camera 162 and a surrounding environment conditions. When the camera 162 includes a plurality of cameras, a three-dimensional (3D) still image or a 3D motion may be received by the plurality of cameras.

The camera 162 may be integrated with or separate from the display apparatus 100. A separate device including the separate camera 162 may be electrically connected to the display apparatus 100 via the communicator 150 or the input/output interface 170.

It will be easily understood by one of ordinary skill in the art that the camera 162 may be excluded according to the performance and structure of the display apparatus 100.

A light receiver 163 receives an optical signal (including a control signal) from the control device 200 via a light window of the bezel of the display 115. The light receiver 163 may receive an optical signal corresponding to a user input (for example, touch, depression, a touch gesture, a voice, or a motion) from the control device 200. A control signal may be extracted from the received optical signal according to control of the controller 180.

According to an exemplary embodiment, the light receiver 163 may receive a signal corresponding to a pointing position of the control device 200 and transmit the signal to the controller 180.

The input/output interface 170 receives video (for example, a moving picture), audio (for example, a voice or music), and additional information (for example, an EPG) from outside the display apparatus 100 according to control of the controller 180. The input/output interface 170 may include a High-Definition Multimedia Interface (HDMI) port 171, a component jack 172, a PC port 173, or a USB port 174. The input/output interface 170 may include a combination of the HDMI port 171, the component jack 172, the PC port 173, and the USB port 174.

It will be easily understood by one of ordinary skill in the art that the structure and operation of the input/output interface 170 may be variously implemented according exemplary embodiments.

The controller 180 controls an overall operation of the display apparatus 100 and signal transfer among the internal components 110-190 of the display apparatus 100 and process data. When there is an input of a user or stored preset conditions are satisfied, the controller 180 may execute an operating system (OS) and various applications that are stored in the storage 190.

The controller 180 may include random-access memory (RAM) 181 that stores a signal or data input by an external source of the display apparatus 100 or is used as a memory area for various operations performed by the display apparatus 100, read-only memory (ROM) 182 that stores a control program for controlling the display apparatus 100, and a processor 183.

The processor 183 may include a graphics processing unit for performing video graphics processing. The processor 183 may be implemented by using a System On Chip (SoC) into which a core and a GPU are incorporated. The processor 183 may include a single core processor, a dual-core processor, a triple-core processor, a quad-core processor, or a multi-core processor.

The processor 183 may include a plurality of processors. For example, the processor 183 may be implemented by using a main processor and a sub-processor operating in a sleep mode.

A graphics processor 184 generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on the user interaction sensed by the sensor 160. The rendering unit generates screen images of various layouts including objects, based on the attribute values calculated by the arithmetic unit. The screen images generated by the rendering unit are displayed on a display area of the display 115.

According to an exemplary embodiment, the graphic processor 184 may generate a cursor to be displayed on a screen to correspond to an input of the control device 200 according to control of the controller 180.

According to an exemplary embodiment, the graphic processor 184 may add visual effects to a cursor based on a scrolling distance of the control device 200 according to control of the controller 180.

According to an exemplary embodiment, the graphic processor 184 may set the shape of the cursor to a geometrical shape, for example, a circular shape and set a deformed shape of the cursor to an oval shape, according to control of the controller 180.

According to an exemplary embodiment, the graphic processor 184 may add visual effects to a scrolling area based on a scrolling distance of the control device 200 according to control of the controller 180.

According to an exemplary embodiment, the graphic processor 184 may generate a scrolling list in which a plurality of scrolling items are arranged, according to control of the controller 180.

According to an exemplary embodiment, the graphic processor 184 may deform the shape of scrolling items in response to the cursor reaching an end of the scrolling list according to control of the controller 180.

First through n-th interfaces 185-1 through 185-*n* are connected to the above-described components of the display apparatus 100. One of the first through n-th interfaces 185-1 through 185-*n* may be a network interface that is connected to an external apparatus via a network.

The RAM 181, the ROM 182, the processor 183, the graphics processor 184, and the first through n-th interfaces 185-1 through 185-*n* may be connected to one another via an internal bus 186.

The term "a controller of a display apparatus" used in the present exemplary embodiment includes the processor 183, the ROM 182, and the RAM 181.

The controller 180 may receive pointing position information of the control device 200 via at least one of the light receiver 163 receiving output light and a panel key located on a lateral or rear surface of the display apparatus 100.

According to an exemplary embodiment, the controller 180 may control the display 115 to display a cursor on a screen according to an input of the control device 200 and to display the cursor or a scrolling area by adding visual effects to the cursor or the scrolling area based on a scrolling distance of the control device 200 in response to the cursor contacting the edge of the scrolling area.

According to an exemplary embodiment, the controller 180 may determine a scrolling distance based on a distance difference between an actual pointing position indicated by the control device 200 and a position of the cursor contacting an edge of a scrolling area.

According to an exemplary embodiment, the controller 180 may control the display 115 to display a cursor by deforming the shape of a cursor, which is originally circular, to an oval shape based on a scrolling distance. In other words, the cursor becomes an ellipse when the distance difference is greater than zero. The eccentricity of the ellipse may be greater than zero but less than 1, and the eccentricity may be in direct proportion to the distance difference.

According to an exemplary embodiment, when a scrolling direction of the control device is determined as horizontal, the controller 180 may deform a cursor to a horizontally long oval shape, and when a scrolling direction of the control device is determined as vertical, the controller 180 may control the display 115 such that the cursor is deformed to a horizontally long oval shape.

According to an exemplary embodiment, the controller 180 may determine a scrolling speed based on a scrolling distance.

According to an exemplary embodiment, the controller 180 may control the display 115 to restore a cursor or a scrolling area that has been output by adding the above visual effects, to its original form if a scrolling distance exceeds a threshold value of a scrolling range.

According to an exemplary embodiment, the controller 180 may control the display 115 such that visual effects are added to the scrolling area by deforming an edge of the scrolling area so that a motion of pulling the edge of the scrolling area toward a pointing position of a control device is expressed.

According to an exemplary embodiment, the controller 180 may control the display 115 to display the cursor at a position defined on a vector oriented from a point in a scrolling area toward a pointing position of the control device.

According to an exemplary embodiment, the controller 180 may control the display 115 to display a geometrical figure, which includes, as a vertex, a position defined on a vector oriented from a point in a scrolling area toward a pointing position of the control device, and as a side, the edge of the scrolling area.

According to an exemplary embodiment, the controller 180 may control the display 115 to display the geometrical figure by coloring the geometrical figure.

According to an exemplary embodiment, the controller 180 may control the display 115 to display a scrolling area displaying at least some of scrolling items and to display the scrolling items by deforming the shape of the scrolling items based on a scrolling distance in response to a cursor corresponding to an input of a control device and reaching an end of a scrolling list.

According to an exemplary embodiment, the controller 180 may deform at least one of a height and a width of a scrolling item.

According to an exemplary embodiment, the controller 180 may modify at least one of a transparency, a color value, a luminosity, and a chroma of a scrolling item.

According to an exemplary embodiment, if a scrolling distance is determined as deviating from a threshold value, the controller 180 may restore the shape of a scrolling item to its original form.

According to an exemplary embodiment, the controller 180 may control the display 115 to provide a scrolling area in which a plurality of scrolling items are horizontally arranged, to a screen, perform horizontal scrolling according to horizontal scrolling of a control device, and perform vertical scrolling based on detection of vertical scrolling on one of the plurality of scrolling items by a control device.

According to an exemplary embodiment, the controller 180 may control the display 115 to provide a scrolling area in which a plurality of scrolling items are vertically arranged, to a screen, perform vertical scrolling according to vertical scrolling of a control device, and perform horizontal scrolling based on detection of horizontal scrolling on one of the plurality of scrolling items by a control device.

It will be easily understood by one of ordinary skill in the art that the structure and operation of the controller 180 may be variously implemented according exemplary embodiments.

The storage 190 may store various data, programs, or applications for driving and controlling the display apparatus 100 according to control of the controller 180. The storage 190 may store input/output signals or data corresponding to driving of the video processor 110, the display 115, the audio processor 120, the audio output interface 125, the power supplier 130, the tuner 140, the communicator 150, the sensor 160, and the input/output interface 170. The storage 190 may store a control program for controlling the display apparatus 100 and the controller 180, an application initially provided by a manufacturer or downloaded from outside the display apparatus 100, a graphical user interface (GUI) associated with the application, objects (for example, an image text, an icon, and a button) for providing the GUI, user information, a document, databases, or related pieces of data.

According to an exemplary embodiment, the term "storage" includes the storage 190, the ROM 182, and the RAM 181 of the controller 180, or a memory card (e.g., a micro SD card or a USB memory) mounted in the display apparatus 100. The storage 190 may include a non-volatile memory, a volatile memory, a hard disk drive (HDD), or a solid state drive (SSD).

The storage 190 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB. These modules and DBs of the storage 190 may be implemented as software in order to perform a broadcasting reception control function, a channel control function, a volume control function, a communication control function, a voice recognition function, a motion recognition function, a light receiving control function, a display control function, an audio control function, an external input control function, a power control function, or a power control function of the wirelessly (for example, Bluetooth) connected external apparatus. The controller 180 may perform these functions by using the software stored in the storage 190.

According to an exemplary embodiment, the storage 190 may store user setting information received via one of the light receiver 163, a panel key, the microphone 161, and the camera 162. User setting may include user setting regarding a degree of deformation of a cursor and user setting regarding a degree of deformation of a scrolling item.

The storage 190 may store a video or an image corresponding to visual feedback.

The storage 190 may store a sound corresponding to auditory feedback.

The storage 190 may include a presentation module. A presentation module is a module used to configure a display screen. A presentation module includes a multimedia module replaying multimedia content and outputting the same, a user interface (UI), and a UI rendering module performing graphic processing. The multimedia module may include a player module, a camcorder module, a sound processing module, or the like. The multimedia module replays various multimedia contents to generate and reproduce screens and sounds. The UI rendering module may include an image compositor module combining images, a coordinates combination module combining and generating coordinates on a screen on which an image is to be played, a X11 module receiving various events from hardware, a two-dimensional/three-dimensional (2D/3D) UI tool kit providing a tool for configuring a 2D or 3D UI.

The display apparatus 100 having the display 115 may be electrically connected to an external apparatus (for example, a set-top box) having a tuner. For example, the display apparatus 100 may be implemented by using an analog TV, a digital TV, a three-dimensional (3D) TV, a smart TV, a light emitting diode (LED) TV, an organic LED (OLED) TV, a plasma TV, a monitor, or the like, but it will be easily understood by one of ordinary skill in the art that exemplary embodiments are not limited thereto.

The display apparatus 100 may include a sensor (for example, an illuminance sensor or a temperature sensor) for detecting an internal or external state of the display apparatus 100.

At least one of the components (for example, the components 110-190) of the display apparatus 100 of FIG. 3 may be added or deleted according to the performance of the display apparatus 100. It will also be easily understood by one of ordinary skill in the art that the locations of the components (for example, the components 110-190) of the display apparatus 100 of FIG. 3 may be changed according to the performance or structure of the display apparatus 100.

Figure 4A:
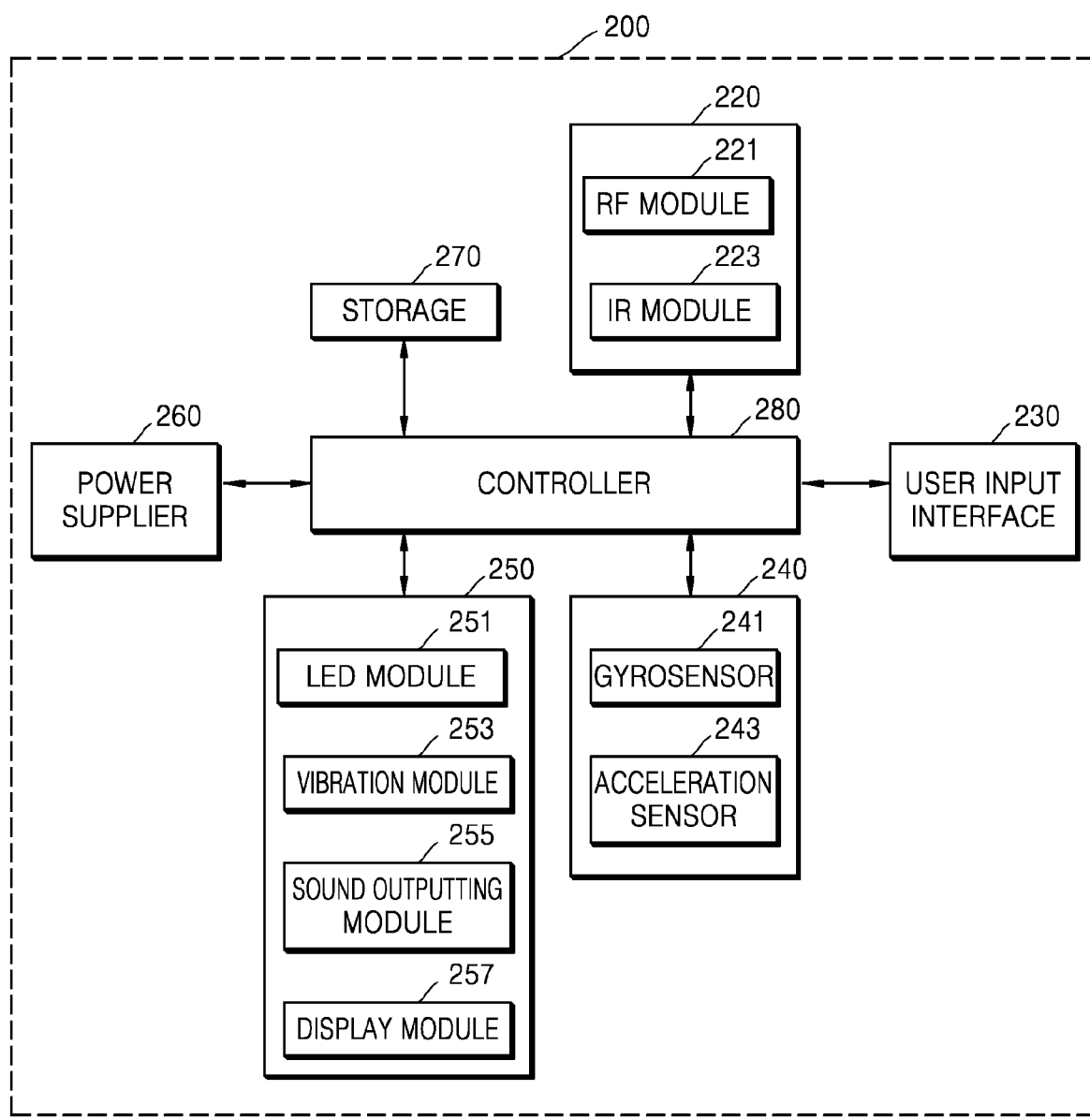
FIGS. 4A through 4D illustrate a structure of a control device according to an exemplary embodiment.

FIG. 4A is a structural block diagram of a control device 200 according to an exemplary embodiment.

Referring to FIG. 4A, the control device 200 may include a wireless communicator 220, a user input interface 230, a sensor 240, an output interface 250, a power supplier 260, a storage 270, and a controller 280.

The wireless communicator 220 may transmit or receive a signal with the above-described display apparatuses. The wireless communicator 220 may include an radio frequency (RF) module 221 capable of transmitting or receiving a signal to or from the display apparatus 100 according to RF communication standards. Also, the control device 200 may include an infrared (IR) module capable of transmitting and receiving a signal to or from the display apparatus 100 according to IR communication standards.

According to the present exemplary embodiment, the control device 200 transmits a signal containing information about, for example, movement of the control device 200 to the display apparatus 100 via the RF module 221.

Also, the control device 200 may receive a signal transmitted by the display apparatus 100 via the RF module 221. Also, the control device 200 may transmit a command regarding power on/off, channel change, volume change or the like to the display apparatus 100 via the IR module 223 according to necessity.

The user input interface 230 may be implemented using a keypad, a button, a touch pad, or a touch screen. A user may input a command about the display apparatus 100 to the control device 200 by manipulating the user input interface 230. When the user input interface 230 includes a hard key button, the user may input a command about the display apparatus 100 to the control device 200 via a push operation of the hard key button. When the user input interface 230 includes a touch screen, the user may touch a soft key of the touch screen to input a command about the display apparatus 100 to the control device 200.

Figure 4B:
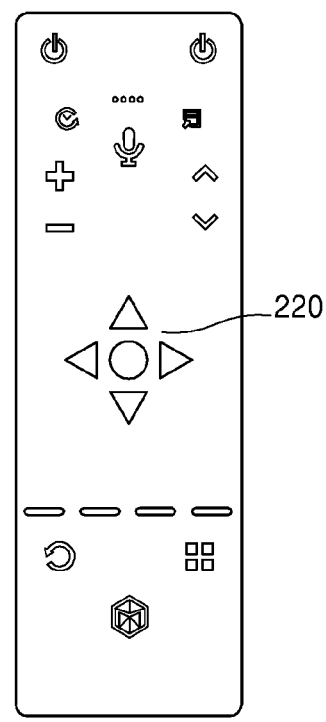

For example, the user input interface 230 may include four-direction buttons or four-direction keys 201 like a control device 200a illustrated in FIG. 4B. The four-direction buttons or four direction-keys 201 may be used to control a window, an area, an application, or an item displayed on the display 115. The four-direction buttons or four direction-keys 201 may be used in indicating upward or downward movement or movement to the left or right. Also, the user input interface 230 may include two-direction keys or two-direction buttons instead of four-direction keys or four-direction buttons as is obvious to one of ordinary skill in the art.

Also, the user input interface 230 may include various types of input units that a user may manipulate, such as a scroll key or a jog key.

Figure 4C:
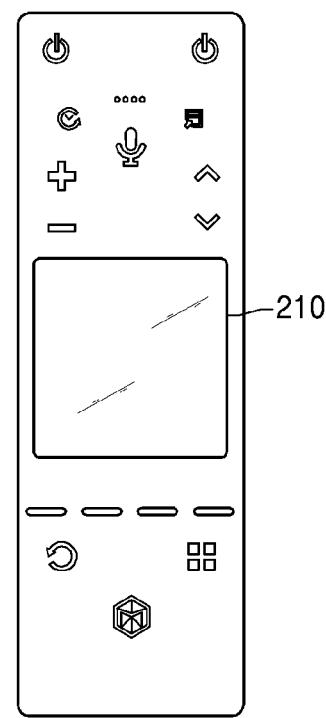

Also, the user input interface 230 may include a touch pad 210 mounted on a control device 200b as illustrated in FIG. 4C. The user input interface 230 according to an exemplary embodiment may receive a user input indicating, for example, a drag, a touch or a flip via a touch pad of the control device 200. Also, the display apparatus 100 may be controlled according to the type of the received user input (e.g., a direction in which a drag command is input or a time when a touch command is input).

The sensor 240 may include a gyro sensor 241 or an acceleration sensor 243. The gyrosensor 241 may sense information about a movement of the control device 200. For example, the gyrosensor 241 may sense information about an operation of the control device 200 with respect to x, y, and z axes. The acceleration sensor 243 may sense information about a movement speed of the control device 200. The sensor 240 may further include a distance measuring sensor to sense a distance with respect to the display apparatus 100.

Figure 4D:
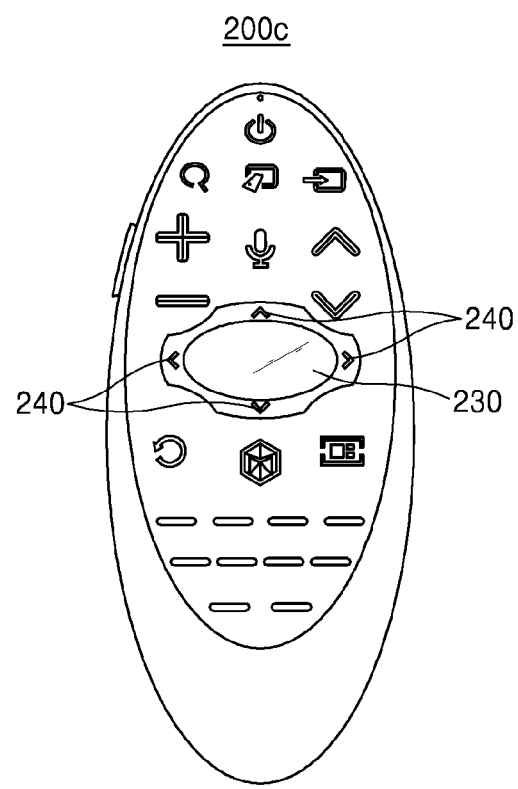

Referring to FIG. 4D, a control device 200c according to an exemplary embodiment may be implemented using a pointing device including both a four-direction key 204 and a touch pad 230. That is, when the control device 200 is implemented using a pointing device, a function of the display apparatus 100 may be controlled based on a direction in or an angle at which the control device 200 is inclined by using the gyrosensor 241.

The output interface 250 may output an image or a voice signal corresponding to manipulation by the user input interface 230 or to a signal received by the display apparatus 100. A user may recognize via the output interface 250 whether the user input interface 230 is manipulated or whether the display apparatus 100 is controlled.

For example, the output interface 250 may include a LED module 251 that is turned on when the user input interface 230 is manipulated or when a signal is transmitted or received to or from the display apparatus 100 via the wireless communicator 220, a vibration module 253 generating vibration, a sound outputting module 255 outputting a sound, or a display module 257 outputting an image.

The power supplier 260 supplies power to the control device 200. The power supplier 260 may stop supplying power when the control device 200 does not move for a predetermined period of time, and thereby may prevent power from being wasted. The power supplier 260 may resume power supply when a predetermined key included in the control device 200 is manipulated.

The storage 270 may store various types of programs, application data or the like needed in controlling or operating the control device 200.

The controller 280 controls an overall control operation of the control device 200. The controller 280 may transmit a signal corresponding to manipulation of a predetermined key of the user input interface 230 or a signal corresponding to movement of the control device 200 sensed by using the sensor 240 to the display apparatus 100 via the wireless communicator 220.

The display apparatus 100 may include a coordinate value calculator that calculates coordinate values of a cursor corresponding to an operation of the control device 200.

The coordinate value calculator may correct handshake or an error contained in a signal corresponding to a sensed operation of the control device 200 to calculate coordinate values (x, y) of a cursor to be displayed on the display 115.

Also, a transmission signal of the control device 200 sensed by the sensor 240 is transmitted to the controller 180 of the display apparatus 100. The controller 180 may determine information about an operation of the control device 200 and key manipulation from a signal transmitted by the control device 200 and may control the display apparatus 100 based on the information.

Alternatively, the control device 200 may calculate a coordinate value of a cursor corresponding to an operation of the control device 200 and transmit the coordinate value to the display apparatus 100. In this case, the display apparatus 100 may transmit a received coordinate value of a pointer to the controller 180 without correcting a handshake or an error.

According to an exemplary embodiment, a user may control a position of a cursor displayed on a screen of a display by using, for example, a directional key, a touch pad, or a pointing function.

Also, according to an exemplary embodiment, a user may control a degree of deformation of a cursor or a scrolling item displayed on a screen of a display by using a directional key, a touch pad, a pointing function or the like of the control device 200.

Figure 5:
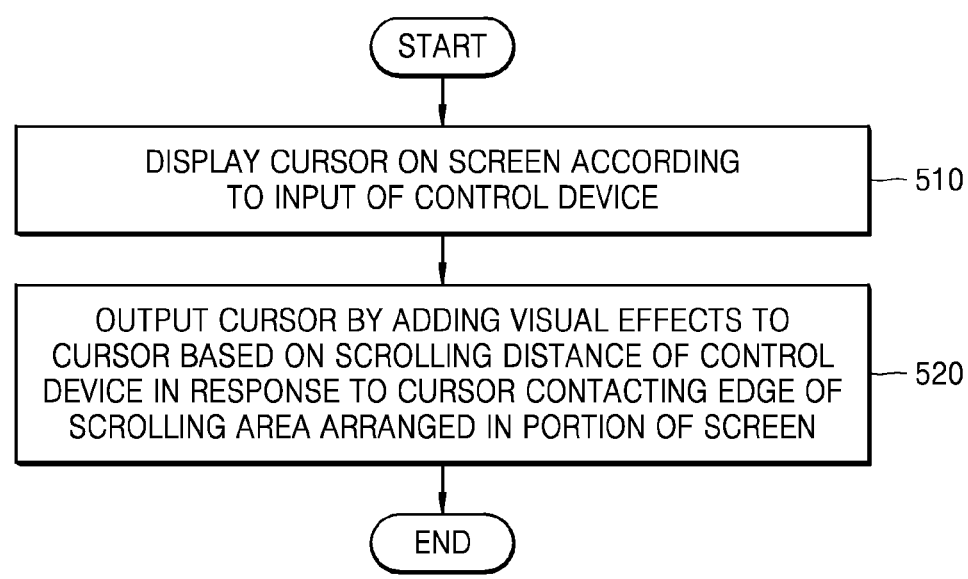
FIG. 5 is a flowchart of a display method performed in a display apparatus, according to an exemplary embodiment.

FIG. 5 is a flowchart of a display method performed in a display apparatus 100, according to an exemplary embodiment.

Referring to FIG. 5, in operation 510, the display apparatus 100 displays a cursor on a screen of a display according to an input of the control device 200.

Referring to FIGS. 3 and 4A through 4D, when a user indicates a position on a screen of the display 115 of the display apparatus 100 by using the control device 200, which is implemented by, for example, a pointing device, the sensor 160 of the display apparatus 100 may receive an input signal corresponding to the position indicated by the control device 200 and calculates coordinates on a screen on which the cursor is to be output according to the received input signal. Also, the controller 180 controls the display 115 to display the cursor 310 at the calculated position on the screen.

Next, referring to FIG. 5, in operation 520, the display apparatus 100 outputs the cursor by adding visual effects to the cursor based on a scrolling distance of the control device 200 in response to the cursor contacting an edge of a scrolling area arranged in a portion of the screen.

Referring to FIGS. 3 and 4A through 4D, when the user operates the control device 200 such that the control device 200 contacts an edge of a scrolling area arranged in a screen of the display 115 of the display apparatus 100 by using the control device 200, which is implemented by, for example, a pointing device, the sensor 160 of the display apparatus 100 receives an input signal corresponding to a position indicated by the control device 200, and the controller 180 calculates a coordinate value on the screen at which a cursor is to be output according to the received input signal. Here, coordinates on the screen at which a cursor is to be output contacts the edge of the scrolling area based on a calculation result, and also, when the position indicated by the control device 200 is further moved beyond the scrolling area so that a scrolling distance is generated, the controller 180 controls the graphic processor 184 to deform the shape of the cursor. Also, the controller 180 controls the display 115 to display the cursor 310 having a modified shape at the calculated position on the screen.

The edge of the scrolling area includes an upper edge, a lower edge, a left edge, and a right edge of the scrolling area.

Hereinafter, a method of deforming the shape of a cursor will be described in detail with reference to FIGS. 6A, 6B, 7A, 7B, 8, 9A, 9B, 9C, 10A, 10B, 11A, 11B, 12A, and 12B.

Figure 6A:
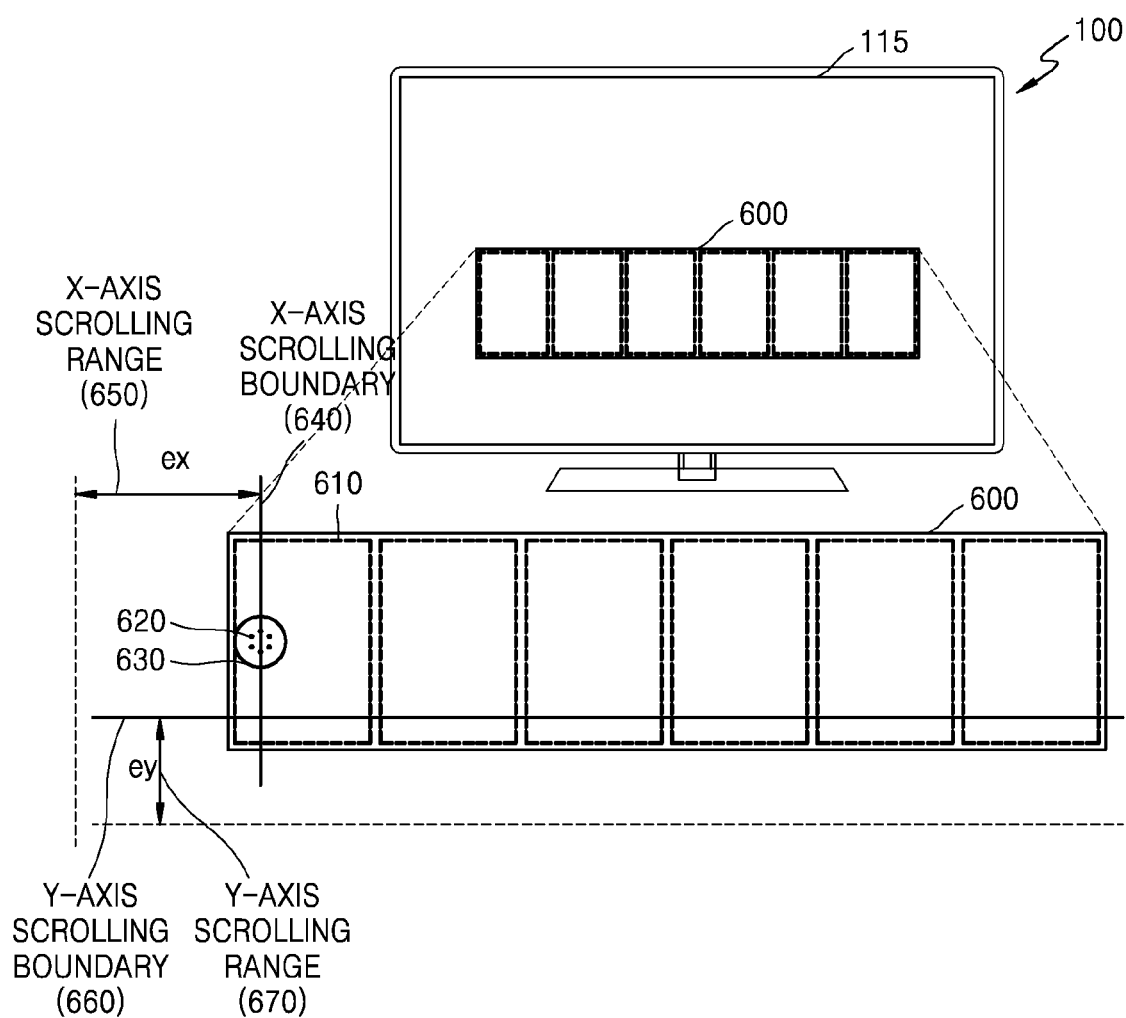
FIGS. 6A and 6B illustrate reference diagrams for explaining deformation of a shape of a cursor when horizontal edge scrolling is performed, according to an exemplary embodiment.
Figure 6B:
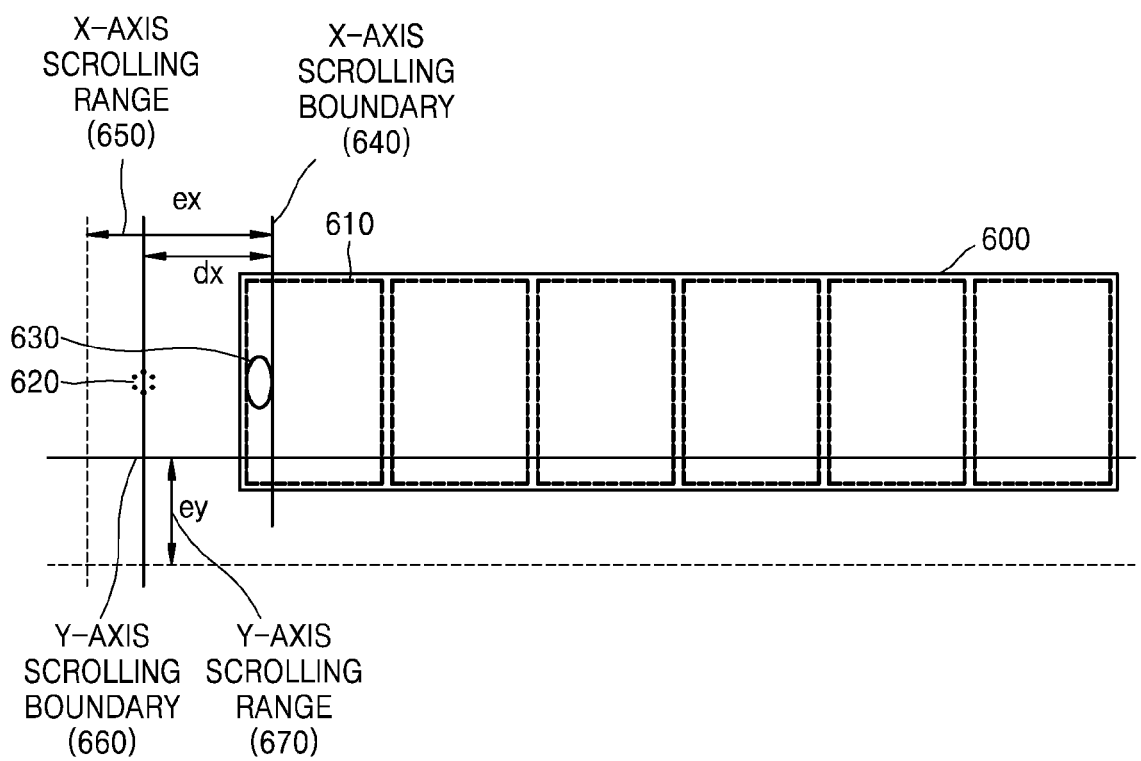

FIGS. 6A and 6B illustrate reference diagrams for explaining deformation of a shape of a cursor when horizontal edge scrolling is performed, according to an exemplary embodiment.

FIG. 6A illustrates an output form of a cursor just before edge scrolling in an x-axis direction has started according to an exemplary embodiment.

Referring to FIG. 6A, the display 115 of the display apparatus 100 provides a scrolling area 600 displaying a plurality of scrolling items on a screen. A plurality of scrolling items including a scrolling item 610 are arranged in a scrolling area 600.

Reference numeral 620 denotes a pointing position of the control device 200, that is, a position indicated by the control device 200 which is, for example, a mouse or a remote controller. Reference numeral 630 denotes a cursor displayed on a screen according to the pointing position 620 of the control device 200. The pointing position 620 of the control device 200 is illustrated for reference in regard to description of the present exemplary embodiment, and in reality, the display apparatus 100 may not output the pointing position 620 of the control device 200 on a screen but may display and deform the cursor 630 based on information about the pointing position 620. In detail, the display apparatus 100 displays the cursor 630 corresponding to the pointing position 620 of the control device 200 on a display screen and calculates a scrolling distance based on the pointing position 620 and deforms the shape of the cursor 630 based on the scrolling distance and outputs the cursor 630.

According to the present exemplary embodiment, as long as the pointing position 620 of the control device 200 is within the scrolling area 600, in detail, as long as the pointing position 620 of the control device 200 is located within an x-axis scrolling boundary 640, the cursor 630 is not deformed. The x-axis scrolling boundary 640 may denote, for example, when the cursor 630 contacts the leftmost edge of the scrolling area 600, a distance from a leftmost edge of the scrolling area 600 to a center of the cursor 630. When the pointing position 620 of the control device 200 deviates from the x-axis scrolling boundary 640 and starts to move farther out of the scrolling area 600, that is, when the pointing position 620 of the control device 200 contacts the edge of the scrolling area 600 and is moved out of the scrolling area 600, deformation of the cursor 630 is started.

Referring to FIG. 6A, the pointing position 620 of the control device 200 is on the x-axis scrolling boundary 640 within the scrolling area 600, and thus edge scrolling is not performed yet. When the edge scrolling is not activated, the pointing position 620 of the control device 200 may correspond to the position of the cursor 630, and the control device 200 outputs the cursor 630 having a circular form which is the original form of the cursor 630.

FIG. 6B illustrates an output form of the cursor 630 after edge scrolling is performed according to an exemplary embodiment.

Referring to FIG. 6B, the user moves the pointing position 620 of the control device 200 to a portion further beyond the left end of the scrolling area 600 so that the pointing position 620 of the control device 200 deviates from the scrolling area 600 to be outside the scrolling area 600. A scrolling range 650 is denoted by ex, and a scrolling distance from the current pointing position 620 to the x-axis scrolling boundary 640 is denoted by dx. The pointing position 620 of the control device 200 is on the left from the left end of the scrolling area 600 in an x-axis direction of the scrolling area 600 so that a scrolling distance dx is generated. However, the pointing position 620 is within a range of the scrolling area 600 in a y-axis direction, and thus, a scrolling distance in the y-axis direction is not generated. When deforming the cursor when a scrolling distance is generated as above along one axis, that is, the x-axis, an extension/reduction ratio of the cursor is calculated as follows.

rx=extension/reduction ratio of the cursor along an x-axis
ry=extension/reduction ratio of the cursor along a y-axis When rx or ry is 1, the cursor is not extended nor reduced, and when rx and ry are each smaller than 1, the cursor is reduced in each of the x-axis direction and the y-axis direction, and when rx and ry are each greater than 1, the cursor is extended in each of the x-axis direction and the y-axis direction.

Referring to FIG. 6B, only the scrolling distance dx is generated along the x-axis, and no scrolling distance is generated along the y-axis, and thus, dy is equal to 0. Since the cursor has to be extended in the y-axis by an amount by which the cursor is reduced along the x-axis, ry may be calculated based on rx. Thus, an extension/reduction ratio of the cursor may be calculated as follows.

$rx=1-(dx/ex)$ $ry=2-rx$

The shape of the cursor 630 that is reduced along the x-axis and extended along the y-axis based on rx and ry calculated as above is output on the display as shown in FIG. 6B.

Figure 7A:
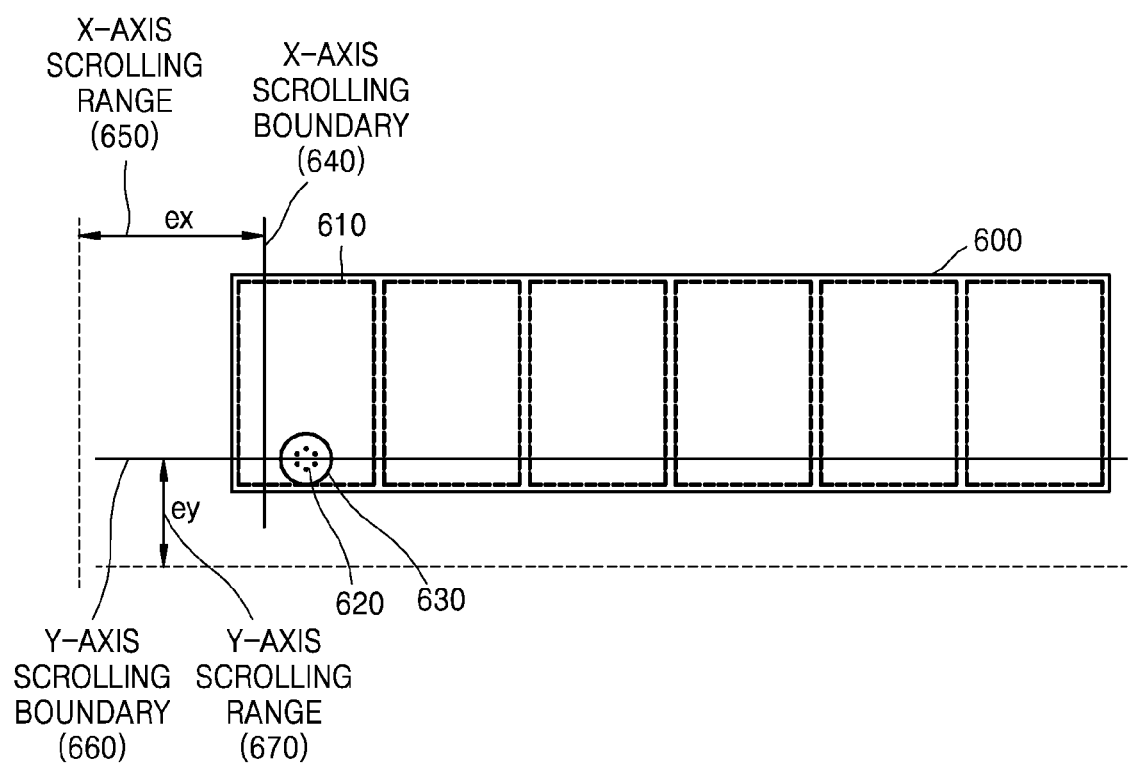
FIGS. 7A and 7B illustrate reference diagrams for explaining deformation of a shape of a cursor when vertical edge scrolling is performed, according to an exemplary embodiment.
Figure 7B:
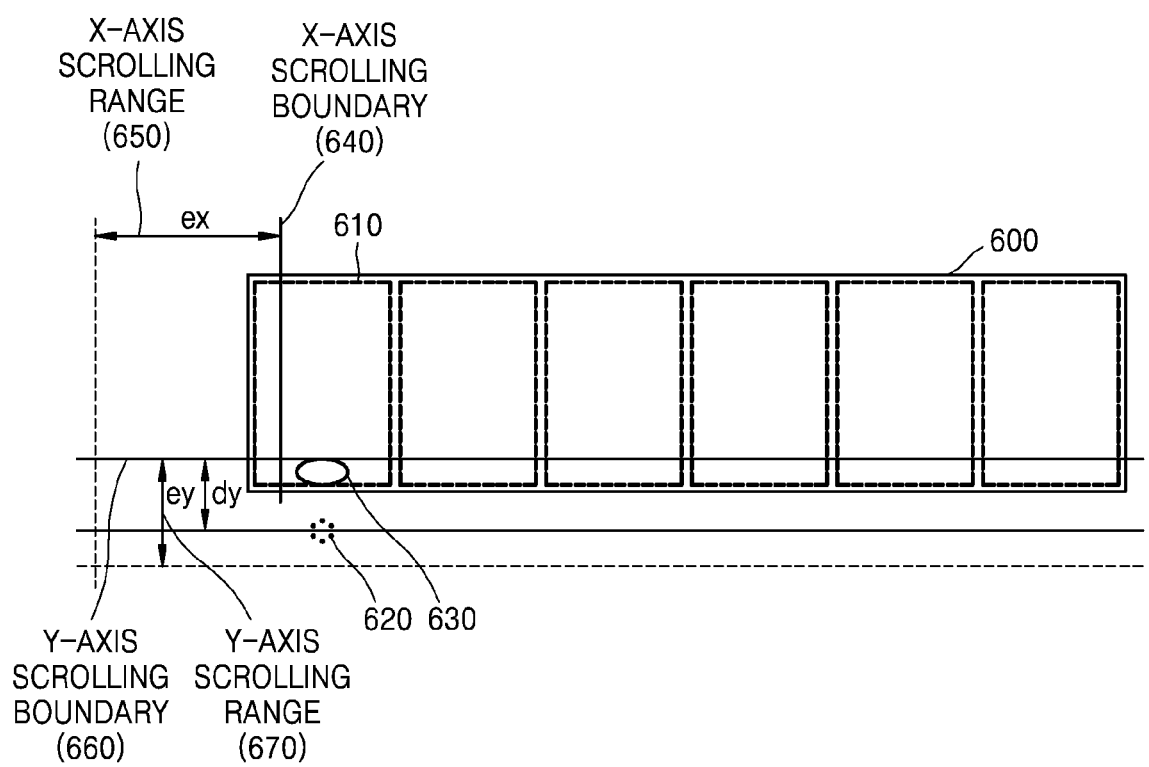

FIGS. 7A and 7B illustrate reference diagrams for explaining deformation of a shape of a cursor 630 when vertical edge scrolling is performed, according to an exemplary embodiment.

FIG. 7A illustrates an output form of the cursor 630 just before edge scrolling in a y-axis direction starts according to an exemplary embodiment.

Referring to FIG. 7A, a plurality of scrolling items including a scrolling item 610 are arranged in a scrolling area 600.

Reference numeral 620 denotes a pointing position of the control device 200. Reference numeral 630 denotes a cursor displayed on a screen according to the pointing position 620 of the control device 200. The pointing position 620 of the control device 200 is illustrated for reference for description of the present exemplary embodiment, and in reality, the display apparatus 100 may not output the pointing position 620 of the control device 200 on a screen but may display and deform the cursor 630 based on information about the pointing position 620. In detail, the display apparatus 100 displays the cursor 630 corresponding to the pointing position 620 of the control device 200 on a display screen and calculates a scrolling distance based on the pointing position 620 and deforms the shape of the cursor 630 based on the scrolling distance and outputs the cursor 630.

According to the present exemplary embodiment, as long as the pointing position 620 of the control device 200 is within the scrolling area 600, in detail, as long as the pointing position 620 of the control device 200 is located within a y-axis scrolling boundary 660, the cursor 630 is not deformed. The y-axis scrolling boundary 660 may denote a distance from a bottom edge of the scrolling area 600 to a center of the cursor 630 when the cursor 630 reaches the bottom edge of the scrolling area 600. When the pointing position 620 of the control device 200 deviates from the y-axis scrolling boundary 660 and starts to move further out of the scrolling area 600, that is, when the pointing position 620 of the control device 200 contacts the edge of the scrolling area 600 and the pointing position 620 of the control device 200 is moved out of the scrolling area 600, deformation of the cursor 630 is started.

Referring to FIG. 7A, the pointing position 620 of the control device 200 is on the y-axis scrolling boundary 660 within the scrolling area 600, and thus edge scrolling is not performed yet. When the edge scrolling is not activated, the pointing position 620 of the control device 200 may correspond to the position of the cursor 630, and the control device 200 outputs the cursor 630 having a circular form which is the original form of the cursor 630.

FIG. 7B illustrates an output form of the cursor 630 after edge scrolling is performed according to an exemplary embodiment.

Referring to FIG. 7B, the user moves the pointing position 620 of the control device 200 to a portion further beyond the bottom end of the scrolling area 600 so that the pointing position 620 of the control device 200 deviates from the scrolling area 600 to be outside the scrolling area 600. A scrolling range 670 is denoted by ey, and a scrolling distance from the current pointing position 620 to the y-axis scrolling boundary 660 is denoted by dy. The pointing position 620 of the control device 200 is further below from the bottom end of the scrolling area 600 in a y-axis direction of the scrolling area 600 so that a scrolling distance dy is generated. However, the pointing position 620 is within a range of the scrolling area 600 in an x-axis direction, and thus, a scrolling distance in the x-axis direction is not generated.

Referring to FIG. 7B, only the scrolling distance dy is generated along the y-axis, and no scrolling distance is generated along the y-axis, and thus, dx=0. Since the cursor has to be extended in the x-axis by an amount by which the cursor is reduced in the y-axis, rx may be calculated based on ry. Thus, an extension/reduction ratio rx and ry of the cursor may be calculated as follows.

$$ry = 1-(dy/ey)$$

$$rx = 2-ry$$

The shape of the cursor 630 that is extended along the x-axis and reduced along the y-axis based on rx and ry calculated as above is output on the display as shown in FIG. 7B.

Figure 8:
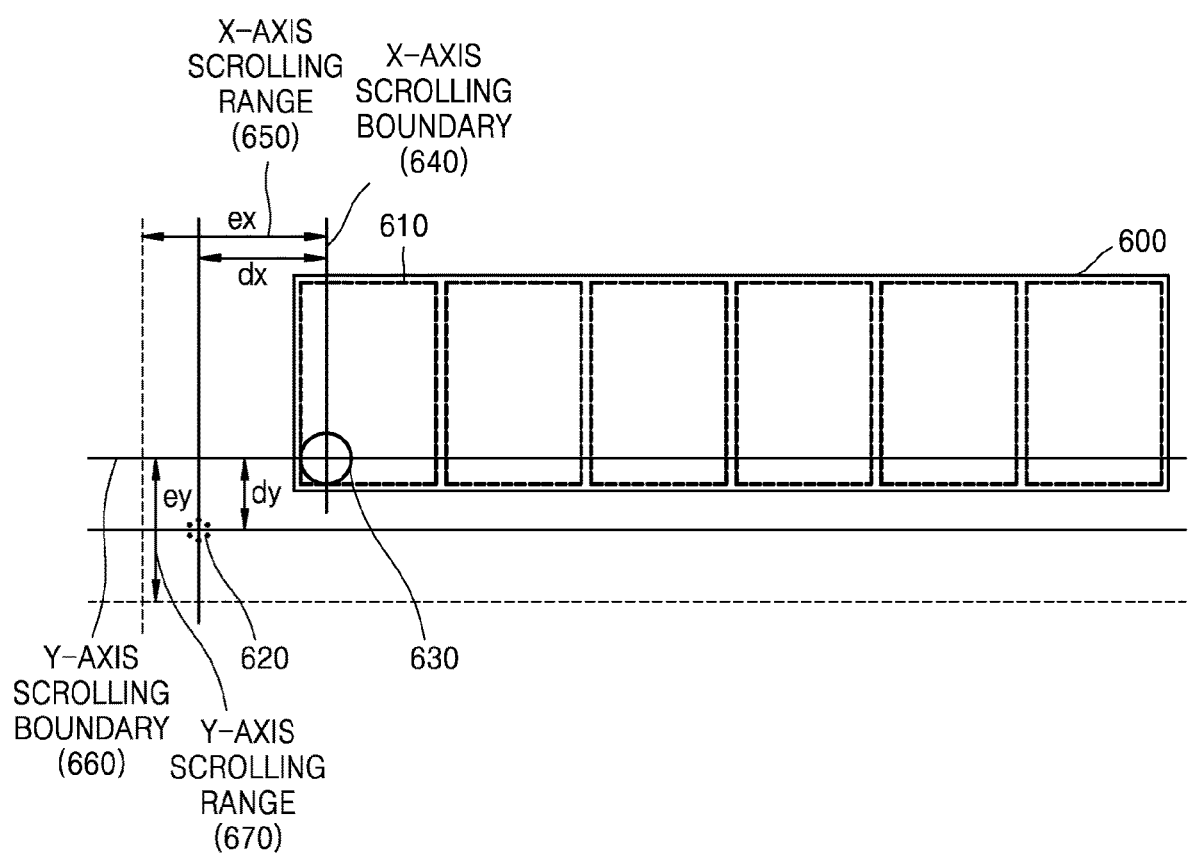
FIG. 8 is a reference diagram for explaining deformation of a shape of a cursor when edge scrolling is performed in a horizontal direction and a vertical direction, according to an exemplary embodiment.

FIG. 8 is a reference diagram for explaining deformation of a shape of a cursor when edge scrolling is performed in a horizontal direction and a vertical direction, according to an exemplary embodiment.

Also when edge scrolling is performed both in a horizontal direction and a vertical direction, that is, also when a scrolling distance is generated both along an x-axis direction and a y-axis direction, when rx and ry are calculated using the calculation method described with reference to FIGS. 6A, 6B, 7A and 7B, a cursor is reduced both along the x-axis and the y-axis, and consequently, the shape of the cursor may be too small, which is visually inappropriate. Thus, in this case, in order to prevent reduction of the cursor both in the-x axis and the y-axis, another method different from the calculating method of FIGS. 6A, 6B, 7A and 7B may be used.

Referring to FIG. 8, the pointing position 620 of the control device 200 is outside the scrolling area 600 both along the x-axis and the y-axis, and thus, both dx and dy exist.

dx: a distance from an x-coordinate value of the pointing position 620 of the control device 200 to the x-axis scrolling boundary 640 dy: a distance from a y-coordinate value of the pointing position 620 of the control device 200 to the y-axis scrolling boundary 660

$$rx = 1-(dx/ex)$$

$$ry = 1-(dy/ey)$$

Also, in order to prevent reduction of the cursor both in the x-axis direction and the y-axis direction, an offset is calculated as follows and added to each of rx and ry.

$$s = rx + ry$$

$$rx+ = (2-s)*rx/s$$

$$ry+ = (2-s)*ry/s$$

Thus, as illustrated in FIG. 8, when the x-axis scrolling distance dx and the y-axis scrolling distance dy both exist according to a pointing position, an extension/reduction ratio of the cursor rx and ry used to prevent reduction of the cursor both in the x-axis direction and the y-axis direction may be calculated as below.

$$rx = (rx)+(rx+)$$

$$ry = (ry)+(ry+)$$

The shape of the cursor 630 having an extension/reduction ratio that is set by preventing reduction of the cursor 630 both along the x-axis and the y-axis based on rx and ry calculated as described above, may be output on the display as illustrated in FIG. 8.

Figure 9A:
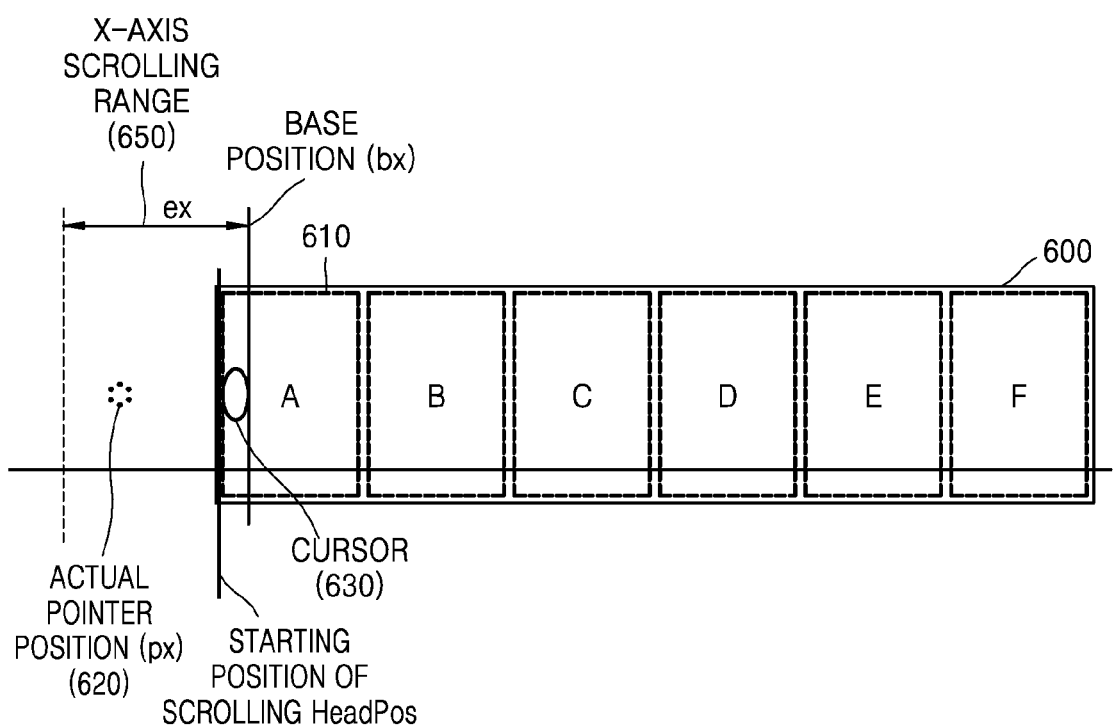
FIGS. 9A through 9C illustrate reference diagrams for explaining a scrolling speed based on a scrolling distance, according to an exemplary embodiment.
Figure 9B:
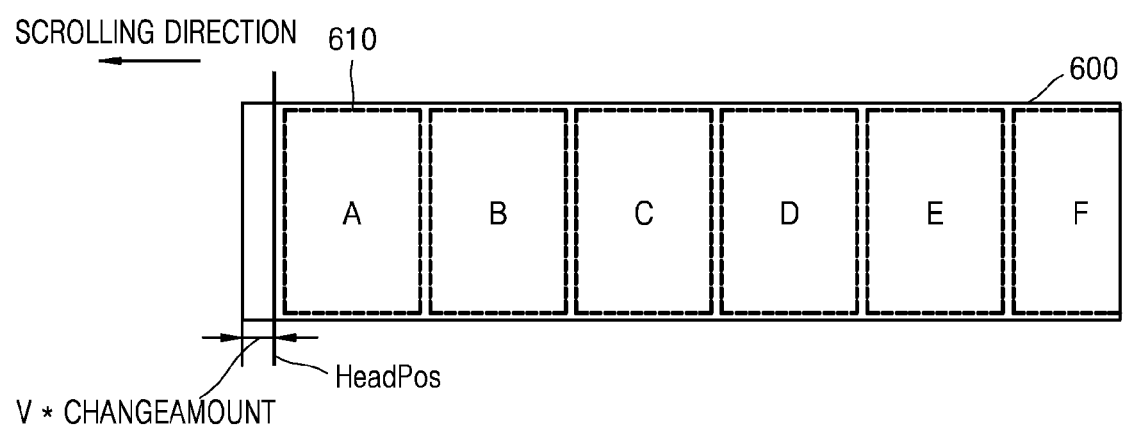
Figure 9C:
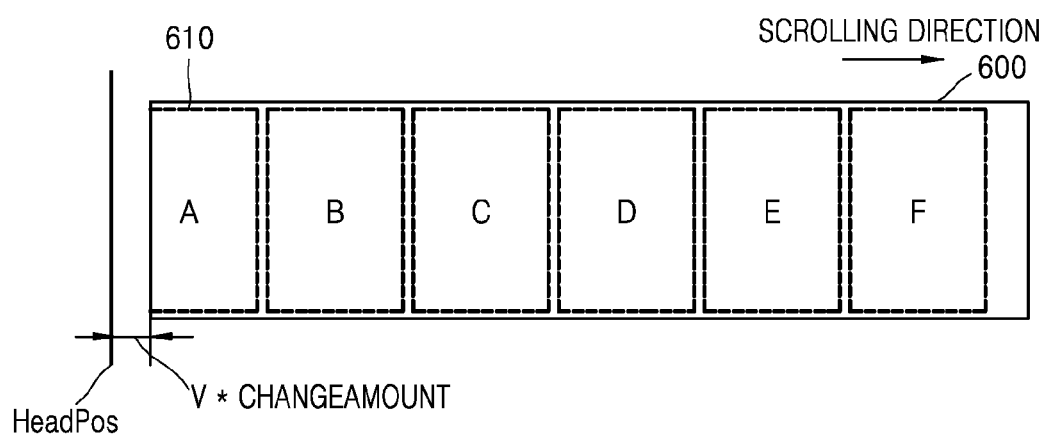

FIGS. 9A, 9B, and 9C illustrate reference diagrams for explaining a scrolling speed based on a scrolling distance, according to an exemplary embodiment.

According to an exemplary embodiment, a scrolling speed may be linked to a scrolling distance. That is, when a cursor contacts a screen edge, the shape of the cursor may be squashed proportionally to a distance between an actual position indicated by a pointing position of a control device and a screen when the cursor contacts the screen edge. Also, a scrolling speed may be appropriately varied based on a degree of how much the shape of the cursor is squashed so that a user may feel a force generated when the cursor manipulated by the user has struck the screen edge.

A scrolling speed according to a scrolling distance may be determined as below.

ex: scrolling range px: x-coordinate of a pointing position of a control device bx=a base position on an x-axis HeadPos: starting position of scrolling An intensity of scrolling may be varied from 0 to 1, and may be calculated as follows.

$$v=abs(px-bx)/ex$$

v=0 indicates that px and bx are identical and thus no scrolling is performed.

A constant of a basic movement distance is CHANGEAMOUNT.

When scrolling is performed from the scrolling area 600 to the left, HeadPos may be calculated as below.

$$HeadPos+=v*CHANGEAMOUNT$$

That is, when scrolling is performed to the left, a HeadPos value is obtained by adding v*CHANGEAMOUNT to a previous HeadPos value. In a state illustrated in FIG. 9A, that is, while HeadPos is at a left end of the scrolling area 600, when scrolling is further performed to the left and when a HeadPos variation, that is, HeadPos+, is v*CHANGEAMOUNT, HeadPos is set to a value that is increased from the HeadPos value illustrated in FIG. 9A by v*CHANGEAMOUNT as illustrated in FIG. 9B.

Also, when scrolling is performed to the right, HeadPos may be calculated as below.

$$HeadPos-=v*CHANGEAMOUNT$$

That is, when scrolling is performed to the right, a HeadPos value is obtained by subtracting v*CHANGEAMOUNT from a previous HeadPos value. In the state illustrated in FIG. 9A, that is, while HeadPos is at a left end of the scrolling area 600, when scrolling is further performed to the right and when a HeadPos variation, that is, HeadPos-, is v*CHANGEAMOUNT, HeadPos is set to a value that is reduced from the HeadPos value illustrated in FIG. 9A by v*CHANGEAMOUNT as illustrated in FIG. 9C.

Figure 10A:
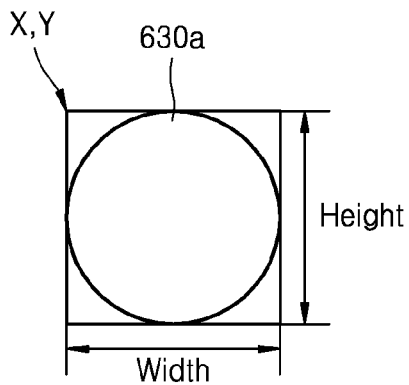
FIGS. 10A and 10B illustrate reference diagrams for explaining a deformation value of a circular cursor according to an exemplary embodiment.
Figure 10B:
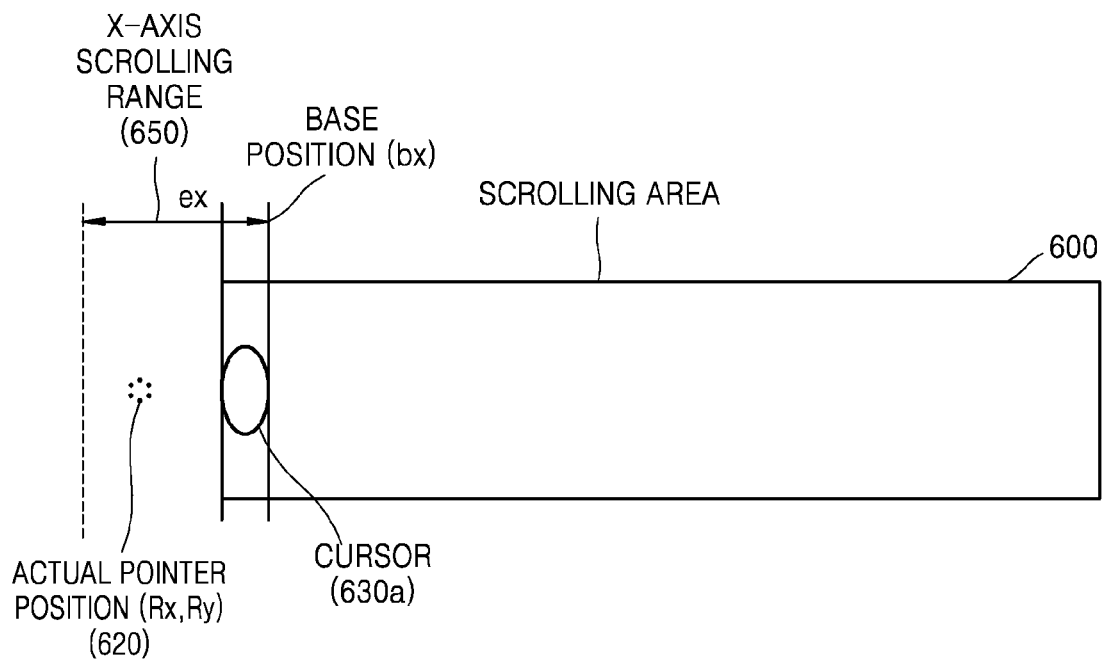

FIGS. 10A and 10B illustrate reference diagrams for explaining a deformation value of a circular cursor according to an exemplary embodiment.

FIG. 10A illustrates an original form of a circular cursor 630a displayed before edge scrolling, according to an exemplary embodiment.

The circular cursor 630a has a height Height and a width Width.

FIG. 10B illustrates a deformed shape of the circular cursor 630a to an oval shape after edge scrolling is generated, according to an exemplary embodiment.

The pointing position 620 of the control device 200 is outside a scrolling area beyond a left end of the scrolling area so that edge scrolling is generated to deform the circular cursor 630a to an oval shape.

As described with reference to FIGS. 6A, 6B, 7A, 7B, and 8, a deformation ratio of a cursor, that is, extension and reduction ratios of a cursor, rx and ry, may be calculated as below.

--- if (dx==0 && dy==0) {rx = ry = 1;}
else if (dx==0) {ry=1-(dy/ey); rx=2-ry;}
else if (dy==0) {rx=1-(dx/ex); ry=2-rx;}
else {rx=1-(dx/ex); ry=1-(dy/ey);
s=rx+ry;
rx+=(2-s)*rx/s; ry+=(2-s)*ry/s;
}

---

A width, height and position of a cursor having a radius CURSOR_RADIUS may be calculated as below based on the calculated rx and ry.

Width of a cursor: Width=rx*CURSOR_RADIUS*2
Height of a cursor: Height=ry*CURSOR_RADIUS*2
x-coordinate of a cursor: X=I (leftmost boundary of scrolling area)
y-coordinate of a cursor: Y=py-Height/2 (py: y-coordinate of actual pointing position)

A cursor having a circular shape is illustrated in FIGS. 10A and 10B, but the above calculation method may also be applied to cursors having a square shape with rounded corners or a simple square shape as in FIGS. 11 and 12 below.

Figure 11A:
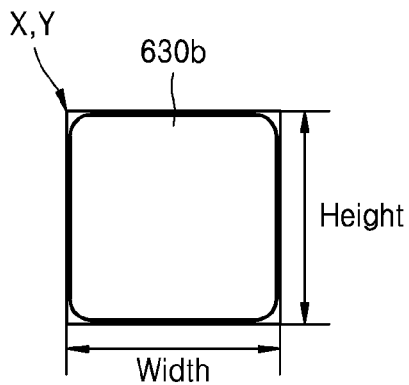
FIGS. 11A and 11B illustrate reference diagrams for explaining a deformation value of a square cursor having rounded corners, according to an exemplary embodiment.
Figure 11B:
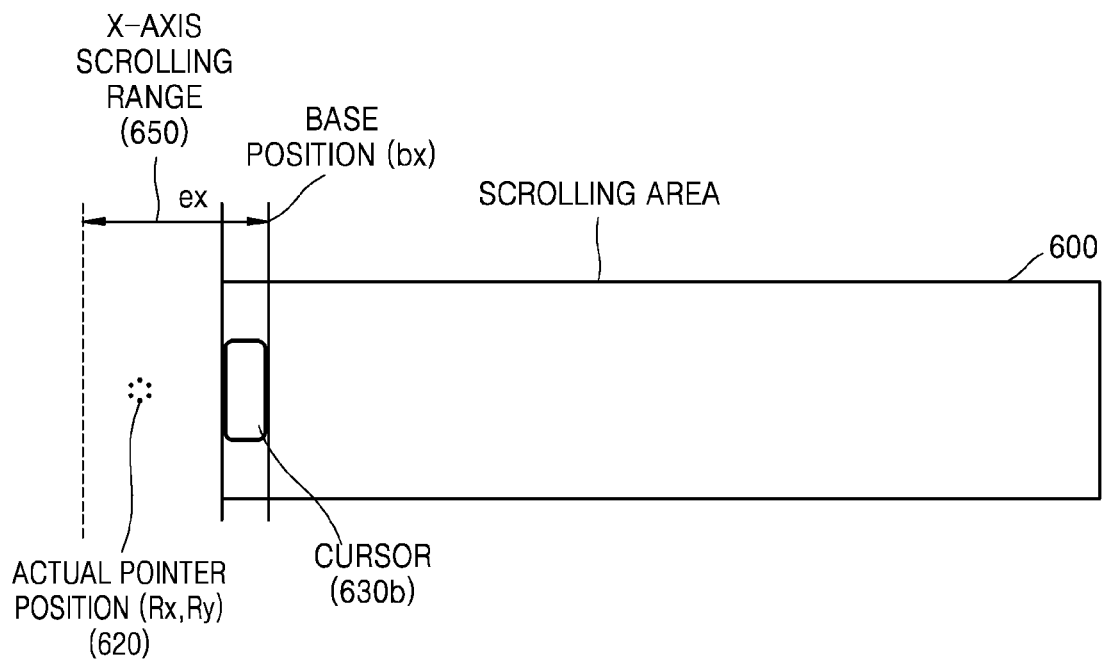

FIGS. 11A and 11B illustrate reference diagrams for explaining a deformation value of a square cursor 630b having rounded corners, according to an exemplary embodiment.

A width, height, and position of the cursor 630b having a square shape having rounded corners as illustrated in FIG. 11B may also be calculated as in the exemplary embodiment of FIGS. 10A and 10B. Here, when calculating a width and a height of the cursor 630b, Width/2 or Height/2 may be used instead of CURSOR_RADIUS.

FIG. 11B illustrates the cursor 630b of a square shape having rounded corners, with a greater height and a smaller width than the square shape of the cursor 630b illustrated in FIG. 11B.

Figure 12A:
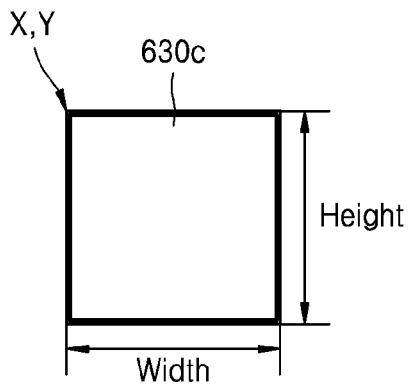
FIGS. 12A and 12B illustrate reference diagrams for explaining a deformation value of a square cursor according to an exemplary embodiment.
Figure 12B:
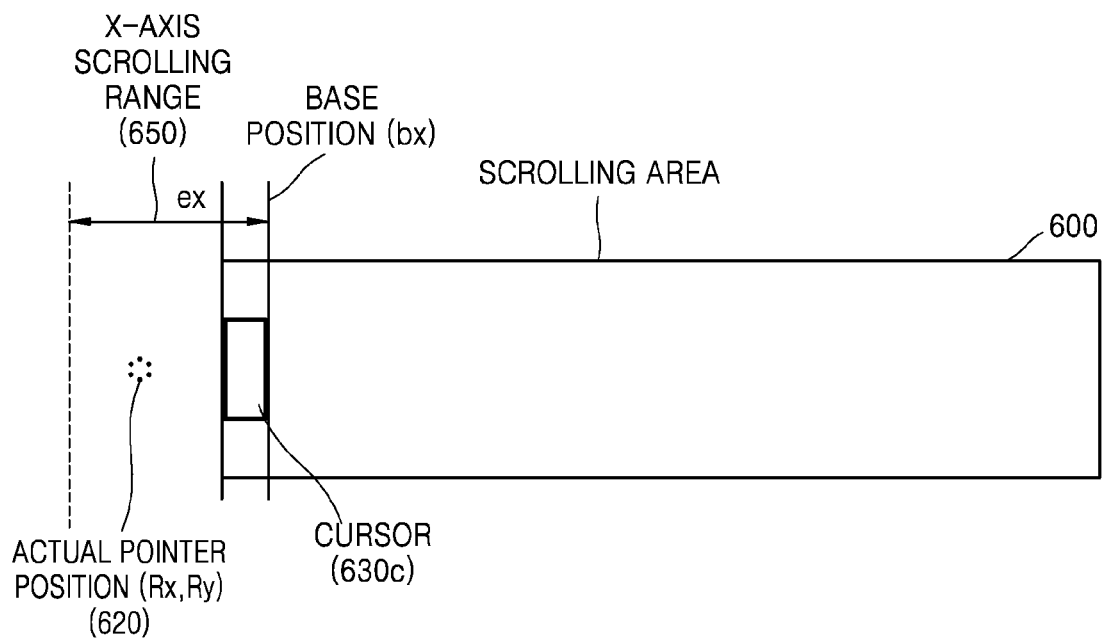

FIGS. 12A and 12B illustrate reference diagrams for explaining a deformation value of a square cursor 630c according to an exemplary embodiment.

A width, height, and position of the cursor 630c of a square shape as illustrated in FIG. 12A may also be calculated as in the exemplary embodiment of FIGS. 10A and 10B. Here, when calculating a width and a height of the cursor 630c, Width/2 or Height/2 may be used instead of CURSOR_RADIUS.

FIG. 12B illustrates the cursor 630c having a square shape with a greater height and a smaller width than the square shape of the cursor 630c illustrated in FIG. 12B.

While the cursors having a circular shape, a square shape having rounded corners, and a square shape as described above, a cursor may have any shape. Also, if a cursor has a shape having a height and a width, for example, a rectangular or diamond shape, deformation of the cursor may be calculated according to a calculation method disclosed in the present specification.

Figure 13A:
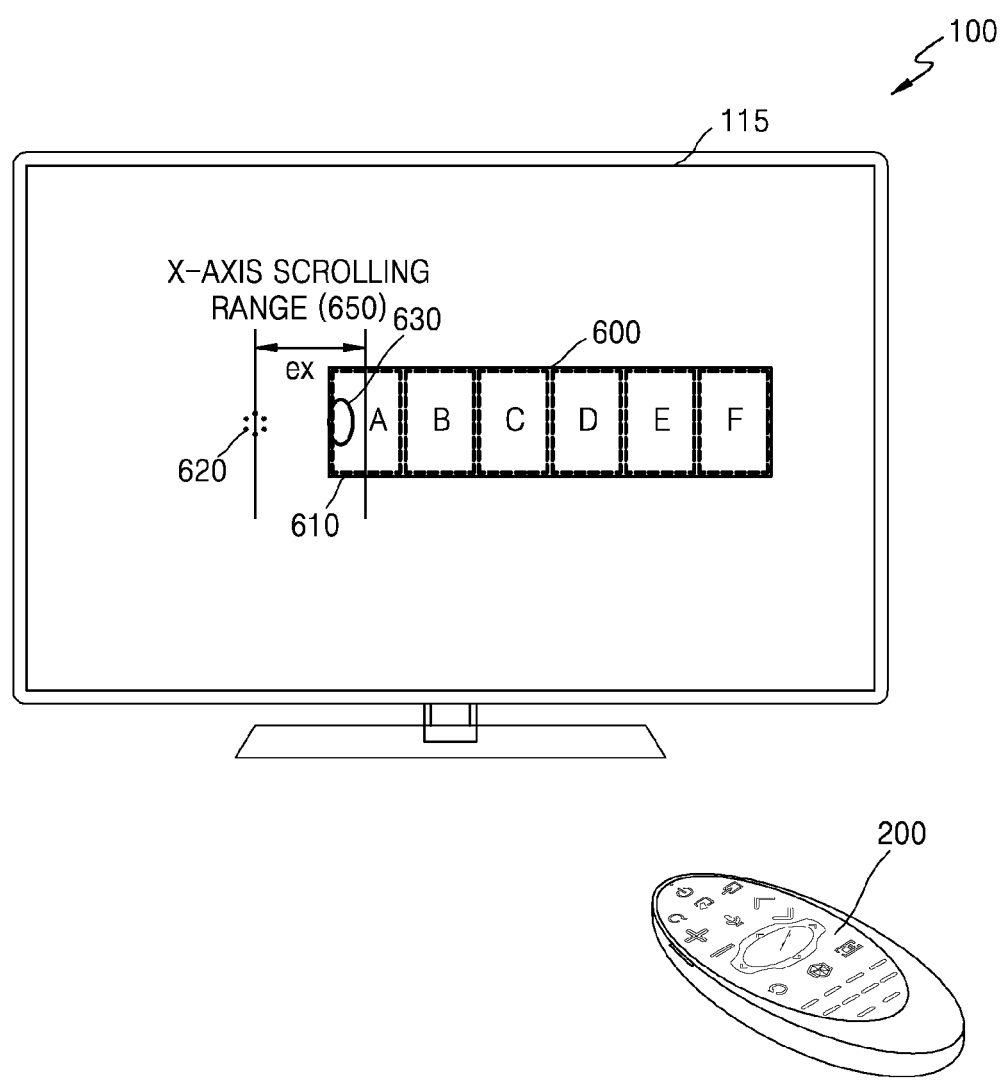
FIGS. 13A and 13B are reference diagrams for explaining an operation of displaying a cursor by restoring the cursor that has been output by adding visual effects, to its original form, when a scrolling distance deviates from a threshold value of a scrolling range, according to an exemplary embodiment.
Figure 13B:
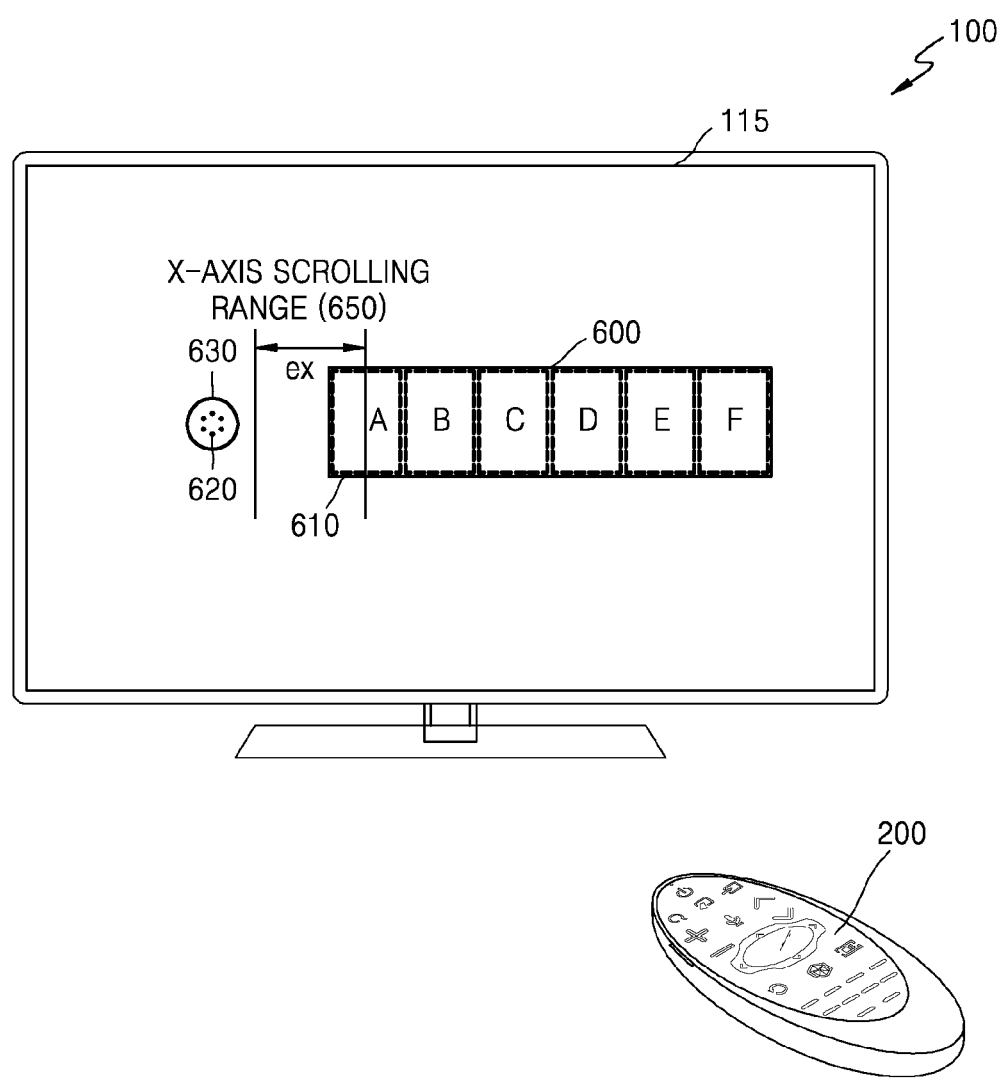

FIGS. 13A and 13B are reference diagrams for explaining an operation of outputting a cursor by restoring the cursor that has been output by adding visual effects, to its original form, when a scrolling distance deviates from a threshold value of a scrolling range, according to an exemplary embodiment.

Referring to FIG. 13A, a pointing position 620 of the control device 200 is arranged at an end of an x-axis scrolling range 650 with respect to a scrolling area 600. In this state, the pointing position 620 of the control device 200 has not yet deviated from a threshold value of the x-axis scrolling range 650, and thus, the display apparatus 100 outputs the cursor 630 having a squashed shape based on a scrolling distance, for example, the cursor 630 having an oval shape.

Referring to FIG. 13B, when the user manipulates the control device 200 to point more to the left in the state as illustrated in FIG. 13A, the pointing position 620 of the control device 200 deviates from the threshold value of the x-axis scrolling range 650. When the scrolling distance deviates from the threshold value of the scrolling range, the display apparatus 100 cancels the visual effects that have been added to the cursor 630 and restores the cursor 630 to its original form, and displays the cursor 630 such that a position indicated by the cursor 630 is the same as the pointing position 620 of the control device 200.

When the pointing position 620 of the control device 200 deviates from a preset threshold value as described above, the cursor 630 may move outside the scrolling area 600, and the shape of the cursor 630 may also be restored to its original form so that the user may spontaneously recognize that the pointing position 620 deviates from the scrolling range.

Figure 14:
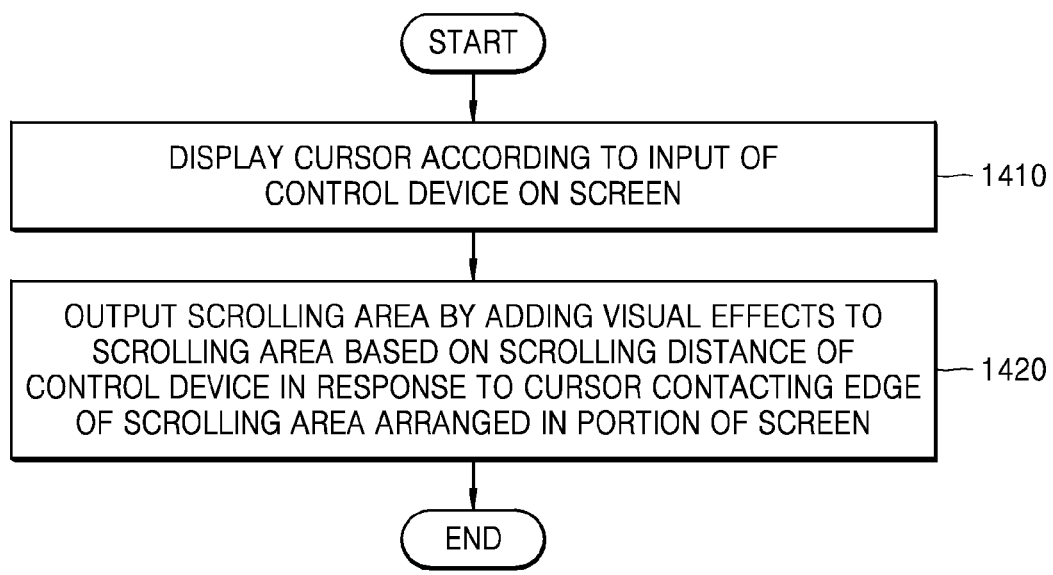
FIG. 14 is a flowchart of a method of outputting a scrolling area by adding visual effects to the scrolling area based on a scrolling distance of a control device, according to an exemplary embodiment.

FIG. 14 is a flowchart of a method of outputting a scrolling area by adding visual effects to the scrolling area based on a scrolling distance of a control device, according to an exemplary embodiment.

Referring to FIG. 14, in operation 1410, the display apparatus 100 displays a cursor according to an input of the control device 200.

In operation 1420, the display apparatus 100 displays a scrolling area by adding visual effects to the scrolling area based on a scrolling distance of the control device 200 in response to the cursor contacting an edge of the scrolling area that is arranged in a portion of a screen.

Figure 15A:
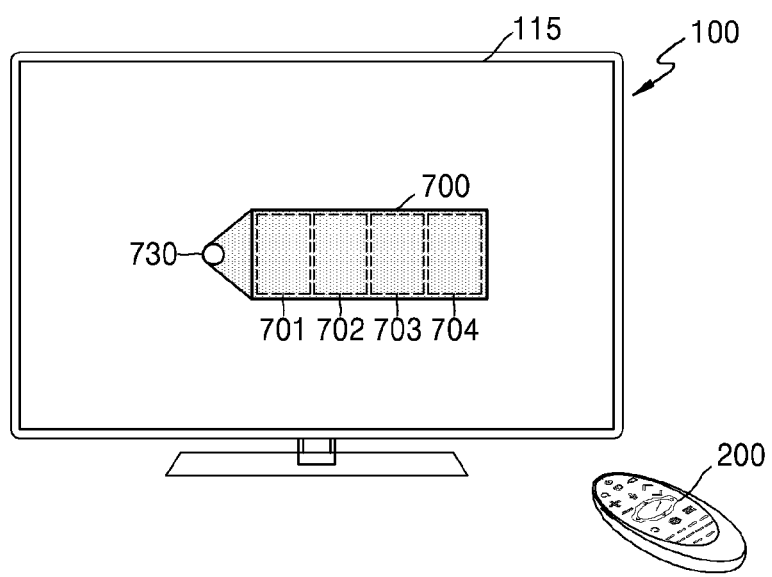
FIGS. 15A through 15C illustrate reference diagrams for explaining an operation of outputting a scrolling area by adding visual effects to the scrolling area based on a scrolling distance of a control device, according to an exemplary embodiment.
Figure 15B:
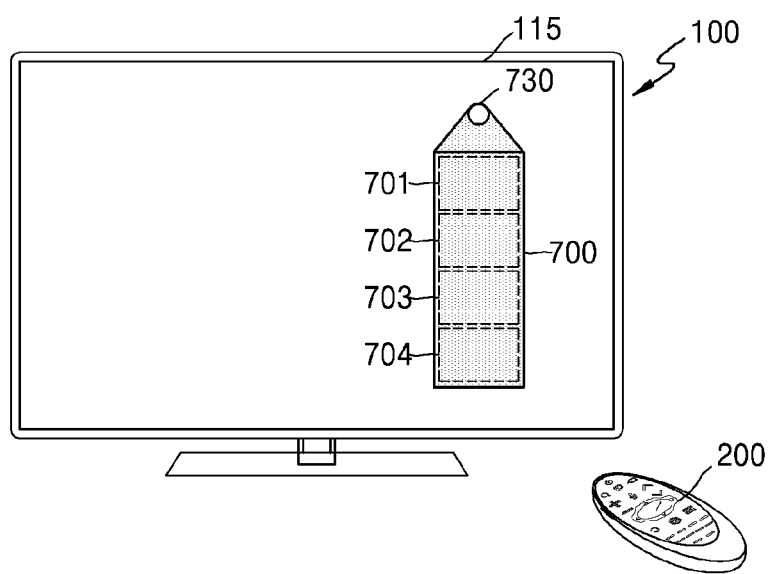
Figure 15C:
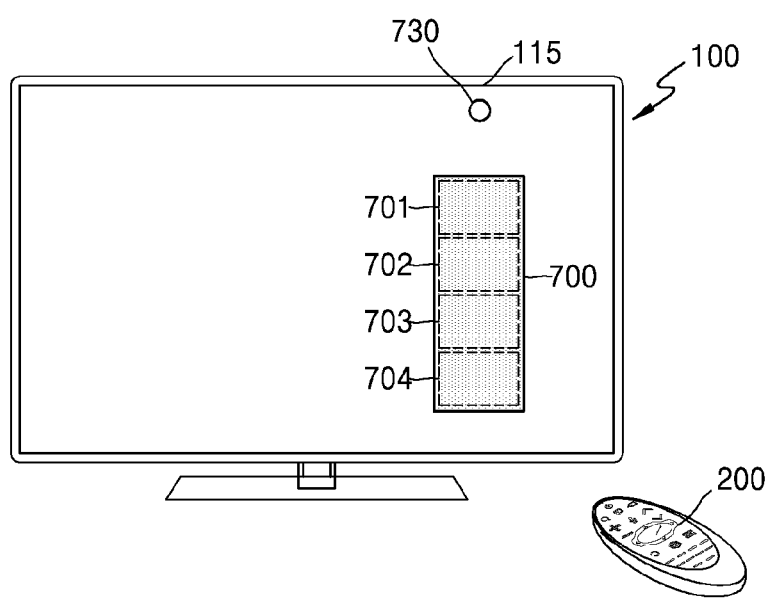

FIGS. 15A through 15C illustrate are reference diagrams for explaining an operation of outputting a scrolling area 700 by adding visual effects to the scrolling area based on a scrolling distance of a control device 200, according to an exemplary embodiment.

Referring to FIG. 15A, a horizontal scrolling area 700 is provided in the display 115 of the display apparatus 100, and scrolling items 701 through 704 are displayed in the horizontal scrolling area 700. While the user is scrolling the scrolling area 700 by using the control device 200, when a cursor 730 corresponding to an input of a control device contacts the left edge of the scrolling area 700 and then moves further to the outside with respect to the left edge so that a scrolling distance is generated, the display apparatus 100 outputs the scrolling area 700 by adding visual effects thereto as shown in FIG. 15A. Referring to FIG. 15A, visual effects are added to the scrolling area 700 such that a motion of the cursor 730 pulling an edge of the scrolling 700 is expressed.

Referring to FIG. 15B, a vertical scrolling area 700 is provided in the display 115 of the display apparatus 100, and scrolling items 701 through 704 are displayed in the horizontal scrolling area 700. Like FIG. 15A, while the user is scrolling the scrolling area 700 by using the control device 200, when a cursor 730 corresponding to an input of the control device 200 contacts an upper edge of the scrolling area 700 and then moves further to the outside with respect to the upper edge so that a scrolling distance is generated, the display apparatus 100 outputs the scrolling area 700 by adding visual effects thereto as shown in FIG. 15B. Referring to FIG. 15B, visual effects are added to the scrolling area 700 such that a motion of the cursor 730 pulling an edge of the scrolling area 700 is expressed.

Referring to FIG. 15C, when the user further scrolls the control device 200 from the state of FIG. 15B so that a pointing position of the control device 200 deviates from a threshold value of a scrolling range, the scrolling area 700 that has been output by adding the visual effects thereto is restored to an original state to be output, and the cursor 730 is moved outside the scrolling range and is arranged at the pointing position of the control device 200 to be output.

FIGS. 16A through 16G are reference diagrams for explaining a detailed operation of outputting a scrolling area 700 by adding visual effects to the scrolling area 700 based on a scrolling distance of a control device 200, according to an exemplary embodiment.

Figure 16A:
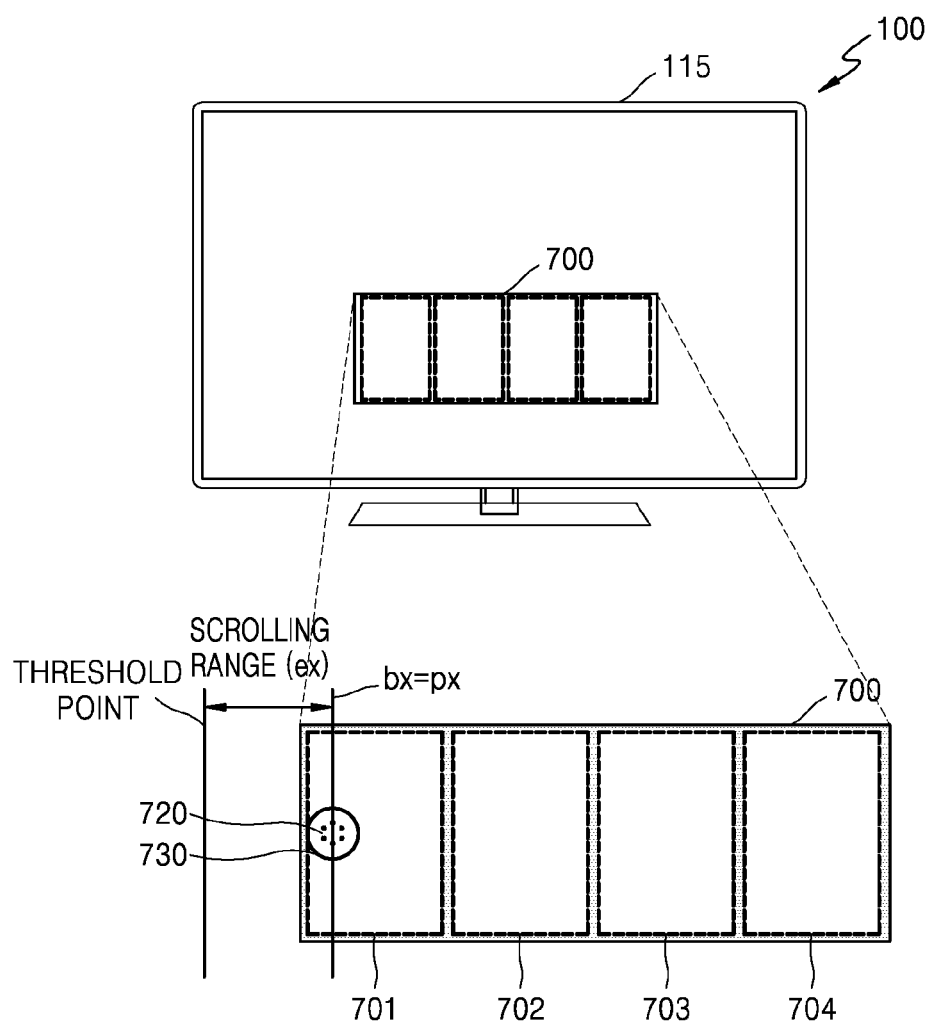
FIGS. 16A through 16G are reference diagrams for explaining a detailed operation of outputting a scrolling area by adding visual effects to the scrolling area based on a scrolling distance of a control device, according to an exemplary embodiment.

Referring to FIG. 16A, the display apparatus 100 provides the scrolling area 700 in the display 115. A plurality of scrolling items 701 through 704 are displayed in the scrolling area 700.

A pointing position 720 of the control device 200 is along an x-axis scrolling boundary bx of the scrolling area 700, and a cursor 730 corresponding to the pointing position 720 contacts a left edge of the scrolling area 700. In this case, a distance between an x-coordinate px of the pointing position 720 of the control device 200 and the x-axis scrolling boundary bx is 0 and a scrolling distance is not yet generated so that the cursor 730 is output at the same position as the pointing position 720, and also, visual effects are not yet generated in the scrolling area 700.

Figure 16B:
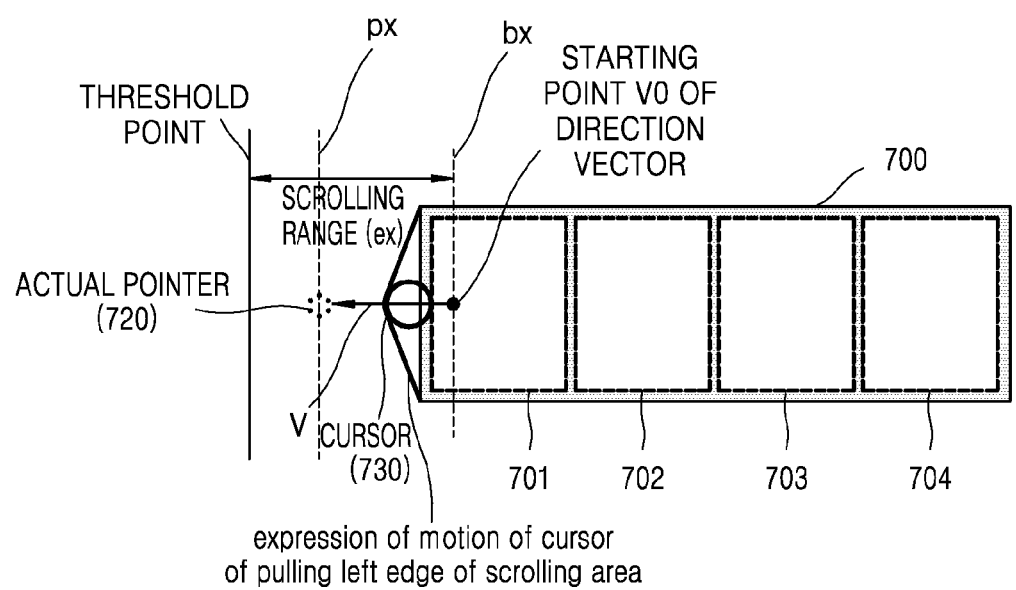

Referring to FIG. 16B, when the x-coordinate px of the pointing position 720 of the control device 200 deviates from the x-axis scrolling boundary bx, the cursor 730 is output at a position outside the scrolling area 700, and also, the scrolling area 700 is output by adding visual effects thereto.

For example, a position at which the cursor 730 is output may be determined based on the formula below.

$$V0 + dir*length*lerp(1,0.5,t)$$

V0 denotes a starting point of a direction vector. Referring to FIG. 16B, an x-coordinate of the starting point V0 is obtained by subtracting a radius of a cursor from the x-coordinate of a left edge of the scrolling area 700, and a y-coordinate of the starting point V0 denotes an exact center position of the scrolling area 700 along the y-axis.

dir denotes a unit vector obtained by dividing a vector V from the starting point V0 of the direction vector to the actual pointing position 720 by a vector length.

Length denotes a length of a vector V from the starting point V0 of the direction vector to the actual pointing position 720.

t denotes an intensity of scrolling and has a value between 0 and 1 indicating how far the x-coordinate value of the pointing position 720 is from the x-axis scrolling boundary bx over the entire scrolling range ex.

px: a x-coordinate value of a pointing position of a control device bx: scrolling boundary ex: scrolling range Here, t may be calculated as below.

$$t = |px - bx|/ex$$

Also, a lerp function is a linear interpolation formula expressed as below.

$$lerp(a,b,t) = a + t(b-a)$$

As described above, t is a real number between 0 and 1, and when t is 0, the lerp function is a, and when t is 1, the lerp function returns b, and when t is 0.5, the lerp function returns a middle value between a and b.

The position at which the cursor 730 described above is output may be arranged by using V as below.

$$\text{Position of cursor} = V0 + V*lerp(1,0.5,t)$$

That is, when referring to the above formula again, the position of the cursor 730 is on the vector V from the starting point V0 of the direction vector to the actual pointing position 720, and which position on the vector V is to be the position of the cursor 730 is determined by a value of lerp(1,0.5,t).

If t is 0, the position of the cursor 730 is the same as the actual pointing position 720 of the control device 200. This state indicates that no scrolling is performed and no resistance exists.

If t is 1, the position of the cursor 730 is at about the half point of the vector length v from v0, and here, scrolling is performed to the greatest degree and resistance is also highest.

If t is 0.5, the position of the cursor 730 is v0+v*0.75 and is at a point corresponding to ¾ of the vector length v from v0.

As described above, the lerp function is a function that varies according to t. t indicates how far a pointing position of a control device is from a scrolling boundary, and a distance difference between the pointing position of the control device and a position at which the cursor is output. The value of t increases in proportion to a degree to which the pointing position of the control device deviates from the scrolling boundary.

The distance difference between the pointing position of the control device and the position at which the cursor is output increases in proportion to a degree whereby the pointing position of the control device deviates from the scrolling boundary in order to allow a user to feel resistance. For example, when a movement amount of the cursor is 1 when increasing a scrolling intensity from 0 to 0.1, when increasing the scrolling intensity from 0.1 to 0.2, the cursor is moved by 1.2 so that the user may feel resistance.

Referring to FIG. 16B again, the display apparatus 100 may output the cursor 730 at the position calculated according to the position formula of the cursor as described above, and may display a geometrical figure having, as a side, the left edge of the scrolling area 700, and as a vertex a preset position on the vector V, in order to express as if the scrolling area is expanded like rubber or as if the position of the cursor displayed on the screen is not able to follow the actual pointing position due to resistance of rubber. In FIG. 16B, visual effects are added to the scrolling area 700 such that motion of the cursor 730 of pulling the left edge of the scrolling area 700 formed of rubber to thereby expand the left edge of the scrolling area 700 is expressed.

Figure 16C:
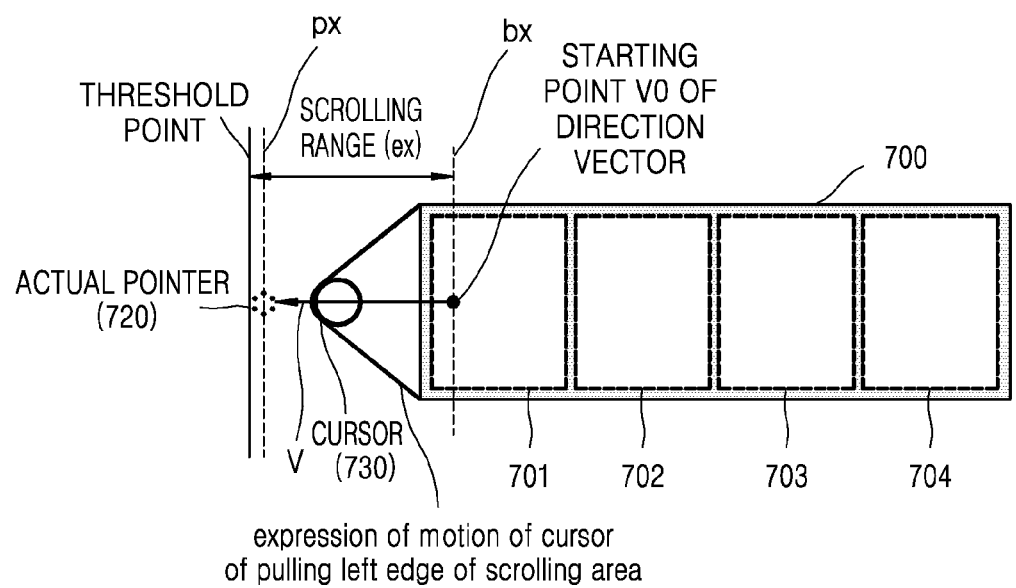

Referring to FIG. 16C, the user may manipulate the control device 200 to point more to the left than in FIG. 16B so that the pointing position 720 of the control device 200 is more on the left than FIG. 16B to be near a threshold point of the scrolling range. The cursor 730 is also output at a position more on the left in proportion to a scrolling distance and thus the left edge of the scrolling area is also expressed as if it is expanded more.

Figure 16D:
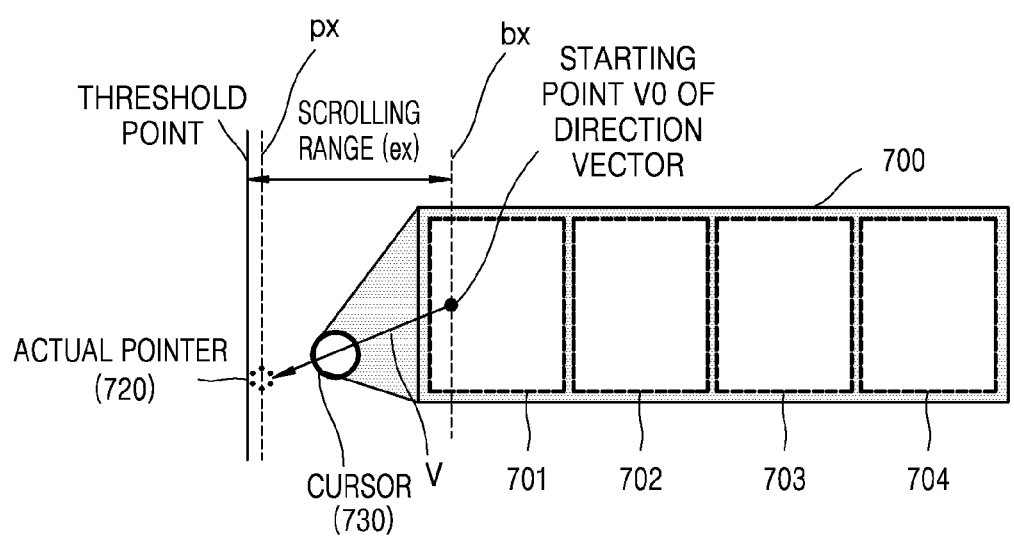

Referring to FIG. 16D, the user manipulates the control device 200 to point more downward than in FIG. 16C so that the pointing position 720 of the control device 200 is more downward than in FIG. 16C to be near a threshold point of the scrolling range. The cursor 730 is also output at a position more downward, in proportion to a scrolling distance and thus the left edge of the scrolling area is also expressed as if it is extended in a more downward direction.

Figure 16E:
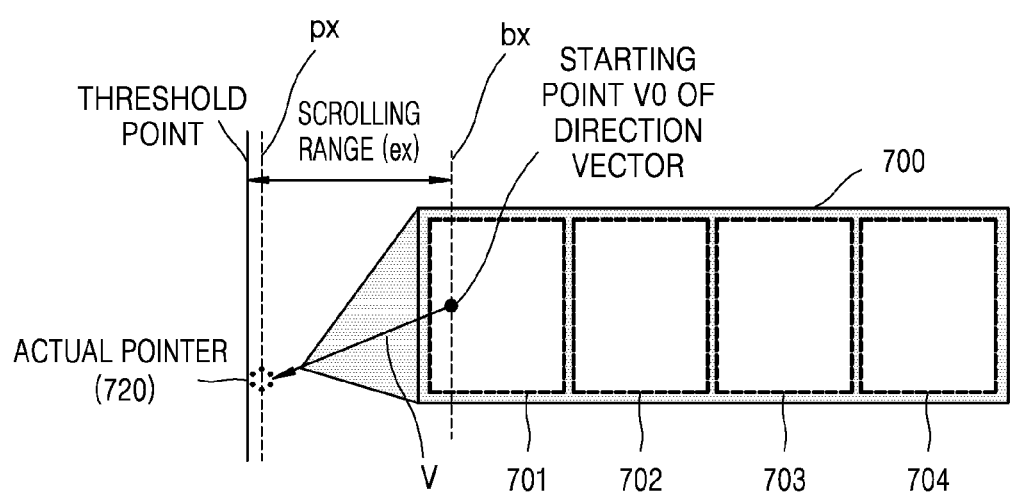

FIG. 16E is similar to FIG. 16D except that the cursor 730 is not displayed. According to an exemplary embodiment, the user may feel resistance of scrolling just by providing visual effects of outputting a geometrical figure having, as a vertex, a position defined on a vector V oriented from a starting point V0 of a direction vector to an actual pointing position and, as a side, an edge of a scrolling area, as illustrated in FIG. 16E. Here, the position defined on the vector V may be the position of the cursor 730 calculated as described above.

Figure 16F:
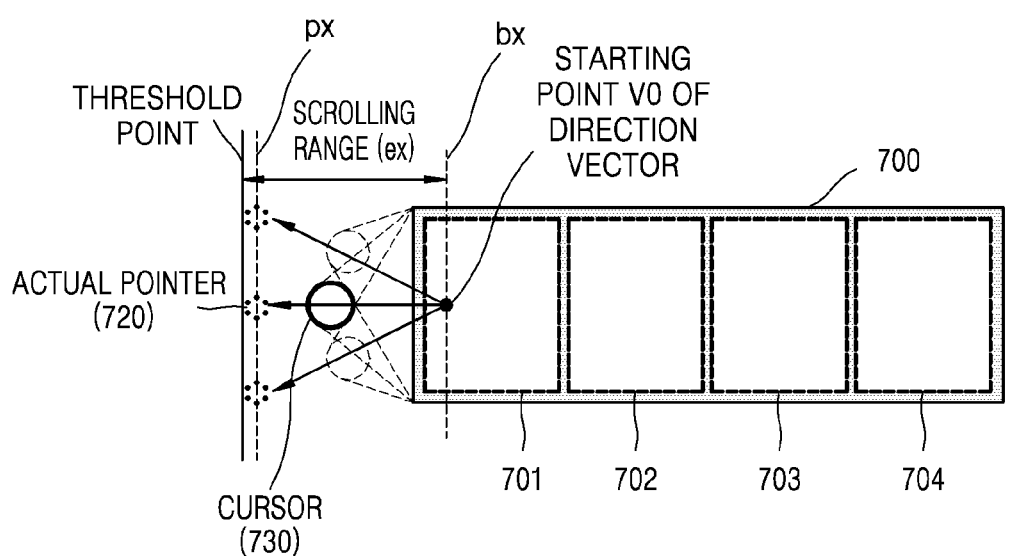

FIG. 16F illustrates a method of allowing a user to feel resistance of scrolling, according to another exemplary embodiment. Here, only the cursor 730 is displayed, and the geometrical figure surrounding the cursor 730 is not displayed.

Referring to FIG. 16F, as the cursor 730 is displayed at a position in which the user may feel resistance as described with reference to FIG. 16B or 16C, the user may feel resistance due to the position in which the cursor 730 is output, although visual effects of making an edge of a scrolling area to expand like rubber as illustrated in FIG. 16D or 16E are not added.

Figure 16G:
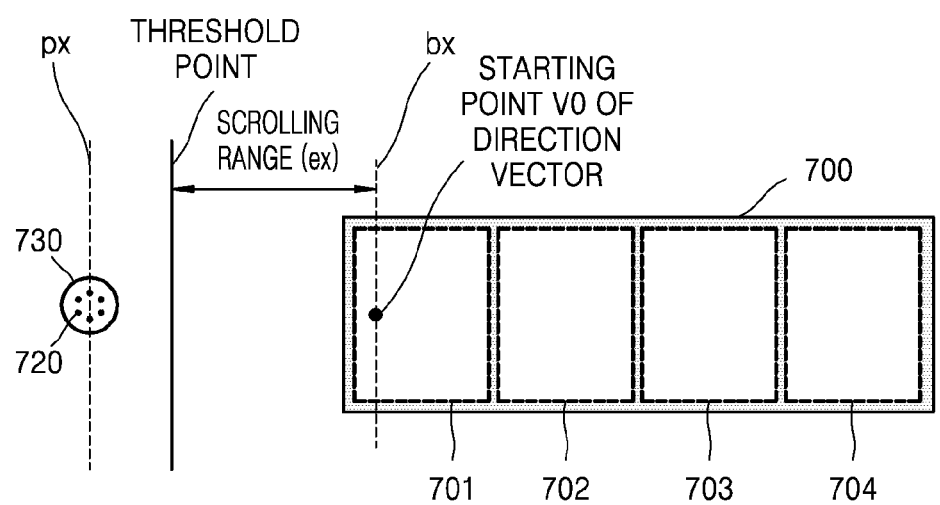

Referring to FIG. 16G, when the user moves the control device 200 so that the control device 200 points more to the left at the pointing position 720 of FIGS. 16B through 16F and that the pointing position 720 of the control device 200 deviates from the threshold point of the scrolling range, the display apparatus 100 outputs the scrolling area 700 that has been output by adding visual effects, to an original state, and displays the cursor 730 also at the same position as the actual pointing position 720 of the control device 200.

Hereinafter, exemplary embodiments will be described with reference to FIGS. 17 through 21, in which scrolling items are deformed. When the end of a scrolling list is reached according to a pointing position of a control device manipulated by a user according to an embodiment, scrolling items may be deformed so as to provide a user with a user interface whereby the user may spontaneously sense that the end of the scrolling list is reached.

Figure 17:
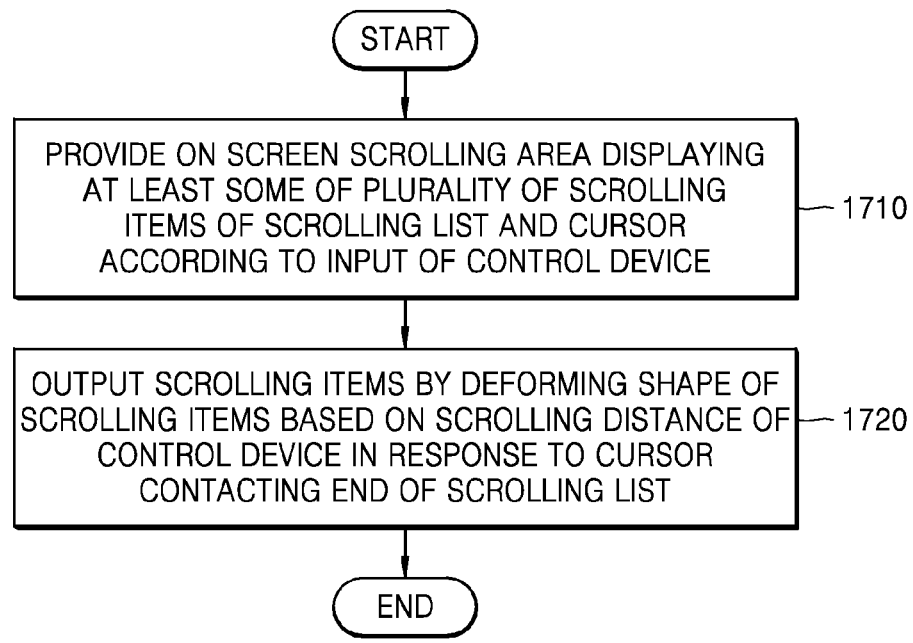
FIG. 17 is a flowchart of a display method performed in a display apparatus, according to an exemplary embodiment.

FIG. 17 is a flowchart of a display method performed in a display apparatus, according to an exemplary embodiment.

Figure 18A:
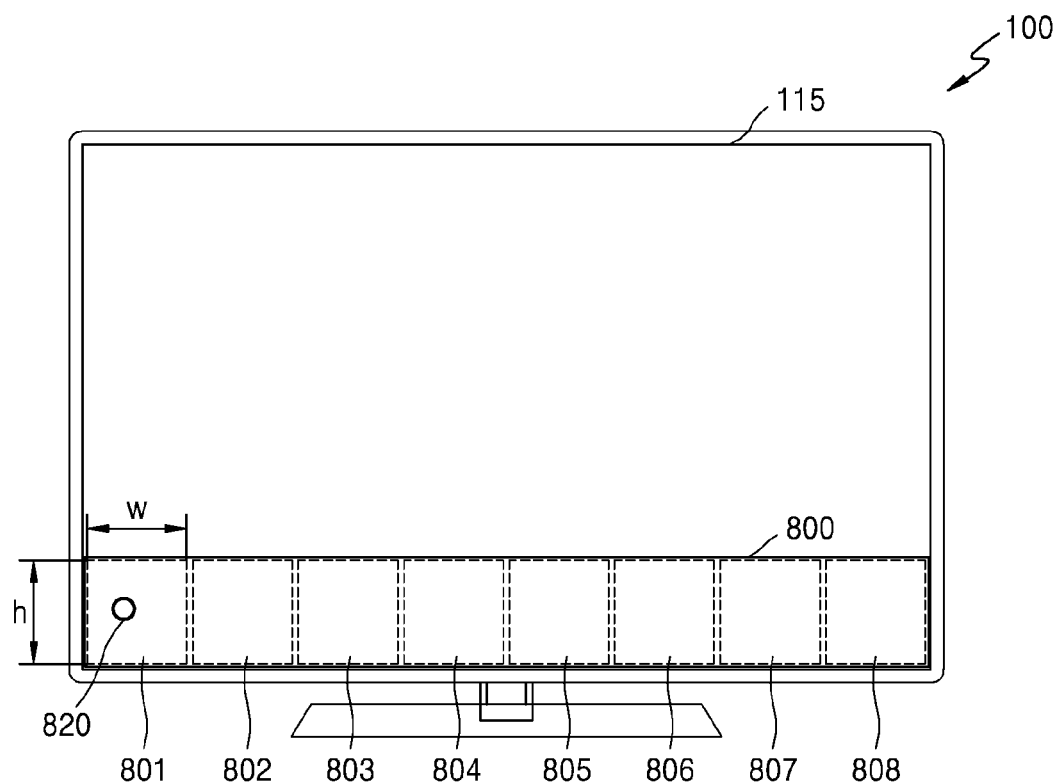
FIGS. 18A and 18B illustrate reference diagrams for explaining outputting scrolling items by deforming shapes of scrolling items based on a scrolling distance, according to an exemplary embodiment.
Figure 18B:
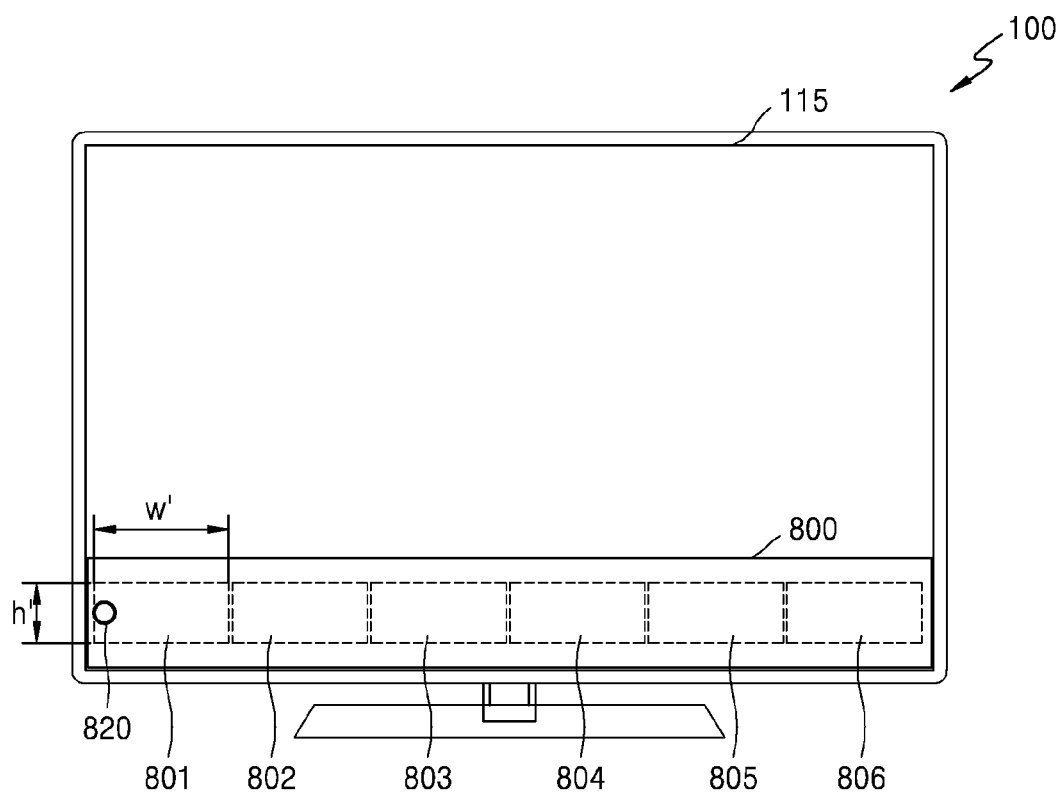

FIGS. 18A and 18B illustrate reference diagrams for explaining outputting scrolling items by deforming shapes of the scrolling items based on a scrolling distance, according to an exemplary embodiment.

The display method according to the present exemplary embodiment will be described with reference to FIGS. 13A, 13B, and 14.

Referring to FIG. 17, in operation 1710, the display apparatus 100 provides on a screen a scrolling area, in which at least one of scrolling items of a scrolling list are displayed, and a cursor corresponding to an input of the control device 200.

Referring to FIG. 18A, the display apparatus 100 provides a scrolling area 800 in a lower end of the display 115 of the display apparatus 100. A scrolling list is displayed in the scrolling area 800, and a plurality of scrolling items are arranged in the scrolling list. Scrolling items 801 through 808 are displayed in the scrolling area 800 in FIG. 18A. Each scrolling item may have, for example, a square shape having a height h and a width w. Also, the display apparatus 100 provides on a screen of the display 115 a cursor 820 corresponding to a pointing position of the control device 200.

In operation 1720, the display apparatus 100 deforms a shape of the scrolling items based on a scrolling distance of the control device 200 and outputs the scrolling items in response to a cursor reaching the end of the scrolling list.

Referring to FIG. 18B, when the user intends to scroll further from the end of the scrolling list by using the control device 200, the cursor 820 corresponding to the pointing position of the control device 200 reaches a left boundary of the scrolling area 800.

Here, the display apparatus 100 outputs the scrolling items by deforming the scrolling items so that the user may spontaneously sense that the end of the scrolling list is reached. Referring to FIG. 18B, the display apparatus 100 outputs the scrolling items by deforming the height h of each scrolling item to h' and the width w of each scrolling item to w'.

Figure 19A:
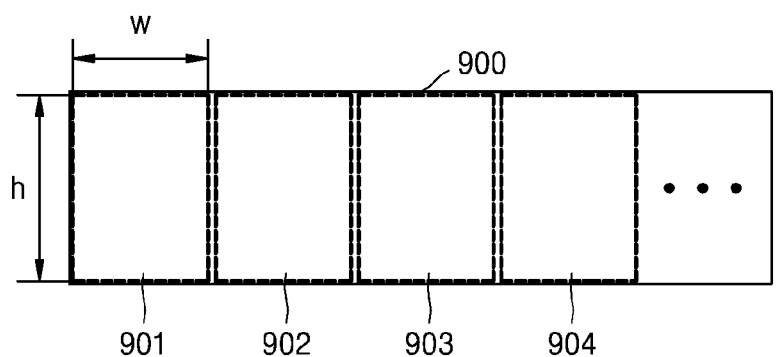
FIGS. 19A and 19B illustrate reference diagrams for explaining deformation of scrolling items when scrolling items are arranged horizontally.
Figure 19B:
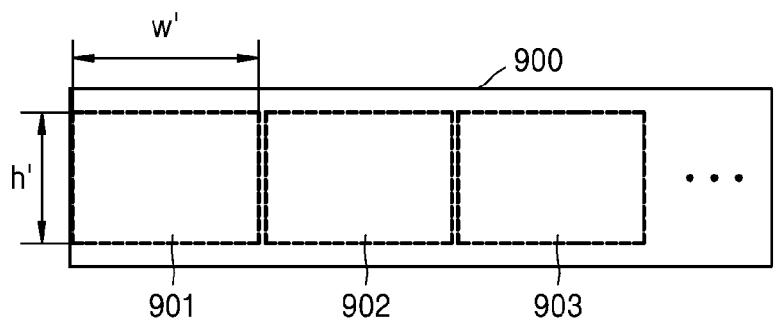

FIGS. 19A and 19B illustrate reference diagrams for explaining deformation of scrolling items when the scrolling items are arranged horizontally, according to an exemplary embodiment.

FIG. 19B illustrates a scrolling area 900 in which a plurality of scrolling items including scrolling items 901 through 904 are horizontally arranged. Each scrolling item has a square shape having a height h and a width w.

Referring to FIG. 19B, the display apparatus 100 outputs the scrolling items by deforming the scrolling items so that the user may spontaneously sense that the end of a scrolling list is reached. Referring to FIG. 19B. the display apparatus 100 displays the scrolling items 901, 902, and 903 in the scrolling area 900, and outputs the scrolling items 901, 902, and 903 by reducing the height h of each scrolling item to h' and increasing the width w of each scrolling item to w'. Here, a degree of deformation of each scrolling item may be set variously. Only a height of each scrolling item may be deformed, or only a width of each scrolling item may be deformed, or both a height and a width of each scrolling item may be deformed. Also, according to an exemplary embodiment, a height may be reduced and a width may be increased by an amount equivalent to the reduced height so as to maintain the same area of the scrolling item as the area before deformation.

Figure 20A:
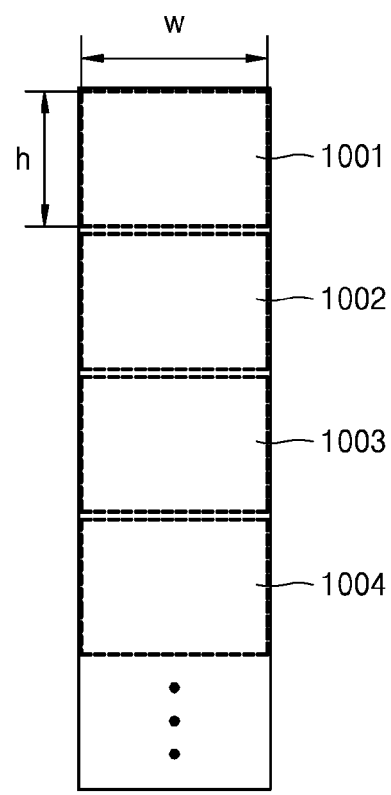
FIGS. 20A and 20B illustrate reference diagrams for explaining deformation of scrolling items when scrolling items are arranged vertically.
Figure 20B:
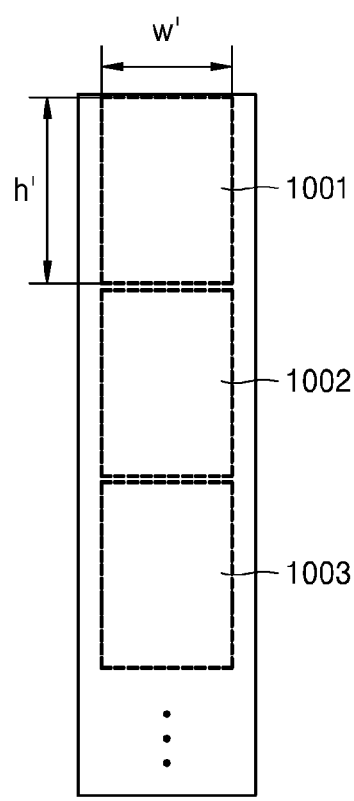

FIGS. 20A and 20B illustrate reference diagrams for explaining deformation of scrolling items when the scrolling items are arranged vertically.

FIG. 20A illustrates a scrolling area 1000 in which a plurality of scrolling items including scrolling items 1001 through 1004 are vertically arranged. Each scrolling item has a square shape having a height h and a width w.

Referring to FIG. 20B, the display apparatus 100 outputs the scrolling items by deforming the scrolling items so that the user may spontaneously sense that the end of a scrolling list is reached. Referring to FIG. 20B, the display apparatus 100 displays the scrolling items 1001, 1002, and 1003 in the scrolling area 1000, and outputs the scrolling items 1001, 1002, and 1003 by increasing the height h of each scrolling item to h' and reducing the width w of each scrolling item to w'. Here, a degree of deformation of each scrolling item may be set variously. Only a height of each scrolling item may be deformed, or only a width of each scrolling item may be deformed, or both a height and a width of each scrolling item may be deformed.

Figure 21:
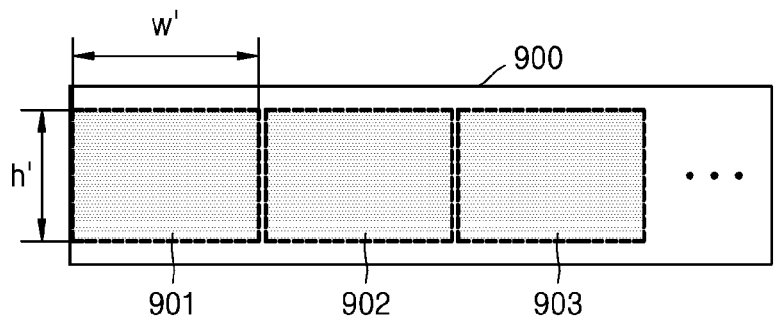
FIG. 21 is a reference diagram for explaining item attributes that are addable to deformation of scrolling items according to an exemplary embodiment.

FIG. 21 is a reference diagram for explaining item attributes that are addable to deformation of scrolling items according to an exemplary embodiment.

As in the exemplary embodiments of FIGS. 19A, 19B, 20A, and 20B, in order to allow a user to spontaneously sense that the end of a scrolling list is reached, properties of the scrolling item may be further modified in addition to deformation of a size of the scrolling items.

According to an exemplary embodiment, a transparency of the scrolling item as illustrated in FIG. 19B, having a reduced height and an increased width, may be varied.

According to an exemplary embodiment, a color value of the scrolling item as illustrated in FIG. 19B, having a reduced height and an increased width, may be varied.

According to an exemplary embodiment, a luminosity of the scrolling item as illustrated in FIG. 19B, having a reduced height and an increased width, may be varied.

According to an exemplary embodiment, a chroma of the scrolling item as illustrated in FIG. 19B, having a reduced height and an increased width, may be varied.

FIG. 22A through FIG. 22G are reference diagrams for explaining a method of outputting scrolling items by deforming shapes of the scrolling items based on a scrolling distance, according to an exemplary embodiment.

Figure 22A:
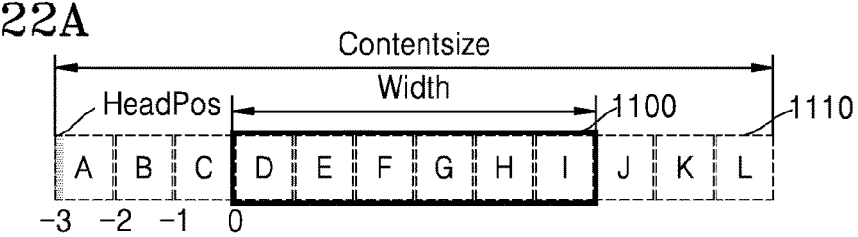
FIGS. 22A through 22G are reference diagrams for explaining a method of outputting scrolling items by deforming shapes of the scrolling items based on a scrolling distance according to an exemplary embodiment.

Referring to FIG. 22A, a scrolling area 1100 displaying scrolling items and a scrolling list 1110 including a plurality of scrolling items are displayed. The scrolling list 1110 includes scrolling items A, B, C, D, E, F, G, H, I, K, and L. The scrolling area 1100 may display six scrolling items, and items D through I are displayed in the scrolling area 1100 in FIG. 22A. The user may scroll from the scrolling area 1100 to the left by using a control device so that the scrolling items A, B, and C that are arranged on the left side of the scrolling item D and were not seen are to be displayed in the scrolling area 1100. Also, the user may scroll to the right side by using the control device so that the scrolling items J, K, and L which are arranged on the right side of the scrolling item I and are not seen are to be displayed in the scrolling area 1100. A length of the scrolling list corresponds to a sum of widths of all scrolling items and is denoted by contentsize, and a length of the scrolling area 1100 is denoted by Width.

HeadPos denotes a starting point of the scrolling list. When a left boundary portion of the scrolling area 1100 is set to 0 as a reference, and a length of one scrolling item is set to 1, HeadPos in FIG. 22A is −3.

Figure 22B:
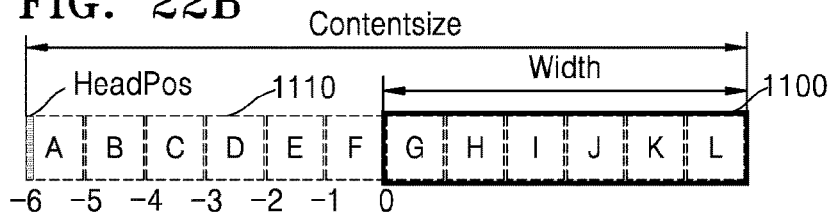

Referring to FIG. 22B, by scrolling to the right from the scrolling items as displayed as illustrated in FIG. 22A, by using a control device, the six scrolling items G to L at the right end of the scrolling list are displayed in the scrolling area 1100. In FIG. 22B, HeadPos is −6.

Figure 22C:
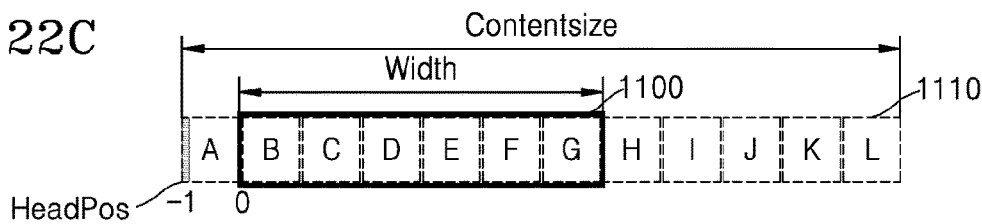

Referring to FIG. 22C, by scrolling to the left from the scrolling items as displayed as illustrated in FIG. 22B, the six scrolling items B to G on the left side of the scrolling list are displayed in the scrolling area 1100. In FIG. 22C, HeadPos is −1.

Figure 22D:
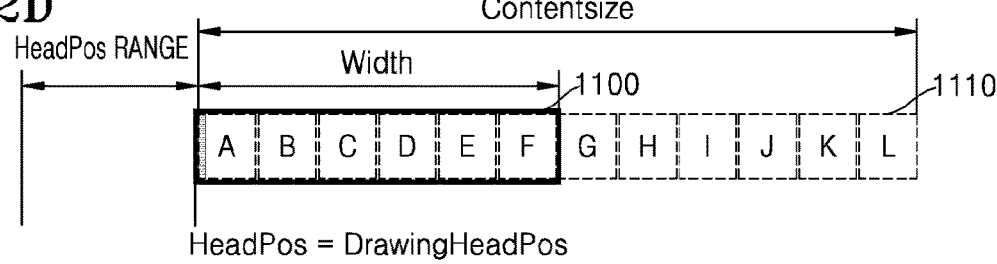

Referring to FIG. 22D, by further scrolling to the left from the scrolling items as displayed as illustrated in FIG. 22C, the six scrolling items A through F at the left end the scrolling list are displayed in the scrolling area 1100. HeadPos which is a starting position of the scrolling list in FIG. 22D corresponds to the left boundary of the scrolling area 1100 and is 0.

HeadPos has a value from −Contentsize+Width to 0.

In detail, when the scrolling items of the scrolling list illustrated in FIG. 22D are scrolled up to the right end and the six scrolling items from the right end are included in the scrolling area 1100, HeadPos has a minimum value. In this case, a HeadPos value is −Contentsize+Width. HeadPos has a maximum value in FIG. 22D, that is, when the scrolling items are scrolled up to the left end in the scrolling list so that the six scrolling items from the left end of the scrolling list are included in the scrolling area 1100. Here, the maximum value of HeadPos is 0. Accordingly, HeadPos may have a value from <−Contentsize+Width> to <0> in regard to typical scrolling.

Also, in FIG. 22D, HeadPos is the same as DrawingHeadPos which is a position in which drawing of items starts.

Figure 22E:
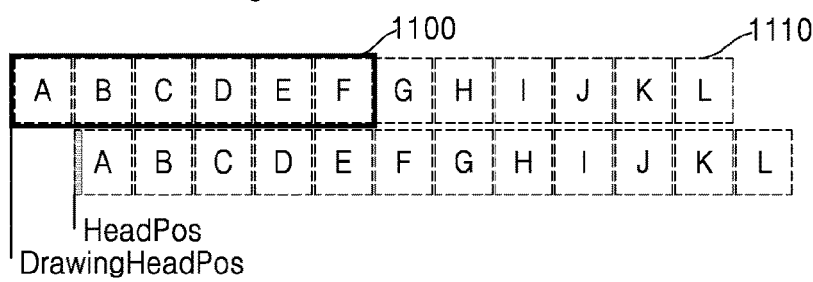

However, in a display state of the scrolling items of FIG. 22D, that is, when the left end of the scrolling list is reached at the left boundary of the scrolling area 1100, and the user further scrolls to the left by using a control device, HeadPos becomes greater than 0 as shown in FIG. 22E, which is a particular case. Referring to FIG. 22E, an upper portion shows a state of the scrolling list in which the left end of the scrolling list reaches the left edge of the scrolling area 1100. In this state, when the user intends to further scroll to the left by using a control device, as shown in a lower portion of FIG. 22E, a HeadPos value which is a starting position of the scrolling list becomes greater than 0, and as a result, and DrawingHeadPos and HeadPos become different.

By determining that HeadPos becomes greater than 0 which is a typical value for HeadPos, it may be determined that the end of the scrolling list has been reached and that deformation of scrolling items may be started. Likewise, in the display state of the scrolling items as illustrated in FIG. 22B, as the user performs scrolling further to the right end to determine that HeadPos becomes smaller than −Contentsize+Width, which is a typical range of HeadPos, it may be determined that deformation of the scrolling items may be started as the end of the scrolling list has been reached.

As described above with reference to FIG. 22E, when scrolling is further performed from the end of the scrolling list, a position in which drawing a scrolling item at the left end portion of the scrolling area 1100 starts, that is, DrawingHeadPos may be adjusted. That is, in order to allow a user to intuitively recognize that the end of the scrolling list is reached, the position in which drawing a scrolling item at the left end portion of the scrolling area 1100 starts, that is, DrawingHeadPos, may be located not at the left boundary of the scrolling area 1100 but slightly to the right from the left boundary.

A value of DrawingHeadPos may be obtained using the following calculation method.

```
float AutoScrollArea::calcDrawHeadPos( ) {
  if (HeadPos < −Contentsize+Width) {// when HeadPos is smaller than −Contentsize+Width
    const float d = (−Contentsize+Width − HeadPos);
    const float t = d / Width;
    restore
    −contentSize+Width−MOVELIMIT*interp(t); // calculate DrawHeadPos
like the adjoining formula
  }
  else if (HeadPos > 0) { //when HeadPos is greater than 0
    const float d = HeadPos;
    const float t = d / Width;
    restore MOVELIMIT*interp(t);
  } //calculate DrawHeadPos like the adjoining formula
  return HeadPos; // when HeadPos is not smaller than −Contentsize+Width and not greater than 0, DrawHeadPos
is the same as HeadPos
}
```

The above calculation method will be described in detail below.

Figure 22F:
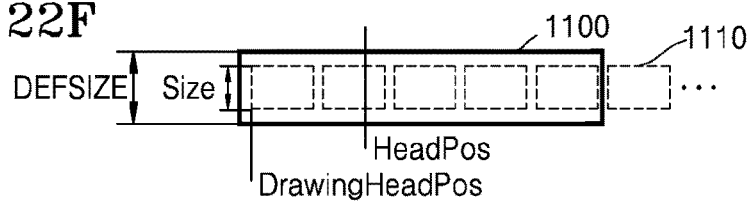

FIG. 22F is a reference diagram for explaining a deformation amount of a scrolling item.

Referring to FIG. 22F, a default height of a scrolling item is 'DEFSIZE,' and a height of a deformed scrolling item deformed according to scrolling item deformation is denoted by 'size.' Also, in a default state of a scrolling item, a y-axis position is 'DEFPOS,' and a y-axis position of a deformed scrolling item deformed according to scrolling item deformation is denoted by 'POS.' DEFORMLIMIT refers to a maximum value of an amount by which a scrolling item is deformed.

A height and a position of a deformed scrolling item according to an exemplary embodiment may be calculated, for example, as below.

```
DEFSIZE=100
DEFORMLIMIT=0.8
if (headpos<−contentSize+width) { // when scrolling is
performed more to the right from the right end
  t=(−contentSize+width−HeadPos)/width; // calculate t
}
else if (headPos>0) { // when scrolling is performed more to
the left from the left end
  t=HeadPos/width; // calculate t
}
size=DEFSIZE*lerp(1,DEFORMLIMIT,interp(t));// calculate size
pos=DEFPOS+(DEFAULTSIZE−size)/2 // calculate Pos
```

Here, lerp( ) is a linear interpolation function and is calculated as lerp(a,b,t)=a+t(b−a). lerp( ) is a function that is used to smoothly change one value to another.

Thus, lerp(1,DEFORMLIMIT,interp(t)) is a function of returning a value at interp(t) when varying a value from 1 to DEFORMLIMIT.

Thus, when varying size, which is a height of a deformed scrolling item, from 1 to 0.8(DEFORMLIMIT setting value above) with respect to a default size of 100, the size may be smoothly varied by using lerp(1,DEFORMLIMIT,interp(t)). lerp(1,DEFORMLIMIT,interp(t)) will now be described below with reference to FIG. 22H.

Figure 22G:
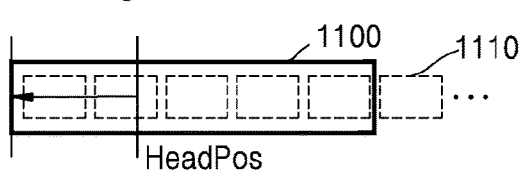
Figure 22H:
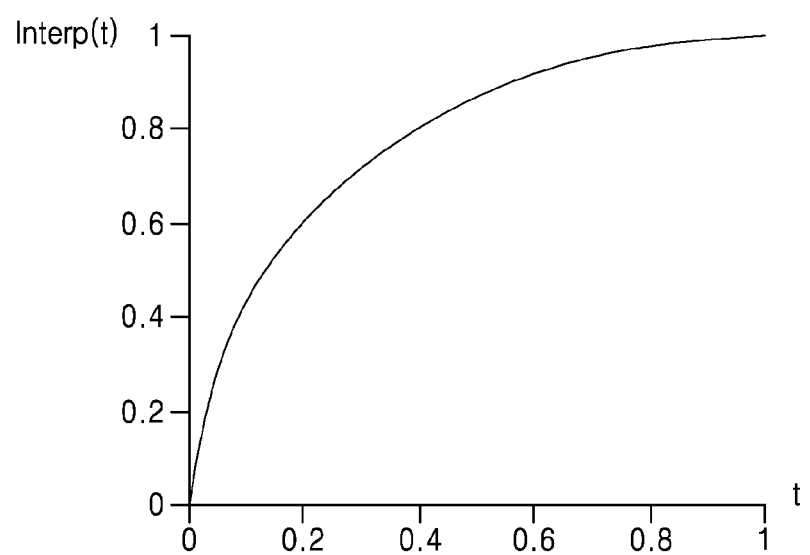
FIG. 22H illustrates an interpolating curve Interp(t)

An interpolating curve Interp(t) is illustrated in FIG. 22H.

Interp(t) is an interpolating curve having an inclination decreasing towards 1.

According to the present exemplary embodiment, t is proportional to HeadPos. For example, in the state as illustrated in FIG. 22F, while the left side of the scrolling list corresponds to the left boundary of the scrolling area, when scrolling is performed further to the left, HeadPos is moved to the right, and if a scrolling value by which scrolling to the left is performed is small, HeadPos is also reduced, and t which is proportional to HeadPos is also reduced. Referring to FIG. 22H, when t is a relatively small value, Interp(t) has a relatively large inclination variation, and lerp(1,DEFORMLIMIT,interp(t))=1+interp(t) (DEFORMLIMIT−1), and thus, a value of lerp is relatively abruptly varied.

Also, when a scrolling value by which scrolling to the left is performed is increased in the state FIG. 22F, HeadPos is also increased, and t which is proportional to HeadPos is also increased. Referring to FIG. 22H, when t is a relatively great value, Interp(t) has a relatively small inclination variation, and lerp(1,DEFORMLIMIT,interp(t))=1+interp(t) (DEFORMLIMIT−1), and thus, lerp is varied by a relatively small angle.

Thus, when HeadPos deviates from a general range of HeadPos by a small degree, a variation of a height of a scrolling item 'Size' is large, and the more HeadPos deviates from the general range of HeadPos, the more the variation of the height of the scrolling item 'Size' is reduced, and the user may experience an increase in resistance.

Also, referring to FIG. 22F, while the left side of the scrolling list corresponds to the left boundary of the scrolling area, when scrolling is performed further to the left, HeadPos is moved to the right, and here, DrawingHeadPos which is an actual starting position for drawing a scrolling item may also be changed. That is, referring to FIG. 22F, DrawingHeadPos does not correspond to the left boundary of the scrolling area 1100 and is located slightly to the right from the left boundary of the scrolling area 1100. DrawingHeadPos may be calculated as below.

```
if (headPos<-contentSize+width) {// when scrolling is performed further
from the right end
  t=(-contentSize+width-HeadPos)/width;
  return -contentSize+width-MOVELIMIT*interp(t)
}
else if (headPos>0) { // when scrolling is performed further from the
left
end
  t=HeadPos/width;
  return MOVELIMIT*interp(t)
```

Here, MOVELIMIT denotes a constant corresponding to a maximum distance which may be moved from the end of the scrolling list, and Interp denotes an interpolating curve having an inclination that is smaller towards 1 as illustrated in FIG. 22H.

In the above case, for example, when scrolling is performed further from the left end, t is proportional to Head-Pos, and Interp(t) is an interpolating curve having a smaller inclination towards 1.

Also, referring to FIG. 22F, while the left side of the scrolling list corresponds to the left boundary of the scrolling area, when scrolling is performed further to the left, HeadPos is moved to the right, and when a scrolling value by which the scrolling to the left is performed is small, HeadPos is also reduced, and t which is a value proportional to HeadPos is also reduced. Referring to FIG. 22H, when t is a relatively small value, Interp(t) has a value with a relatively large inclination variation, and accordingly, DrawingHeadPos=MOVELIMIT*interp(t) and which has a large inclination variation.

In the state as illustrated in FIG. 22F, while the left side of the scrolling list corresponds to the left boundary of the scrolling area, when scrolling is performed further to the left, HeadPos is moved to the right, and when a scrolling value by which the scrolling to the left is performed is increased, HeadPos is also increased, and t which is proportional to HeadPos is also increased. Referring to FIG. 22H, when t is a relatively great value, Interp(t) has a relatively small inclination variation, and accordingly, DrawingHeadPos=MOVELIMIT*interp(t), and which has a small inclination variation.

Thus, when HeadPos deviates from a general range of HeadPos by a small degree, a variation of DreawingHeadPos is large, and the more HeadPos deviates from the general range of HeadPos, the more the variation of the height of the scrolling item 'Size' is reduced, and the user may experience an increase in resistance.

FIG. 22G is a reference diagram showing restoring of a deformed scrolling item according to an exemplary embodiment to its original form.

Restoring of a deformed scrolling item to its original form may be performed, for example, while a scrolling operation is not performed and HeadPos deviates from a general range of HeadPos, that is, when a scrolling operation is released.

Restoring of a deformed scrolling item to its original form may be performed as below.

```
if (Headpos<-contentSize+width) {
  // When scrolling is performed further from the right end,
  animation is performed as below.
    value0=HeadPos; value1=-contentSize+width;
    startAt=elapsedTime( );
    startAnimation( );
}
else if (HeadPos>0) {
  // When scrolling is performed further from the left end,
  animation is performed as below.
    value0=HeadPos; value1=0;
    startAt=elapsedTime( );
    startAnimation( );
    DURATION; // Returning Animation Duration
    t=elapsedTime( )-startAt;
    v=1; // If time elapsed has already passed, a basic value is 1.
    if (t<DURATION)
    v=t/DURATION;
    else
    stopAnimation( ); // End of animation
    HeadPos=lerp(value0,value1,interp(v));
```

Figure 23:
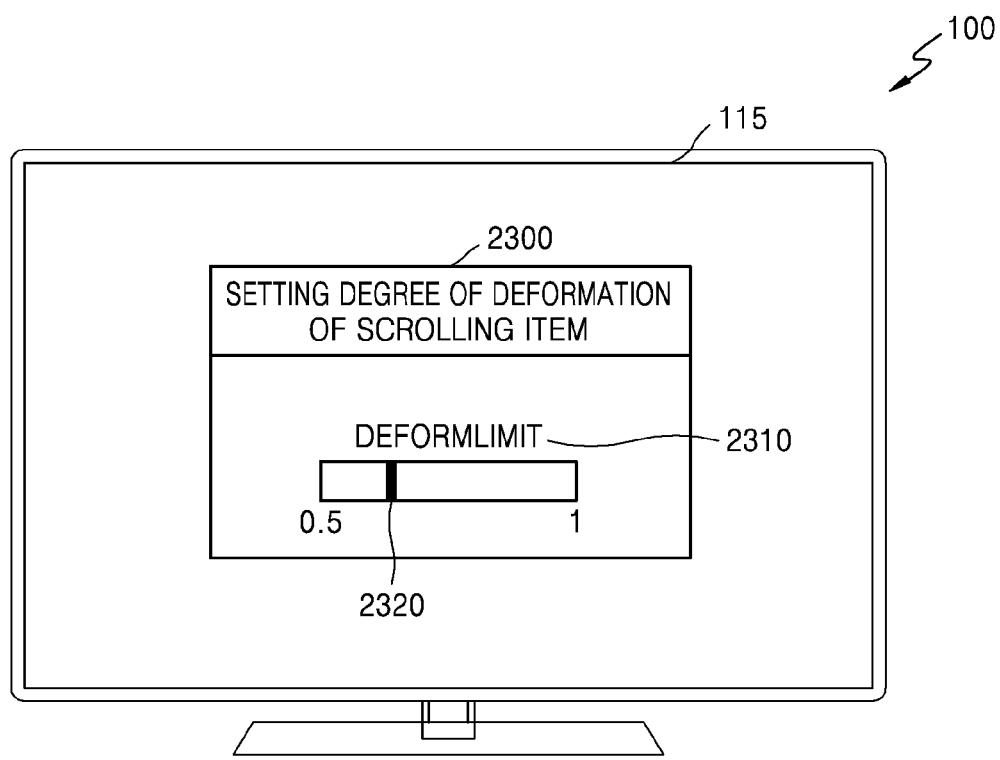
FIG. 23 illustrates a user interface for setting a degree of deformation of scrolling items according to an exemplary embodiment.

FIG. 23 illustrates a user interface 2300 for setting a degree of deformation of scrolling items according to an exemplary embodiment.

According to the above-described exemplary embodiment in which a size of a scrolling item is changed, a user interface allowing a user to set a degree of deformation of the scrolling item may be provided. Referring to FIG. 23, the user interface 2300 is provided on the display 115 of the display apparatus 100.

A user may set a degree of deformation of a scrolling item by controlling a DEFORMLIMIT item 2310 on the user interface 2300 for setting a degree of deformation of a scrolling item. Referring to FIG. 23, the user may set a DEFORMLIMIT value by locating a bar 2320 at a position, for example, between 0.5 to 1.0 by using the control device 200 in the DEFORMLIMIT item 2310. The DEFORMLIMIT value is described above with reference to FIG. 22F, and the user may minimize a height of a scrolling item by increasing the degree of deformation of the scrolling item by setting a minimum of DEFORMLIMIT value or may set a small degree of deformation of a scrolling item by setting a maximum of DEFORMLIMIT value so that a height of a deformed scrolling item is not different from a height of an original scrolling item, that is, such that no deformation is generated.

Figure 24A:
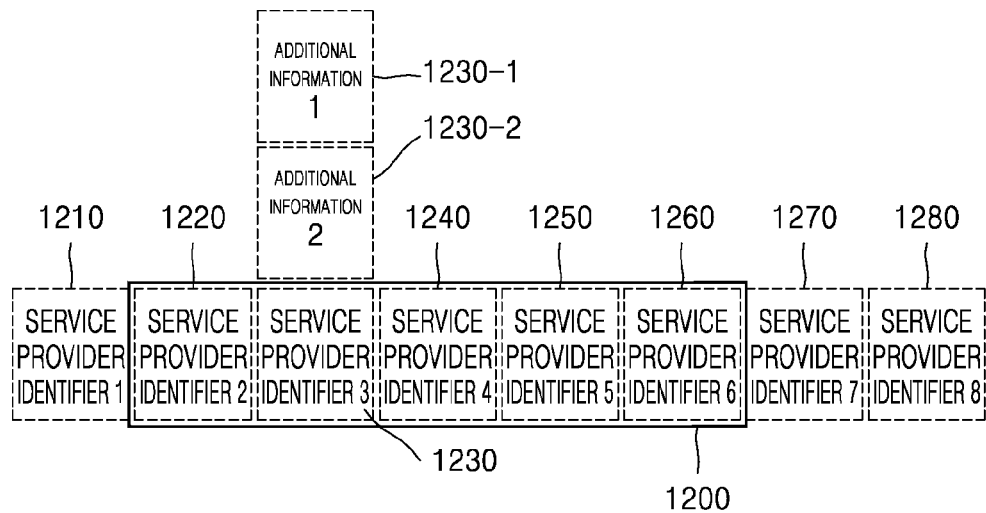
FIGS. 24A and 24B illustrate reference diagrams for explaining a scrolling direction according to an exemplary embodiment.
Figure 24B:
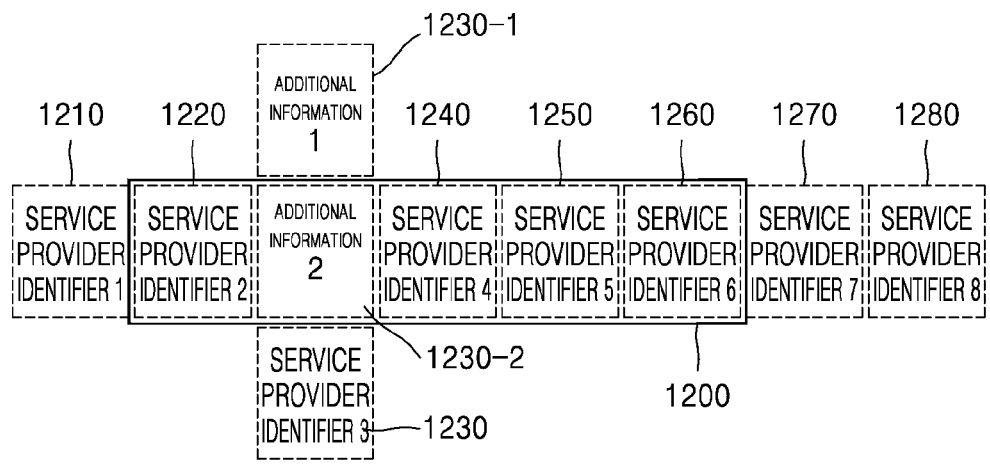

FIGS. 24A and 24B illustrate reference diagrams for explaining a scrolling direction according to an exemplary embodiment.

Referring to FIG. 24A, a horizontal scrolling area 1200 according to an exemplary embodiment is illustrated. In the horizontal scrolling area 1200, some scrolling items 1220 through 1260 from among scrolling items 1210, 1220, 1230, 1240, 1250, 1260, 1270, and 1280 of a scrolling list are displayed. According to an exemplary embodiment, the scrolling items 1210, 1220, 1230, 1240, 1250, 1260, 1270, and 1280 respectively denote service provider identifiers 1, 2, 3, 4, 5, 6, 7, and 8. A user may scroll the scrolling list in a horizontal direction, that is, in an x-axis direction by using a control device so that some of the scrolling items 1210 to 1280 are displayed in the horizontal scrolling area 1200.

In regard to a horizontal scrolling list as above, vertical scrolling may be added according to an exemplary embodiment. For example, when the scrolling item 1230 indicating a service provider identifier 3 is selected by using the control device 200, or simply while a cursor corresponding to the control device 200 is located on the scrolling item 1230, when the user performs vertical scrolling by using the control device 200, vertical scrolling may be generated. Vertical scrolling refers to scrolling performed by the user on the scrolling item 1230 upwardly or downwardly by using the control device 200. A vertical scrolling list corresponding to the service provider identifier 3 includes, as scrolling items, additional information 1 1230-1 and additional information 2 1230-2. In a state of FIG. 24A, when the user performs vertical scrolling with respect to the scrolling item 1230 indicating the service provider identifier 3 by using the control device 200, as illustrated in FIG. 24B, the scrolling item 1230-2 indicating additional information 2 may be displayed in the horizontal scrolling area 1200.

According to the exemplary embodiment illustrated in FIGS. 24A and 24B, the vertical scrolling list with respect to the scrolling item 1230 corresponding to the service provider identifier 3 is illustrated for convenience of description. However, the other scrolling items 1210 through 1280 may also be arranged to have respective vertical scrolling lists.

According to an exemplary embodiment, additional information corresponding to a service provider identifier may denote a list of contents provided by a service provider.

According to an exemplary embodiment, additional information corresponding to a service provider identifier may denote a program that is set as a preferred program from among programs provided by a service provider.

According to an exemplary embodiment, additional information corresponding to a service provider identifier may denote information about a program that is currently provided by a service provider or information about a next program to be provided by a service provider after a currently provided program is ended.

Figure 25A:
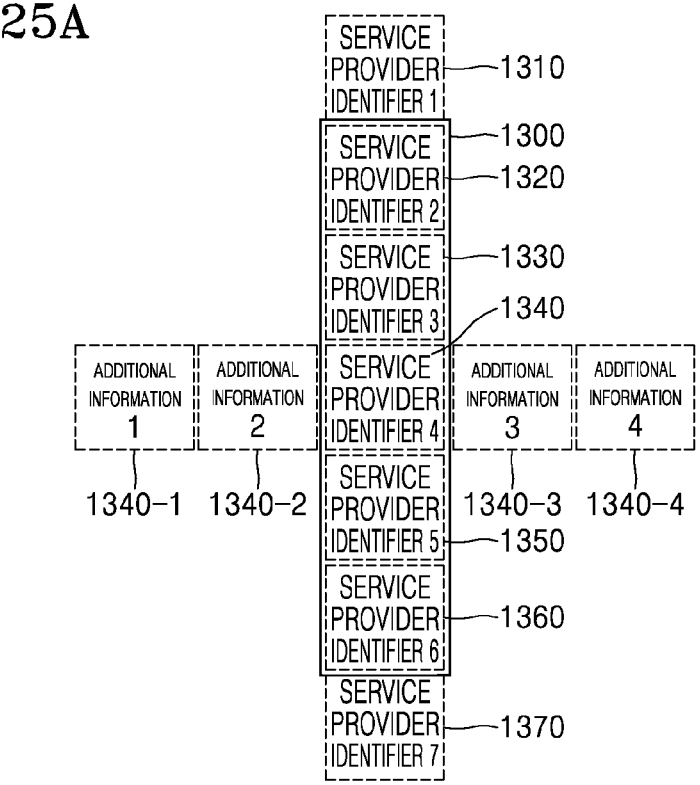
FIGS. 25A and 25B illustrate reference diagrams for explaining vertical scrolling according to an exemplary embodiment.
Figure 25B:
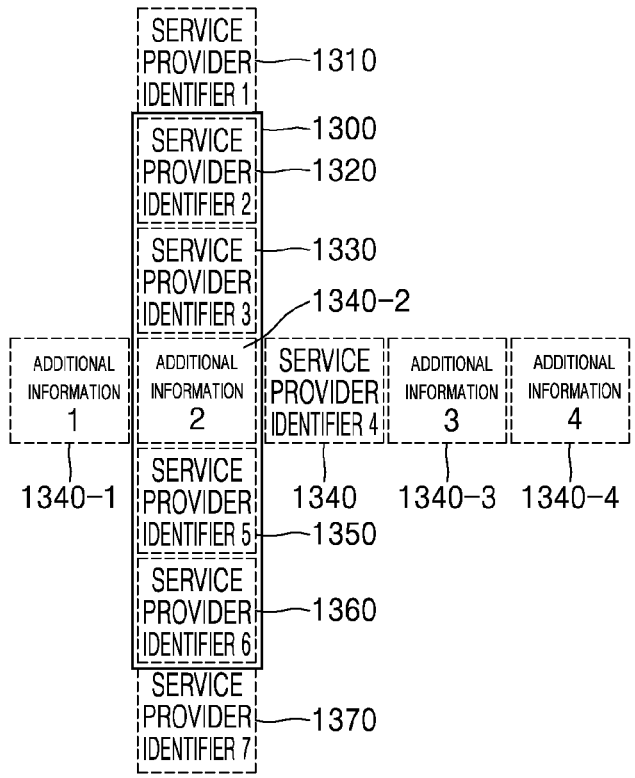

FIGS. 25A and 25B illustrate reference diagrams for explaining a scrolling direction according to another exemplary embodiment. Referring to FIG. 25A, a vertical scrolling area 1300 is illustrated according to an exemplary embodiment. In the vertical scrolling area 1300, some scrolling items 1320 through 1360 from among scrolling items 1310, 1320, 1330, 1340, 1350, 1360, and 1370 of a scrolling list are displayed in the vertical scrolling area 1300. According to an exemplary embodiment, the scrolling items 1310, 1320, 1330, 1340, 1350, 1360, and 1370 respectively denote service provider identifiers 1, 2, 3, 4, 5, 6, and 7. Thus, the user may display the scrolling items 1310 to 1370 by vertically scrolling the scrolling list by using the control device 200.

In regard to a vertical scrolling list as above, horizontal scrolling may be added according to an exemplary embodiment. For example, when the scrolling item 1340 indicating a service provider identifier 4 is selected by using the control device 200, or simply while a cursor corresponding to the control device 200 is located on the scrolling item 1340, when the user performs horizontal scrolling by using the control device 200, horizontal scrolling may be generated. Horizontal scrolling refers to scrolling performed by the user on the scrolling item 1340 to the left or the right by using the control device 200. A horizontal scrolling list corresponding to the service provider identifier 4 includes, as scrolling items, additional information 1 1340-1, additional information 2 1340-2, additional information 3 1340-3, and additional information 4 1340-4. In a state of FIG. 25A, when the user performs horizontal scrolling with respect to the scrolling item 1340 indicating the service provider identifier 4 by using the control device 200, as illustrated in FIG. 25B, the scrolling item 1340-2 indicating additional information 2 may be displayed in the vertical scrolling area 1300 as illustrated in FIG. 25B.

Figure 26A:
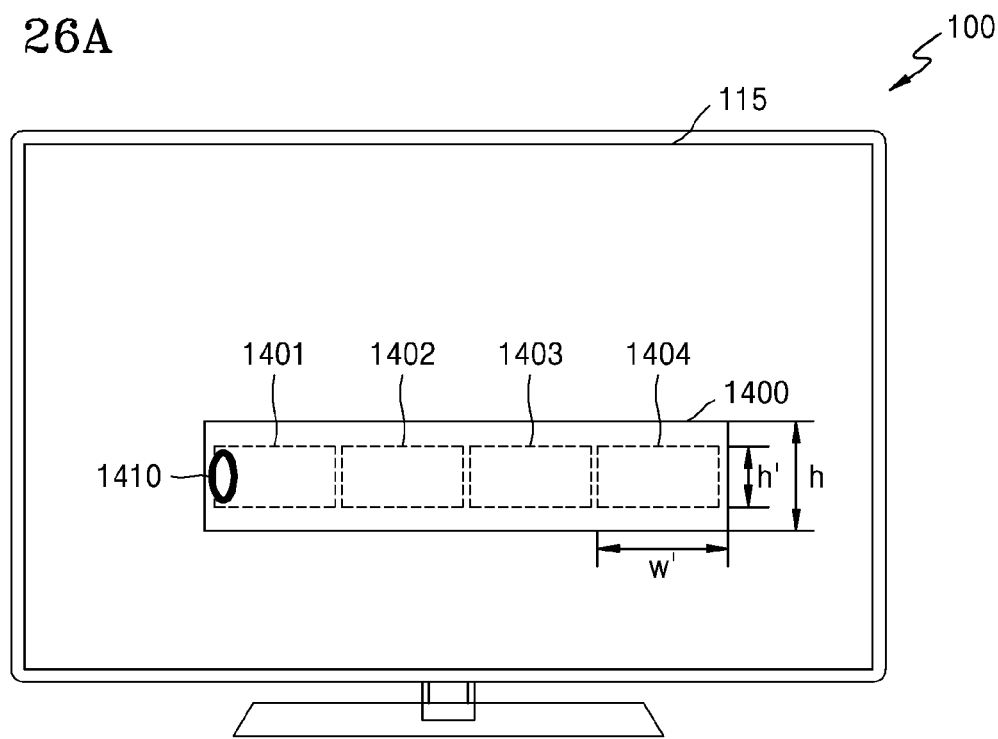
FIGS. 26A and 26B illustrate an example in which displaying of a cursor or a scrolling area by reflecting visual effects in the cursor or the scrolling area based on a scrolling distance and displaying a scrolling item by deforming the shape of the scrolling item are combined, according to an exemplary embodiment.
Figure 26B:
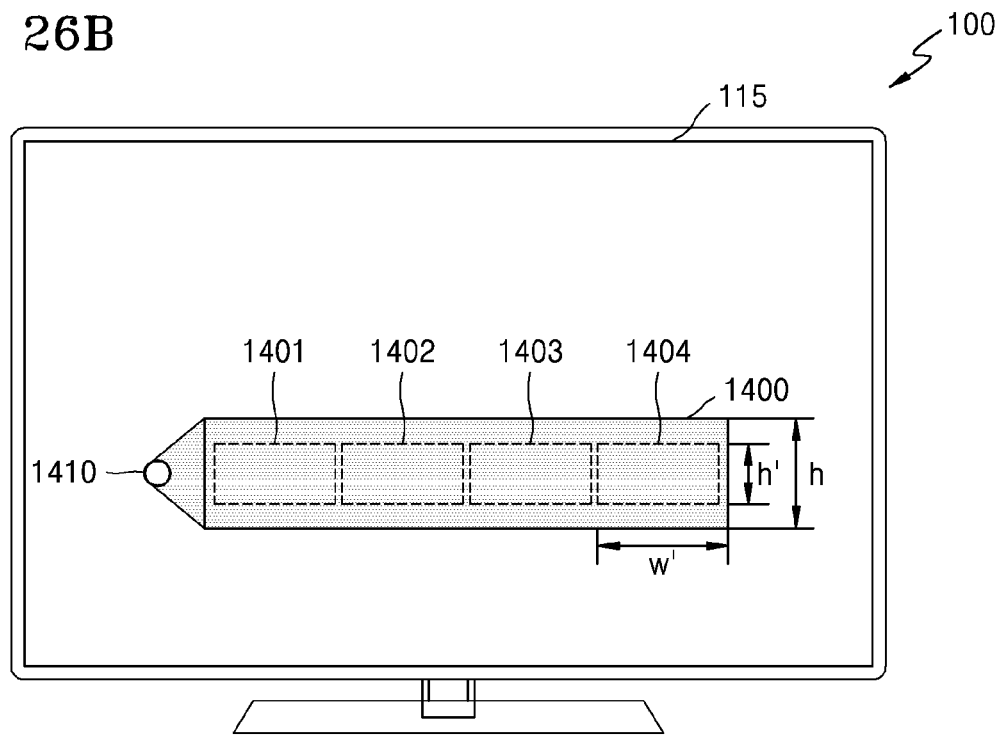

FIGS. 26A and 26B illustrate examples in which displaying of a cursor or a scrolling area by reflecting visual effects in the cursor or the scrolling area based on a scrolling distance and displaying a scrolling item by deforming the shape of the scrolling item are combined, according to an exemplary embodiment.

Referring to FIG. 26A, the display apparatus 100 may provide a scrolling area 1400 on the display 115 and outputs scrolling items 1401 through 1404 on the scrolling area 1400. The user scrolls the items of the scrolling area 1400 by using the control device 200. Here, the display apparatus 100 outputs a cursor 1410 by deforming the cursor based on a scrolling distance in response to the cursor 1410 contacting an edge of the scrolling area 1400, and may also output the scrolling items by deforming the shape of the scrolling items in order to allow the user to recognize that an end of the scrolling list is reached.

Referring to FIG. 26B, the display apparatus 100 provides a scrolling area 1400 on the display 115 and outputs scrolling items 1401 through 1404 on the scrolling area 1440. The user scrolls the items of the scrolling area 1400 by using the control device 200. Here, the display apparatus 100 outputs the scrolling area 1400 by adding visual effects to the scrolling area 1400 based on a scrolling distance in response to the cursor 1410 corresponding to an input of the control device 200 and contacting an edge of the scrolling area 1400, and may also output the scrolling items by deforming the shape of the scrolling items in order to allow the user to recognize that an end of the scrolling list is reached.

Figure 27A:
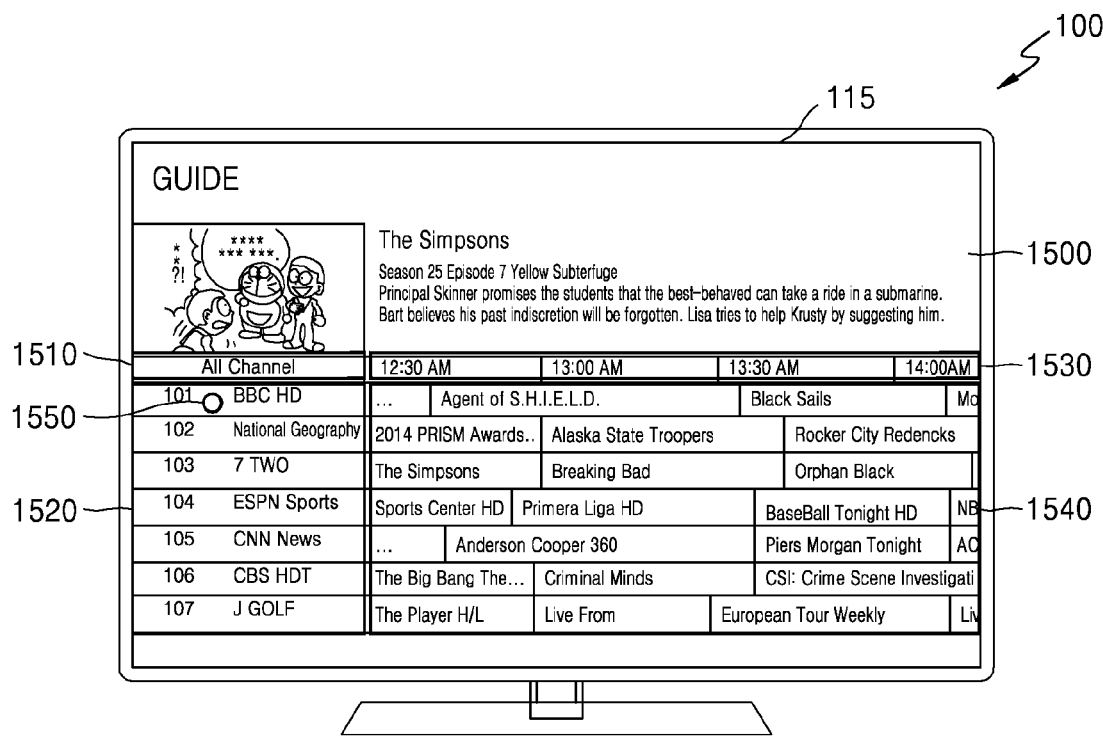
FIGS. 27A through 27C illustrate an electronic program guide (EPG) in which deformation of a shape of a cursor based on a scrolling distance according to an exemplary embodiment is applied.
Figure 27A:
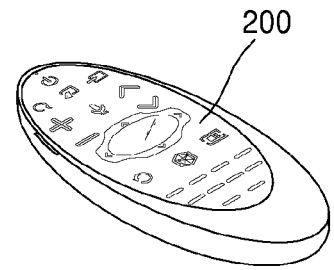
Figure 27B:
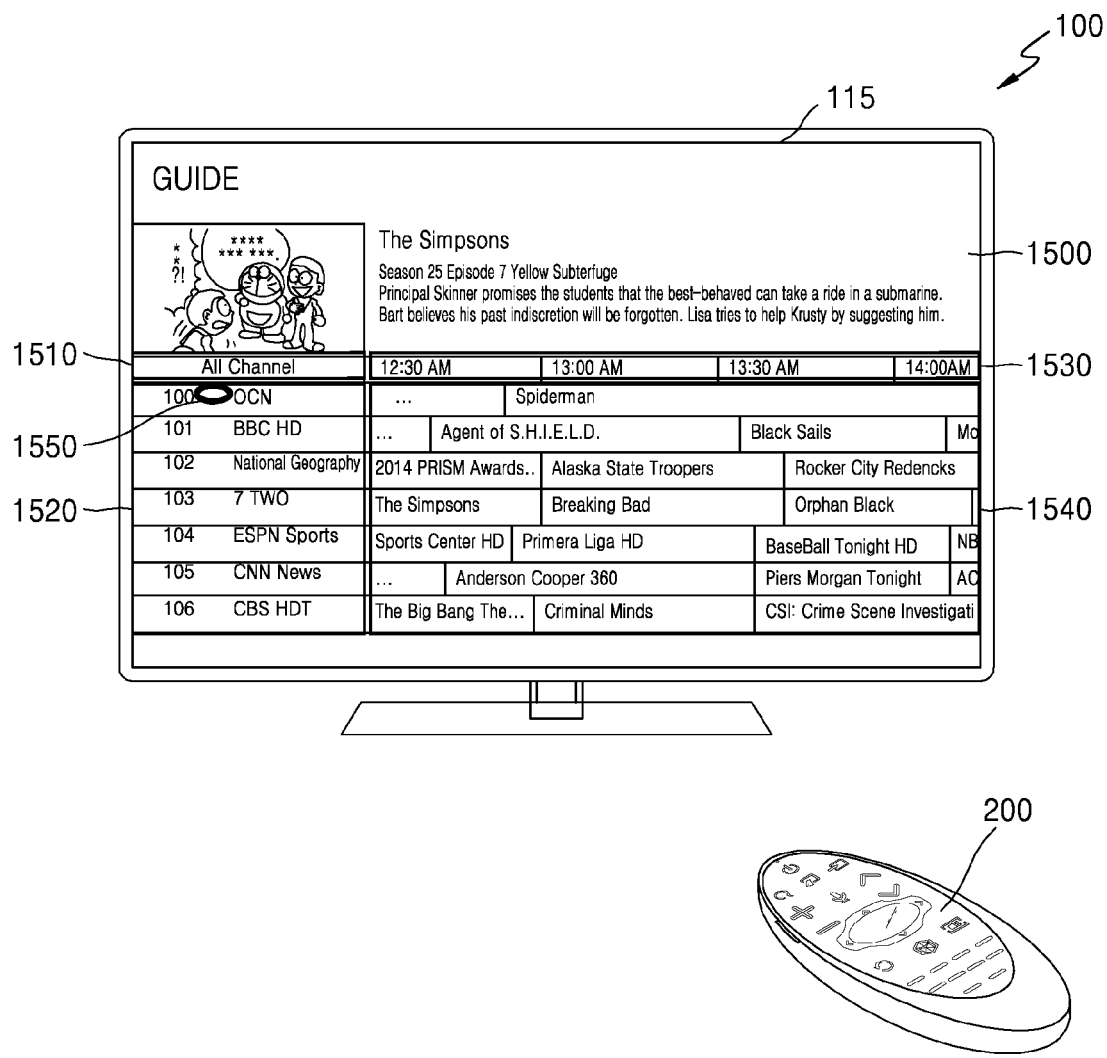
Figure 27C:
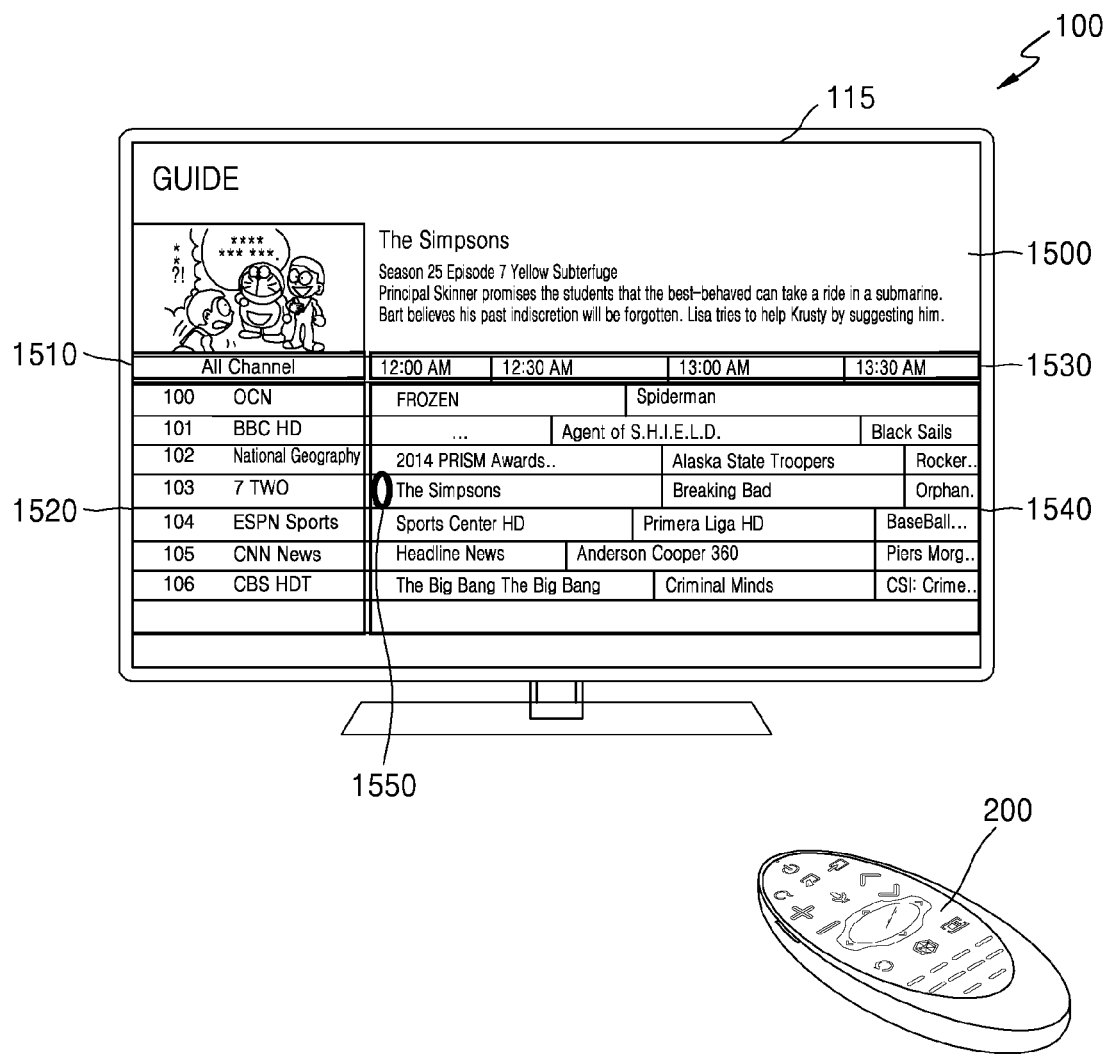

FIGS. 27A through 27C illustrate an electronic program guide (EPG) in which deformation of a shape of a cursor based on a scrolling distance according to an exemplary embodiment is applied.

EPGs or interactive program guides provide a user with a menu displaying broadcasting programs or scheduling information of currently broadcast programs or programs to be broadcast.

Referring to FIG. 27A, the display apparatus 100 provides an EPG 1500 on the display 115. The EPG 1500 includes a channel item 1510, a channel list scrolling area 1520, time information 1530, and a program information scrolling area 1540 including programs that are broadcast in various time zones. The user may vertically scroll the channel list scrolling area 1520 so that information of other unseen channels is displayed on the channel list scrolling area 1520. Also, the user may horizontally scroll the program information scrolling area 1540 so that information of programs of other time zones that are not seen is displayed in the program information scrolling area 1540.

Referring to FIG. 27A, a cursor 1550 that has a circular shape when scrolling is not performed yet is displayed on a screen, on which the EPG 1500 is output.

Referring to FIG. 27B, when the user scrolls upwardly from the channel list scrolling area 1520 in order to view channel information above a channel 101, the display apparatus 100 may output the cursor 1550 by deforming the cursor 1550 to an oval shape based on a scrolling distance in response to the cursor 1550 contacting an upper edge of the scrolling area 1520.

In greater detail, the display apparatus 100 may enable an edge scrolling mode in which a screen of the display apparatus 100 is scrolled in whole or in part when a cursor 1550 is located at an edge of the screen or located at an edge of the scrolling area 1540 of the screen. The edge scrolling mode may automatically enabled by default or in response to the output position of the cursor being located within the scrolling area of the screen. While video is reproduced in a full screen mode, the display apparatus 100 may disable the edge scrolling mode. The display apparatus 100 may determine, in the edge scrolling mode, an input position of the cursor 1550, determine a distance of a drag input from the input position to a final position of the drag input, and determine a distance between the edge of the scrolling area 1540 and the final position of the drag input. The input position of the cursor 1550 may be an actual position of the cursor 1500 input through the control device 200. When the display apparatus 100 is implemented with a touch panel, the input position may correspond to a position of a touch directly made on the touch panel. In the edge scrolling mode, the display apparatus 100 may apply an visual effect to the cursor 1550 based on the determined distance. The visual effect may correspond to changing a shape of the cursor in proportion to the distance between the edge of the scrolling area and the final position of the drag input. Alternatively or additionally, the visual effect may correspond to enabling the cursor to flicker with a frequency in proportion to the distance between the edge of the scrolling area and the final position of the drag input.

Referring to FIG. 27C, when the user scrolls from the channel list scrolling area 1520 to the left in order to view information of broadcasting programs of a time zone corresponding to 12:00 AM by using the control device 200, the display apparatus 100 may output the cursor 1550 by deforming the cursor 1550 to an oval shape based on a scrolling distance in response to the cursor 1550 contacting a left edge of the scrolling area 1520.

While not restricted thereto, an exemplary embodiment can be implemented as program instructions that can be executed using various computer components and can be written to a computer readable recording medium. The computer readable recording medium may include program instructions, a data file, a data structure etc. alone or in combination. The program instructions written to the computer readable recording medium may be specifically designed and configured for the exemplary embodiments described above. Examples of the computer readable recording medium include magnetic storage media (e.g., hard disks, floppy disks, magnetic tapes, etc.), optical recording media (e.g., CD-ROMs, or DVDs), magneto-optical media (e.g., floptical disks), and hardware devices specifically configured to store and execute program instructions (e.g., ROM, RAM, flash memories, etc.). The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium. Examples of the program instructions include not only machine codes generated by using a compiler but also high-level language codes that can be executed on a computer by using an interpreter or the like.

According to one or more exemplary embodiments, a user may experience spontaneously and intuitively that an end of a list is reached when a shape of a cursor or a shape of a scrolling item is deformed when performing edge scrolling.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display configured to display a cursor based on an input of a control device; and
a controller configured to:
detect a position of the cursor exiting a scrolling area at a boundary of the scrolling area in which a plurality of content items are displayed,
identify a scrolling distance based on a distance difference between an actual position indicated by the control device and the position of the cursor on the boundary of the scrolling area,
control the display to display the cursor by adding a visual effect to the cursor by deforming a shape of the cursor based on the scrolling distance, and
control the display to restore the cursor to an original form of the cursor without adding the visual effect and display the cursor at the actual position outside the scrolling area in response to the scrolling distance exceeding a threshold value of a scrolling range,
wherein the shape of the plurality of content items is deformed based on the scrolling distance, by changing either one or both of a height and a width of the plurality of content items.

2. The display apparatus of claim 1, wherein the cursor has a circular shape as the original form, and the controller is further configured to control the display to deform the original form of the cursor to an oval shape based on the scrolling distance.

3. The display apparatus of claim 2, wherein the controller is further configured to deform the cursor to a vertically long oval shape in response to a scrolling direction of the control device corresponding to a horizontal direction, and the controller is further configured to deform the cursor to a horizontally long oval shape in response to the scrolling direction of the control device corresponding to a vertical direction.

4. The display apparatus of claim 1, wherein the controller is further configured to determine a scrolling speed based on the scrolling distance.

5. The display apparatus of claim 1, wherein the controller is further configured to add the visual effect to the scrolling area by deforming the boundary of the scrolling area, the visual effect indicating a motion of pulling the boundary of the scrolling area towards the position of the control device.

6. The display apparatus of claim 5, wherein the controller is further configured to control the display to display the cursor at a position which is defined on a vector oriented from a point in the scrolling area toward the position of the control device.

7. The display apparatus of claim 5, wherein the controller is further configured to control the display to display a geometrical figure that includes a vertex corresponding to a position defined on a vector directed from a point in the scrolling area toward the position of the control device, and a side corresponding to the boundary of the scrolling area.

8. A display method of a display apparatus, the method comprising:
displaying a cursor on the display apparatus based on an input of a control device; and
detecting a position of the cursor exiting a scrolling area at a boundary of the scrolling area in which a plurality of content items are displayed;
identify a scrolling distance based on a distance difference between an actual position indicated by the control device and the position of the cursor on the boundary of the scrolling area, displaying the cursor by adding a visual effect to the cursor by deforming a shape of the cursor based on the scrolling distance, restoring the cursor to an original form of the cursor without adding the visual effect, and displaying the cursor at the actual position outside the scrolling area, in response to the scrolling distance exceeding a threshold value of a scrolling range, wherein the shape of the plurality of content items is deformed based on the scrolling distance, by changing either one or both of a height and a width of the plurality of content items.

9. The display method of claim 8, wherein the cursor has a circular shape, and the method further comprises outputting the cursor by deforming the original form of the cursor to an oval shape based on the scrolling distance.

10. The display method of claim 9, further comprising deforming the original form of the cursor to a vertically long oval shape in response to a scrolling direction of the control device corresponding to a horizontal direction, and deforming the original form of the cursor to a horizontally long oval shape in response to the scrolling direction of the control device corresponding to a vertical direction.

11. The display method of claim 8, further comprising determining a scrolling speed based on the scrolling distance.

12. The display method of claim 8, further comprising adding the visual effect to the scrolling area by deforming the boundary of the scrolling area, that the visual effect indicating a motion of pulling the boundary of the scrolling area towards a pointing position of the control device.

13. The display method of claim 12, further comprising displaying the cursor at a position defined on a vector oriented from a point in the scrolling area toward the position of the control device.

14. The display method of claim 12, further comprising displaying a geometrical figure that includes a vertex corresponding to a position defined on a vector directed from a point in the scrolling area toward the position of the control device, and a side corresponding to the boundary of the scrolling area.

* * * * *